(12) United States Patent
Maegawa

(10) Patent No.: US 7,706,242 B2
(45) Date of Patent: Apr. 27, 2010

(54) OPTICAL DISK, SIGNAL GENERATION METHOD, CLOCK SIGNAL GENERATION METHOD, AND OPTICAL DISK DEVICE

(75) Inventor: Hiroshi Maegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1462 days.

(21) Appl. No.: 11/064,098

(22) Filed: Feb. 24, 2005

(65) Prior Publication Data

US 2005/0195730 A1 Sep. 8, 2005

(30) Foreign Application Priority Data

Feb. 25, 2004 (JP) ............................ 2004-048930
Feb. 25, 2004 (JP) ............................ 2004-048934

(51) Int. Cl.
*G11B 7/24* (2006.01)
(52) U.S. Cl. ................................. 369/275.4; 369/275.2
(58) Field of Classification Search .............. 369/275.1, 369/275.2
See application file for complete search history.

(56) References Cited

U.S. PATENT DOCUMENTS

| | | | | |
|---|---|---|---|---|
| 5,226,026 | A * | 7/1993 | Oshiba | 369/47.18 |
| 5,815,486 | A | 9/1998 | Kobayashi et al. | |
| 5,828,634 | A | 10/1998 | Ohno et al. | |
| 5,838,658 | A * | 11/1998 | Nakane et al. | 369/275.4 |
| 5,852,599 | A * | 12/1998 | Fuji | 369/275.4 |
| 6,088,311 | A * | 7/2000 | Katoh | 369/47.18 |
| 6,160,773 | A | 12/2000 | Maegawa et al. | |
| 6,324,137 | B2 * | 11/2001 | Tanase et al. | 369/47.28 |
| 6,345,018 | B1 | 2/2002 | Maegawa et al. | |
| 6,438,082 | B2 * | 8/2002 | Asano | 369/47.28 |
| 6,442,116 | B2 * | 8/2002 | Asano | 369/47.28 |
| 6,564,009 | B2 * | 5/2003 | Owa et al. | 386/126 |
| 6,693,856 | B1 * | 2/2004 | Shidochi et al. | 369/30.15 |
| 6,741,540 | B2 | 5/2004 | Maegawa | |
| 6,859,425 | B2 | 2/2005 | Maegawa et al. | |
| 6,888,783 | B2 | 5/2005 | Maegawa | |
| 6,920,100 | B2 * | 7/2005 | Kuma et al. | 369/59.21 |
| 7,092,332 | B2 * | 8/2006 | Hayashi | 369/47.34 |
| 2002/0018414 | A1 * | 2/2002 | Asano | 369/47.28 |
| 2002/0191512 | A1 | 12/2002 | Arioka et al. | |
| 2002/0192423 | A1 | 12/2002 | Arioka et al. | |
| 2002/0196717 | A1 * | 12/2002 | Masui et al. | 369/44.29 |
| 2003/0165095 | A1 | 9/2003 | Iimura et al. | |
| 2004/0013063 | A1 | 1/2004 | Maegawa | |
| 2004/0017761 | A1 * | 1/2004 | Aoyama et al. | 369/112.17 |
| 2004/0022158 | A1 * | 2/2004 | Kando et al. | 369/59.11 |
| 2004/0027958 | A1 * | 2/2004 | Takeuchi et al. | 369/53.41 |
| 2004/0052177 | A1 | 3/2004 | Maegawa | |
| 2004/0146000 | A1 | 7/2004 | Maegawa | |

FOREIGN PATENT DOCUMENTS

| | | |
|---|---|---|
| JP | H08-339634 | 12/1996 |
| JP | 2002-334437 | 11/2002 |
| JP | 2002-334438 | 11/2002 |
| JP | 2002-342941 | 11/2002 |

(Continued)

*Primary Examiner*—Wayne R Young
*Assistant Examiner*—Brenda Bernardi
(74) *Attorney, Agent, or Firm*—Dickstein Shapiro LLP

(57) ABSTRACT

An optical disk includes a recording surface on which a plurality of pits, corresponding to multilevel (three level or higher) information, is formed as a spiral or concentric pit array. The pit array wobbles periodically. A plurality of predetermined reference marks, corresponding to a period of the wobble, are included in the pit array.

4 Claims, 49 Drawing Sheets

FOREIGN PATENT DOCUMENTS

| | | |
|---|---|---|
| JP | 2002-352434 | 12/2002 |
| JP | 2003-022540 | 1/2003 |
| JP | 2003-503809 | 1/2003 |
| JP | 2003-085773 | 3/2003 |
| JP | 2003-85774 | 3/2003 |
| WO | WO 01/01404 A1 | 1/2001 |

* cited by examiner

FIG.4

| WOBBLE UNIT NO. | SYNCHRONIZATION INFO. | | ADDRESS INFO. |
|---|---|---|---|
| | WOBBLE NO. 0 | WOBBLE NO. 1-3 | WOBBLE NO. 4-7 |
| UNIT 1 | WORD SYNC | | |
| UNIT 2 | BIT SYNC | | DATA BIT 1 |
| UNIT 3 | BIT SYNC | | DATA BIT 2 |
| UNIT 4 | BIT SYNC | | DATA BIT 3 |
| UNIT 5 | BIT SYNC | | DATA BIT 4 |
| UNIT 6 | BIT SYNC | | DATA BIT 5 |
| UNIT 7 | BIT SYNC | | DATA BIT 6 |
| UNIT 8 | BIT SYNC | | DATA BIT 7 |
| ... | ... | ... | ... |
| UNIT 49 | BIT SYNC | | DATA BIT 48 |
| UNIT 50 | BIT SYNC | | DATA BIT 49 |
| UNIT 51 | BIT SYNC | | DATA BIT 50 |
| UNIT 52 | BIT SYNC | | DATA BIT 51 |

WOBBLE CLOCK

| | C/N VALUE (dB) | DIFFERENCE IN QUALITY (dB) |
|---|---|---|
| BINARY RECORDING REGION | 37.5 | |
| MULTILEVEL RECORDING REGION (WITH BANDWIDTH LIMITING) | 38.9 | +1.4 |
| MULTILEVEL RECORDING REGION (WITHOUT BANDWIDTH LIMITING) | 41.8 | +4.3 |

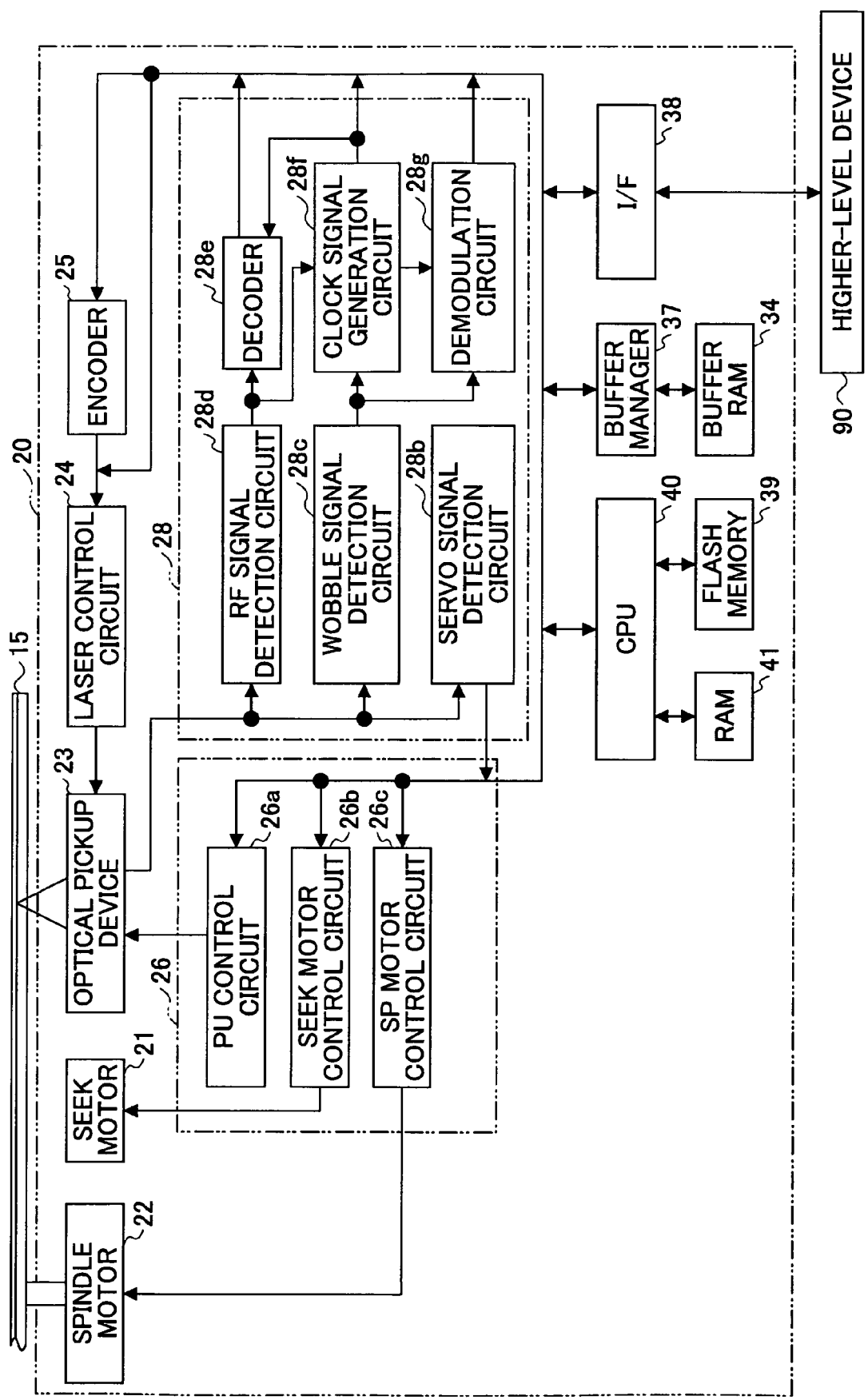

FIG.28

| WOBBLE UNIT NO. | SYNCHRONIZATION INFO. | | ADDRESS INFO. |
|---|---|---|---|
| | WOBBLE NO. 0 | WOBBLE NO. 1-3 | WOBBLE NO. 4-7 |
| UNIT 1 | WORD SYNC | | |
| UNIT 2 | BIT SYNC | | DATA BIT 1 |
| UNIT 3 | BIT SYNC | | DATA BIT 2 |
| UNIT 4 | BIT SYNC | | DATA BIT 3 |
| UNIT 5 | BIT SYNC | | DATA BIT 4 |
| UNIT 6 | BIT SYNC | | DATA BIT 5 |
| UNIT 7 | BIT SYNC | | DATA BIT 6 |
| UNIT 8 | BIT SYNC | | DATA BIT 7 |
| ... | ... | ... | ... |
| UNIT 49 | BIT SYNC | | DATA BIT 48 |
| UNIT 50 | BIT SYNC | | DATA BIT 49 |
| UNIT 51 | BIT SYNC | | DATA BIT 50 |
| UNIT 52 | BIT SYNC | | DATA BIT 51 |

(WOBBLE CLOCK spans across SYNCHRONIZATION INFO. and ADDRESS INFO. columns)

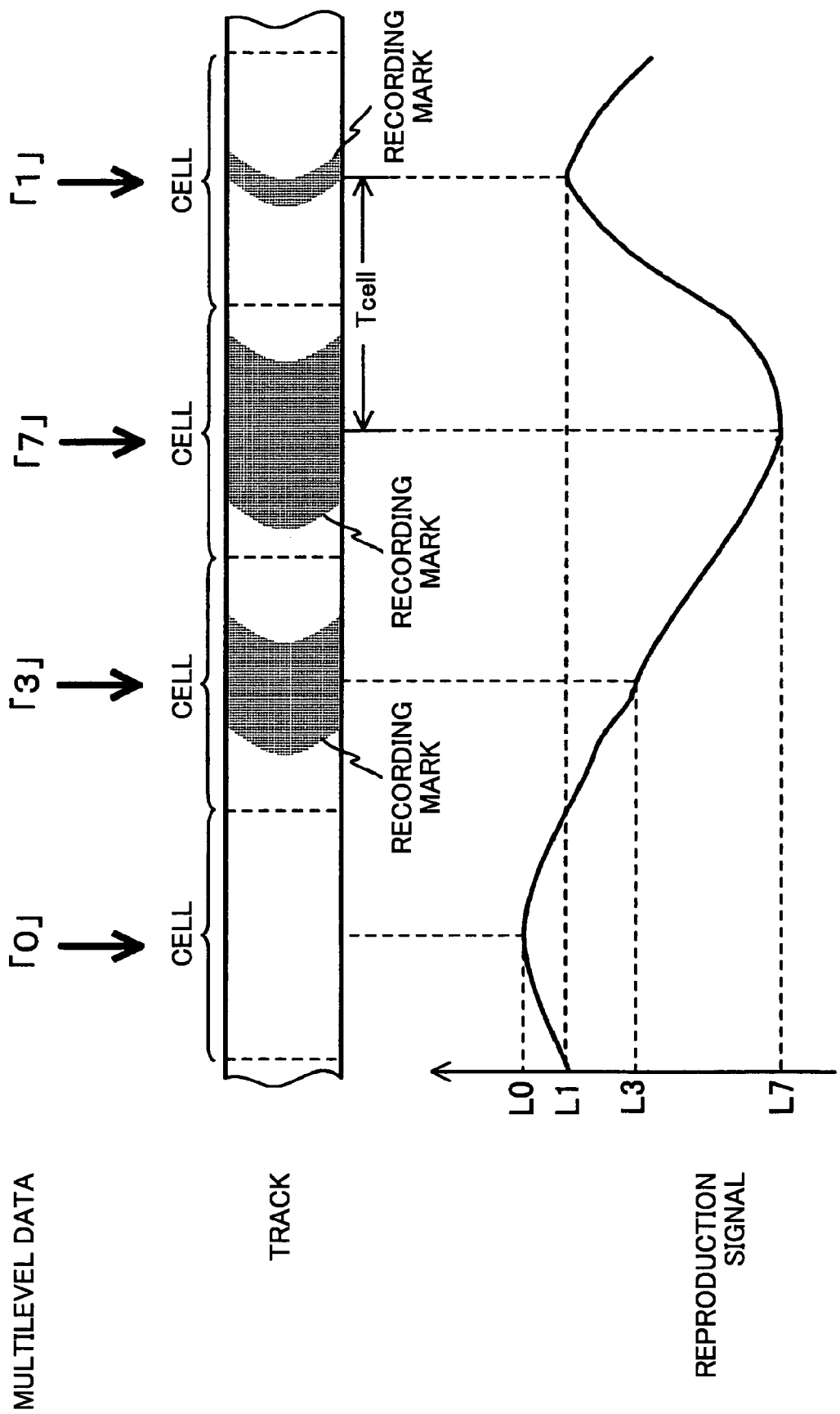

| | C/N VALUE (dB) | DIFFERENCE IN QUALITY (dB) |
|---|---|---|
| UNRECORDED REGION | 43.1 | |
| BINARY RECORDING REGION | 37.5 | −5.6 |
| MULTILEVEL RECORDING REGION (WITH BANDWIDTH LIMITING) | 38.9 | −4.2 |
| MULTILEVEL RECORDING REGION (WITHOUT BANDWIDTH LIMITING) | 41.8 | −1.3 |

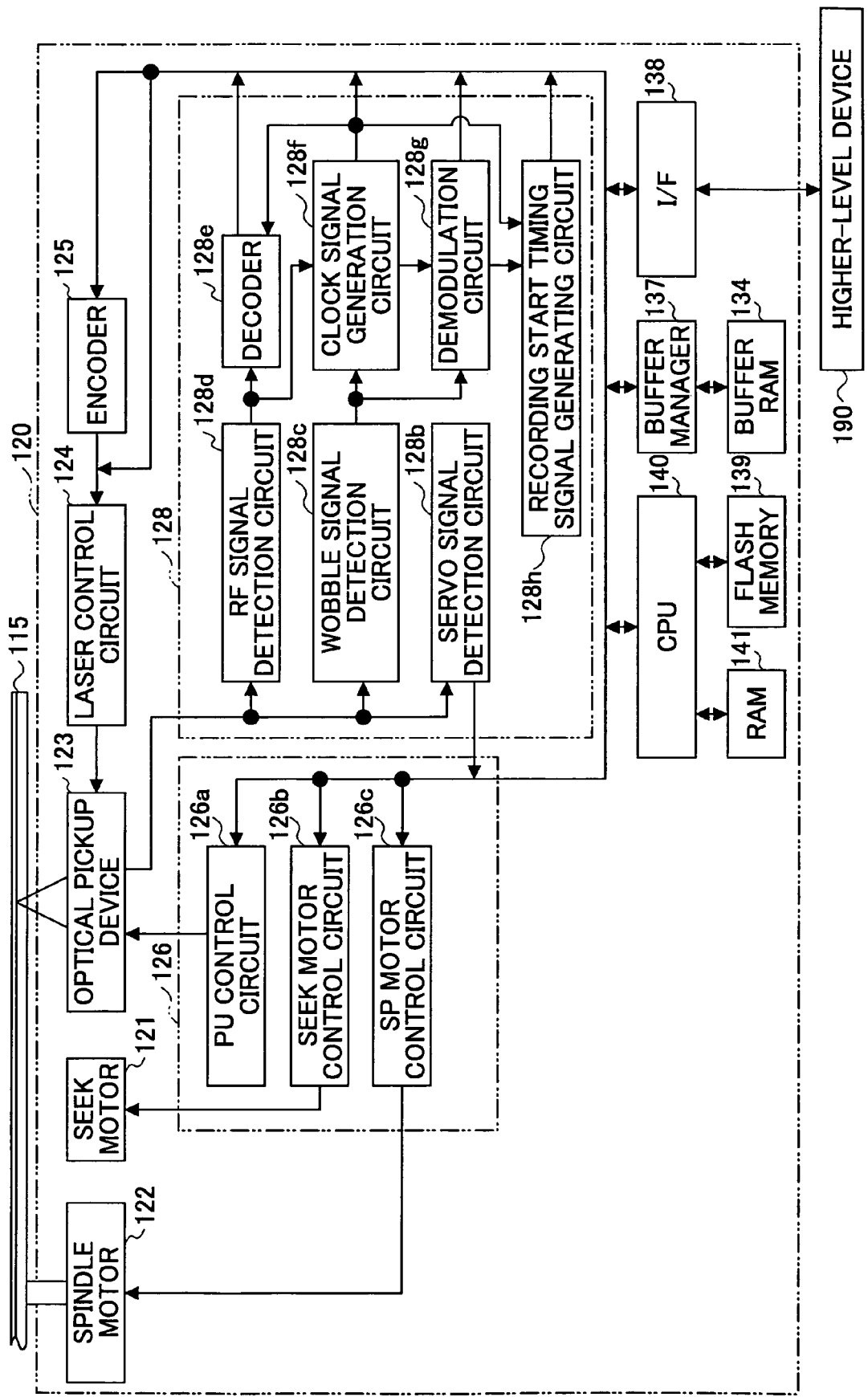

OPTICAL DISK, SIGNAL GENERATION METHOD, CLOCK SIGNAL GENERATION METHOD, AND OPTICAL DISK DEVICE

BACKGROUND OF THE INVENTION

1. Field of the Invention

The present invention generally relates to optical disks, clock generation methods, signal generation methods, and optical disk devices, and more particularly, to an optical disk recording thereon multilevel information, a clock signal generation method of generating a clock signal that is used when reproducing the information from the optical disk, and an optical disk device reproducing the information from the optical disk.

Additionally, the present invention relates to an optical disk recording thereon information that is multileveled to three or more values, a signal generation method of generating a signal used when accessing the optical disk, and an optical disk device that accesses the optical disk.

2. Description of the Related Art

Recently, with the progress of digital technologies and the advancement of data compression technologies, optical disks such as a CD-ROM (CD) and a DVD-ROM (DVD: digital versatile disk), which has the same diameter as a CD-ROM and can record about seven times as much data as a CD-ROM, have been drawing attentions as media for recording information (hereinafter also referred to as "content(s)") such as music, movies, photographs and computer software. As the prices of such optical disks fall, optical disk devices have been widely used that reproduce contents recorded on optical disks.

A spiral or concentric pit array is formed on a recording surface of a read-only optical disk such as a CD-ROM and a DVD-ROM. Information is recorded by the lengths of pits, the lengths between pits, and combinations of these. In this case, the information is converted into combinations of two kinds of numeric values (binary values), 0 and 1, and is written on an optical disk. Hereinafter, such a recording method is referred to as a binary recording method.

Generally, meandering (wobbling) track is formed on a recording surface of a recordable optical disk such as a CD-R (CD-recordable), a DVD-R (DVD-recordable) and a DVD+R (DVD+recordable) and a rewritable optical disk such as a DVD-RW (DVD-rewritable) and a DVD+RW (DVD+rewritable). The wobble is partially modulated by a predetermined method, and information is added to the modulated portion. For example, in a DVD+R and a DVD+RW (hereinafter also referred to as "the DVD+ system" for convenience), address information is added to such modulated portion by the phase modulation method.

Thus, in an optical disk device corresponding to the DVD+ system, a so-called wobble signal corresponding to the wobble shapes of tracks is detected from the light emitted from a light source and reflected by the tracks, a clock signal and the like are generated from the wobble signal, and phase demodulation is performed on the wobble signal in synchronization with the clock signal, thereby obtaining the address information. Based on the address information and the clock signal etc., the reproduction timing and the recording timing are controlled.

In an optical disk, information is recorded by lengths of mark regions and space regions, each having a different reflectivity from each other, and combinations of them. In this case, information is written on the optical disk by being converted (digitized) into combinations of two kinds of numeric values (binary), 0 and 1. Hereinafter, such a recording method is referred to as the binary recording method.

The amount of information (contents) has been increasing year by year, and it is expected that an optical disk can record a further amount of information. In order to increase the amount of information that can be recorded on an optical disk, it is conceivable to convert information into combinations of three or more kinds of numeric values and write it on an optical disk. Thus, various related techniques have been intensively developed so as to put them into practical use. Hereinafter, conversion of information into combinations of three of more kinds of numeric values is referred to as multileveling, and data subjected to multileveling are referred to as multilevel data. Additionally, a recording method that records information by multileveling in the aforementioned manner is referred to as a multilevel recording method.

In optical disks, because the distance between the adjacent pits (tracks) is short, it is difficult to focus an optical spot formed on a recording surface only on an intended part of the pit array (hereinafter referred to as a "target pit array") or on an intended track (hereinafter referred to as a "target track"). Thus, the optical spot may be partially focused on a part of the pit array (hereinafter simply referred to as "adjacent pit array") which part is adjacent to the target pit array. In this case, cross talk (leakage of unwanted signal) occurs between the target pit array and the adjacent pit array, and the detected signal would be a signal in which a signal from the adjacent pit array is superimposed on a signal from the target pit array. As a result, there is a possibility that the S/N ratio of a desired signal may be decreased. Particularly, in the multilevel recording method, because the influence of cross talk is significant compared to that in conventional binary recording methods, there is a possibility that reproducing timing may be shifted. Hence, an information recording medium has been proposed that is difficult to be influenced by cross talk in the multilevel recording method (for example, refer to Japanese Laid-open Patent Application No. 2003-85774).

However, though the information recording medium disclosed in Japanese Laid-open Patent Application No. 2003-85774 is effective in the cases where sectors are arranged in the CAV (Constant Angular Velocity) method, the ZCAV (Zoned CAV) method, and the ZCLV (Zoned Constant Linear Velocity) method, there is a possibility that this information recording medium may not be able to correspond to the CLV (Constant Linear Velocity) method, which can increase the storage capacity.

SUMMARY OF THE INVENTION

A general object of the present invention is to provide an improved and useful optical disk, clock generation method, and optical disk device in which one or more of the above-mentioned problems are eliminated.

Another and more specific object of the present invention is to provide an optical disk that allows accurate evaluation of the positions at which multilevel information is recorded.

A still another object of the present invention is to provide a clock generation method that can accurately evaluate a reproducing position when reproducing information from an optical disk according to the present invention.

A yet another object of the present invention is to provide an optical disk device that can stably reproduce information recorded on an optical disk according to the present invention.

A further object of the present invention is to provide a signal generation method that can accurately position an access position of an optical disk according to the present invention.

Another object of the present invention is to provide an optical disk device that can stably access the optical disk according to the present invention.

In order to achieve the above-mentioned objects, according to one aspect of the present invention, there is provided an optical disk including:

a recording surface on which a plurality of pits corresponding to multilevel (three level or higher) information is formed as a spiral or concentric pit array, wherein the pit array wobbles periodically, and wherein a plurality of predetermined reference marks, corresponding to a period of the wobble, are included in the pit array.

In an embodiment of the present invention, plural predetermined reference marks are formed with multilevel information such that the reference marks correspond to the period of wobble of a pit array. Hence, it is possible to accurately detect the reference marks without being affected by the wobble. Thus, by referring to the reference marks, it is possible to accurately obtain the positions where multilevel information is recorded.

Additionally, according to another aspect of the present invention, there is provided a clock signal generation method of generating a clock signal used when reproducing information from an optical disk including a recording surface on which a plurality of pits corresponding to multilevel (three level or higher) information is formed as a spiral or concentric pit array, the pit array wobbling periodically, and a plurality of predetermined reference marks, corresponding to a period of the wobble, being included in the pit array, the clock signal generation method including the steps of:

detecting the reference marks included in the pit array of the optical disk based on a reflected light from the recording surface of the optical disk; and generating the clock signal based on the reference marks.

In an embodiment of the present invention, when reproducing information from an optical disk as mentioned above, the reference marks included in the pit array of the optical disk are detected based on the reflected light from the recording surface of the optical disk, and the clock signal is generated based on the reference marks. In this case, because the reference marks are formed to correspond to the period of wobble of the pit array, it is possible to accurately detect the reference marks without being affected by the wobble. Hence, it is possible to accurately generate the clock signal. That is, when reproducing information from an optical disk according to the present invention, it is possible to accurately perform positioning of a reproduction position.

Additionally, according to another aspect of the present invention, there is provided an optical disk device reproducing information from the optical disk including a recording surface on which a plurality of pits corresponding to multilevel (three level or higher) information is formed as a spiral or concentric pit array, the pit array wobbling periodically, and a plurality of predetermined reference marks, corresponding to a period of the wobble, being included in the pit array, the optical disk device including:

a clock signal generation part that detects the reference marks included in the pit array of the optical disk based on a reflected light from the recording surface of the optical disk, and generates a clock signal based on the reference marks; and a reproducing part that reproduces the information recorded on the optical disk by using the clock signal.

In an embodiment of the present invention, when reproducing information from an optical disk as mentioned above, the reference marks included in the pit array of the optical disk are detected by the clock signal generation part based on the reflected light from the recording surface of the optical disk, and the clock signal is generated by the clock signal generation part based on the reference marks. Here, because the reference marks are formed to correspond to the period of wobble of the pit array, the reference marks are accurately detected without being affected by the wobble. Thus, the clock signal is accurately and stably generated. As a result, stable reproduction of information is performed by the reproducing part. That is, it is possible to stably reproduce information recorded on an optical disk according to the present invention.

Additionally, according to another aspect of the present invention, there is provided an optical disk including:

a recording surface on which a spiral or concentric wobbling track is formed, wherein a plurality of predetermined reference marks are formed on the recording surface together with multilevel information (three level or higher) such that the reference marks correspond to a period of the wobble.

In an embodiment of the present invention, plural reference marks are formed together with multilevel information such that the reference marks correspond to the period of wobble of the track. Hence, it is possible to accurately detect the reference marks without being affected by the wobble. Thus, by referring to the reference marks, it is possible to accurately obtain the positions where multilevel information is recorded.

Additionally, according to another aspect of the present invention, there is provided a signal generation method of generating a signal used when accessing an optical disk including a recording surface on which a spiral or concentric wobbling track is formed, a plurality of predetermined reference marks being formed on the recording surface together with multilevel information (three level or higher) such that the reference marks correspond to a period of the wobble, the signal generation method including the steps of:

detecting the reference marks formed in the track of the optical disk based on a reflected light from the recording surface of the optical disk; and generating the clock signal based on the reference marks.

In an embodiment of the present invention, when accessing an optical disk as mentioned above, the reference marks formed in the track of the optical disk are detected based on the reflected light from the recording surface of the optical disk, and the clock signal is generated based on the reference marks. In this case, because the reference marks are formed to correspond to the period of wobble of the track, it is possible to accurately detect the reference marks without being affected by the wobble. Consequently, it is possible to accurately generate the clock signal. That is, it is possible to accurately perform positioning of an accessing position in an optical disk according to the present invention.

Additionally, according to another aspect of the present invention, there is provided an optical disk device accessing an optical disk including a recording surface on which a spiral or concentric wobbling track is formed, a plurality of predetermined reference marks being formed on the recording surface together with multilevel information (three level or higher) such that the reference marks correspond to a period of the wobble, the optical disk device including:

a clock signal generation part that detects the reference marks formed in the track of the optical disk based on a reflected light from the recording surface of the optical disk, and generates a clock signal based on the reference marks; and a reproducing part that reproduces the information recorded on the optical disk by using the clock signal.

In an embodiment of the present invention, when accessing an optical disk as mentioned above, the reference marks formed in the track of the optical disk are detected by the clock signal generation part based on the reflected light from the recording surface of the optical disk, and the clock signal is generated by the clock signal generation part based on the reference marks. Here, because the reference marks are formed to correspond to the period of wobble of the track, the reference marks are accurately detected without being affected by the wobble. Thus, the clock signal is accurately and stably generated. As a result, stable reproduction of information is performed by the reproducing part. That is, it is possible to stably access an optical disk according to the present invention.

Other objects, features and advantages of the present invention will become more apparent from the following detailed description when read in conjunction with the following drawings.

BRIEF DESCRIPTION OF THE DRAWINGS

FIG. 4 is a table for explaining a wobble block;

FIG. 13 is a block diagram showing the structure of an optical disk device according to one embodiment of the present invention;

FIG. 28 is a table for explaining a wobble block;

FIG. 29 is a schematic diagram for explaining cells and pits;

FIG. 37 is a block diagram showing the structure of an optical disk device according to one embodiment of the present invention;

DETAILED DESCRIPTION OF THE PREFERRED EMBODIMENTS

Figure 1A:
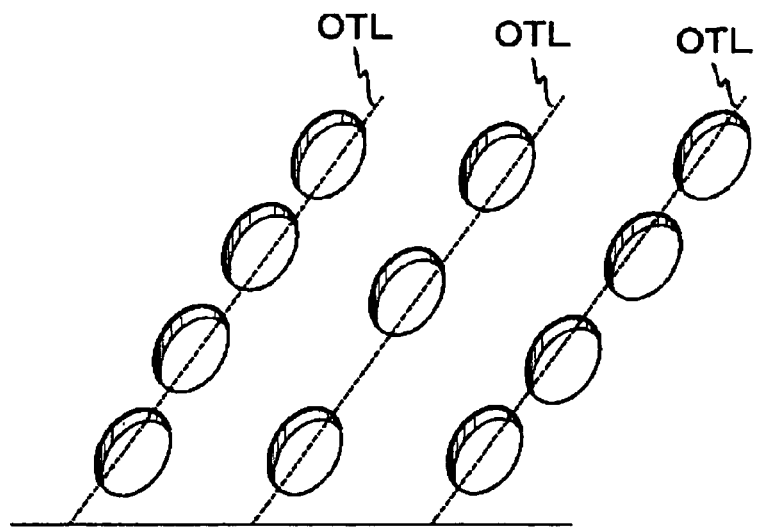
FIGS. 1A and 1B are schematic diagrams for explaining a recording surface of an optical disk according to one embodiment of the present invention.
Figure 1B:
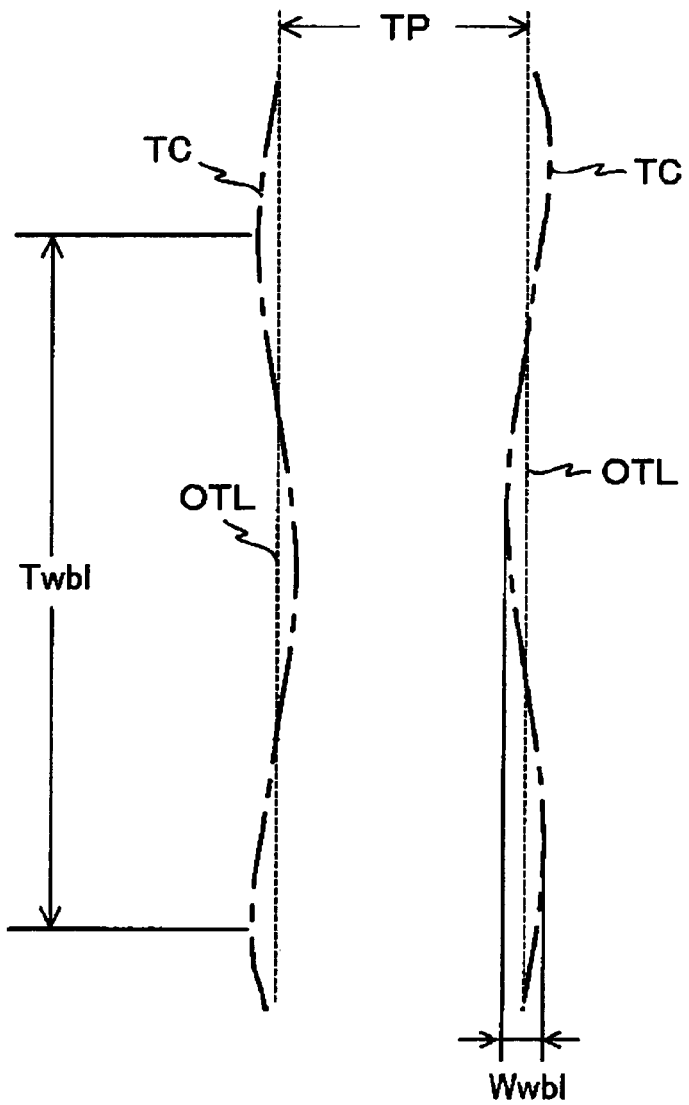

Referring to FIGS. 1 through 17, a description is given of one embodiment of the present invention. FIGS. 1A and 1B show a recording surface of an optical disk 15 according to one embodiment of the present invention.

A spiral pit array is formed on the recording surface of the optical disk 15 such that the pit array meanders (wobbles) periodically.

The optical power center (hereinafter referred to as "spot center") formed at the time of reproduction is positioned at substantially the center of a pit array that is assumed to be not wobbling. Accordingly, as shown in FIG. 1B, the path (trajectory) of the spot center OTL does not match a line TC that runs through the center of the wobbling pit array. That is, at the time of reproduction, the spot center may be shifted from the center position of the pit array.

Here, the period of wobbling of the pit array is referred to as the wobble period (Twbl), and the distance between the OTLs of the adjacent pit arrays is referred to as a pit array pitch (TP). Further, the amplitude of wobble (Wwbl) of the pit array is referred to as a wobble amplitude. In this embodiment, for example, Twble=5 μm and TP=0.74 μm as in a commercially available DVD. The wobble amplitude Wwbl is described later.

Figure 2:
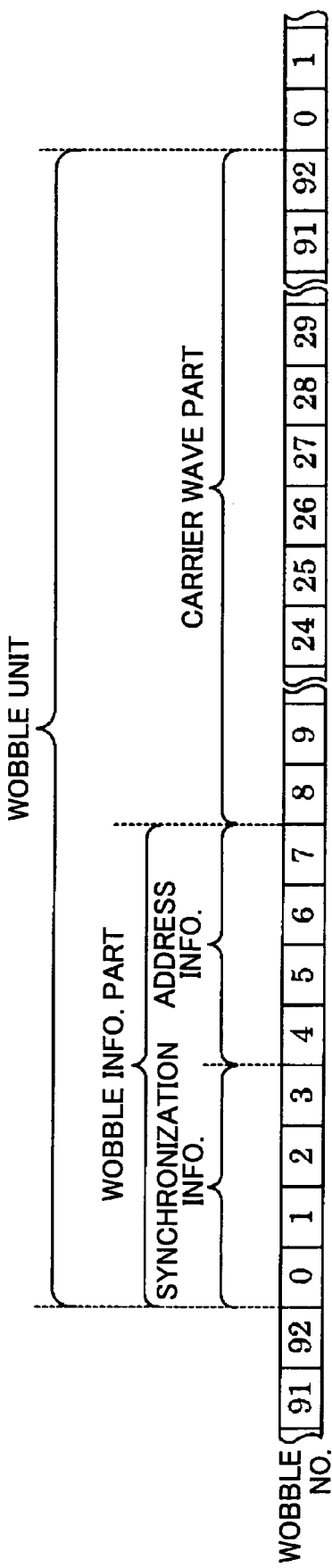
FIG. 2 is a schematic diagram for explaining a wobble unit.

The wobble shape of the pit array is determined by information to be added (hereinafter also referred to as "wobble information") and a carrier wave. In this embodiment, as shown in FIG. 2 as an example, it is assumed that a basic unit (hereinafter referred to as a "wobble unit") consisting of a part corresponding to wobble information (hereinafter referred to as a "wobble information part") and a part corresponding to the carrier wave (hereinafter referred to as a "carrier wave part") includes 93 wobbles (wobble No. 0 through wobble No. 92), where 1 wobble corresponds to one period (wobble period) of the carrier wave. Additionally, it is assumed that, in one wobble unit, wobble No. 0 through wobble No. 7 constitute the wobble information part, and wobble No. 8 through wobble No. 92 constitute the carrier wave part. It should be noted that the wobble information part is subjected to PSK (Phase Shift Keying) according to its content.

In a region to which addresses are assigned, the wobble information part consists of synchronization information and address information. Here, as shown in FIG. 2, wobble No. 0 through wobble No. 3 correspond to the synchronization information, and wobble No. 4 through wobble No. 7 correspond to the address information.

The address information represents 1 bit data (hereinafter simply referred to as "bit data") by four wobbles. When the bit data are "0", as indicated by a wobble shape B in FIG. 3, the first two wobbles have the same phase as the carrier wave, and the last two wobbles have the opposite phase of the carrier wave. On the other hand, when the bit data are "1", as indicated by a wobble shape C in FIG. 3, the first two wobbles have the opposite phase of the carrier wave, and the last two wobbles have the same phase as the carrier wave.

Figure 3:
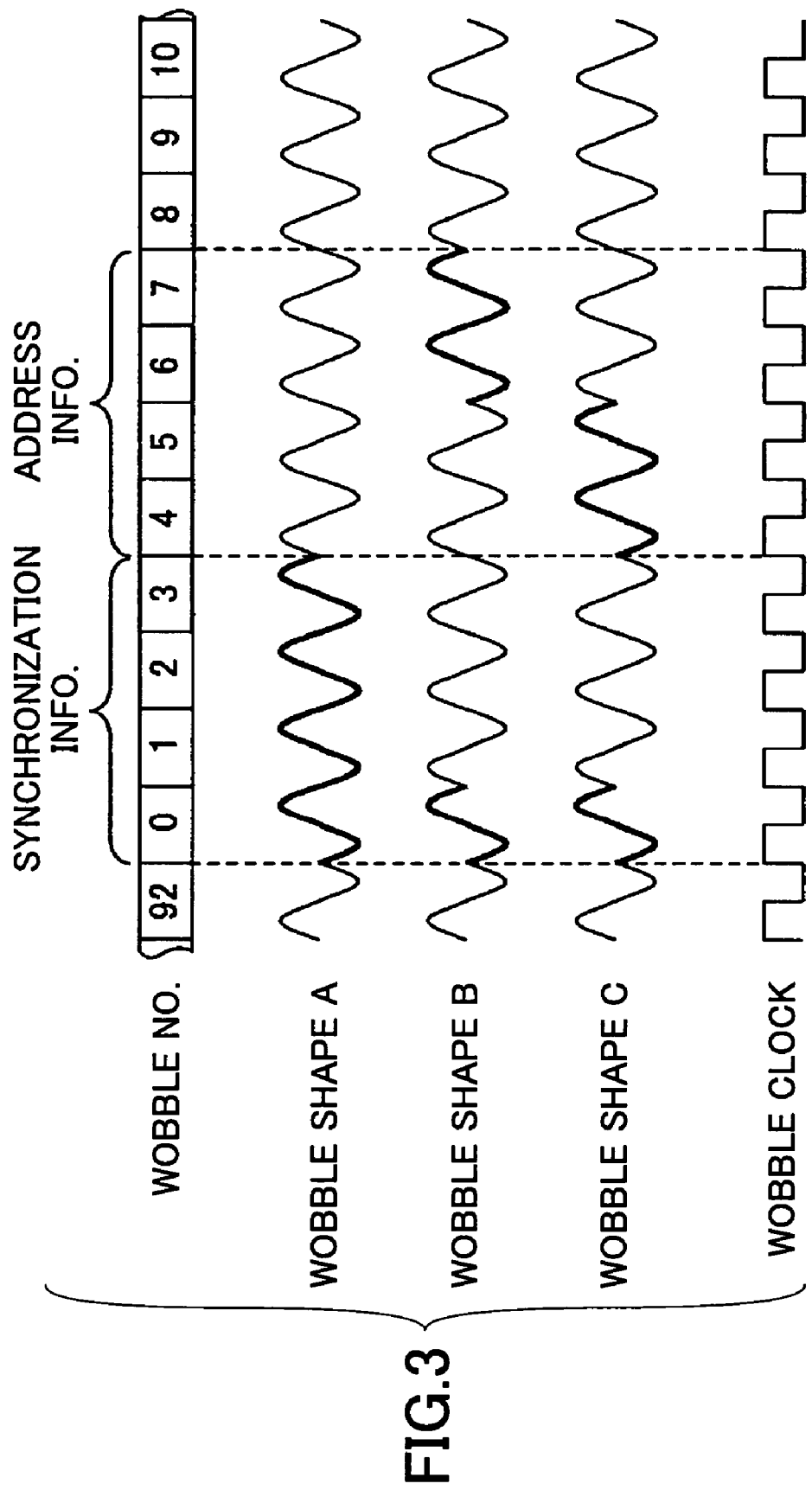
FIG. 3 is a schematic diagram for explaining phase modulation in a wobble information part.

As for the synchronization information, in the case where the first bit data of address data are stored in the address information of the next wobble unit, as indicated by a wobble shape A in FIG. 3, word sync information, that is, all of the four wobbles have the opposite phase of the carrier wave. In addition, in the case where bit data are stored in the address information, as indicated by the wobble shapes B and C in FIG. 3, bit sync information, that is, the first wobble has the opposite phase of the carrier wave, and the rest three wobbles have the same phase as the carrier wave.

In the case where, for example, 51 sets of bit data are required as address data, as shown in FIG. 4, one set of address data are obtained from 52 wobble units. It should be noted that the obtained address data are physical address (absolute address). Further, hereinafter, a set of wobble units corresponding to one set of physical address is referred to as one wobble block. Thus, here, 1 wobble block=52 wobble units.

In a region not requiring address data, instead of the address information, information related to the optical disk 15 such as vendor information, that is, a so-called media parameter is added as the wobble information.

It is assumed that, as an example, the optical disk 15 corresponds to a laser beam having a wavelength of approximately 660 nm, and data are recorded thereon according to the multilevel recording method. Additionally, it is assumed that the recorded data are multileveled into eight values (0 through 7). Further, it is assumed that, when modulating the recorded data, bandwidth limiting is performed as in the binary recording method. Bandwidth limiting is to limit the patterns of data sequences when modulating the recorded data so as to prevent, in a reproduction signal, generation of a signal having a frequency close to the frequency (5 KHz or less) of a servo signal.

Figure 5:
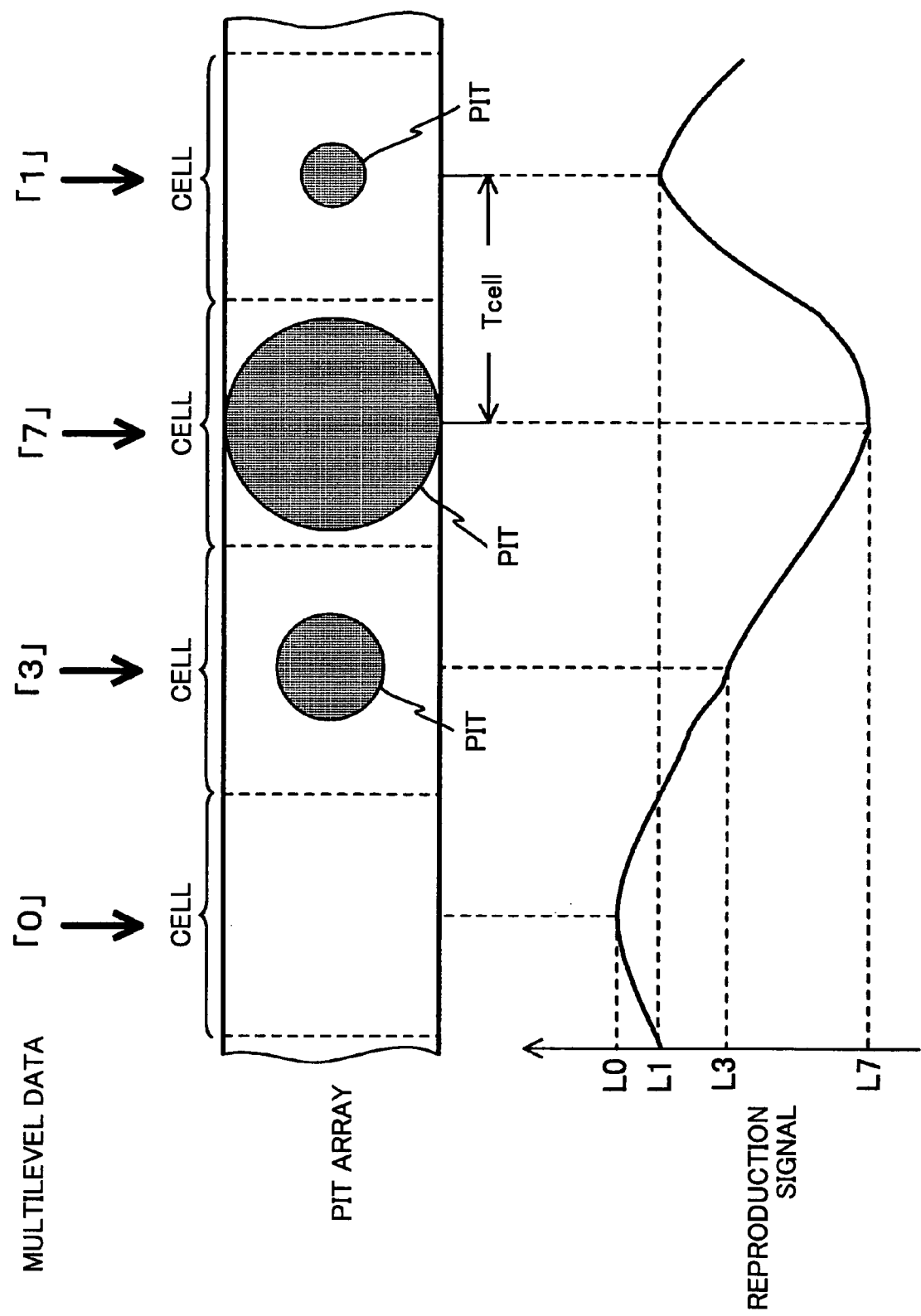
FIG. 5 is a schematic diagram for explaining cells and pits.

As shown in FIG. 5 as an example, in the multilevel recording method, a pit array is virtually divided into plural regions (hereinafter also referred to as "cells") at every predetermined length with respect to the tangential direction of the pit array. One cell stores one set of multilevel data. When the value of the set of multilevel data is 1 through 7, a pit having an area corresponding to the value is formed in the middle portion of the cell. When the value of the set of multilevel data is 0, a pit is not formed.

The distance between the centers of the adjacent cells is called a cell period (Tcell). In order to simplify the configuration of a clock signal generation circuit, which is described below, it is preferable that the relationship between the wobble period and the cell period is such that the wobble period is an integral multiple of the cell period. It should be noted that the wobble period may be 0.25 times or 0.5 times the cell period as long as 2 to 4 wobble periods match an integral multiple of the cell period.

In a part where the pits are formed, the larger the pit area is, the lower the reflectivity of the laser beam becomes. Hence, as shown in FIG. 5, a reproduction signal (RF signal) generated from the laser beam that is reflected by the recording surface of the optical disk 15 reaches the highest level (L0) when the value of the multilevel data is 0, and reaches the lowest level (L7) when the value of the multilevel data is 7. It should be noted that the signal levels are represented as L1 through L6 when the values of the multilevel data are 1 through 6, respectively.

Here, a description is given of the wobble amplitude Wwbl.

Figure 6B:
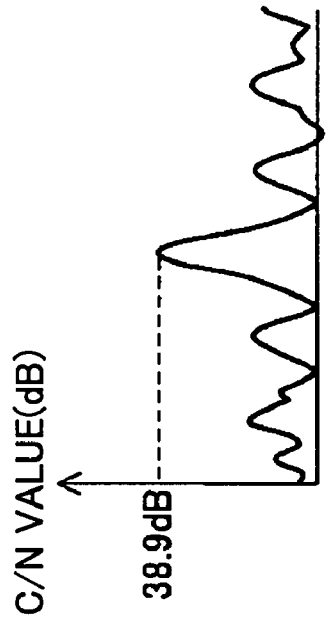
FIGS. 6A, 6B and 6C are waveform charts showing the signal quality of a wobble signal.
Figure 6A:
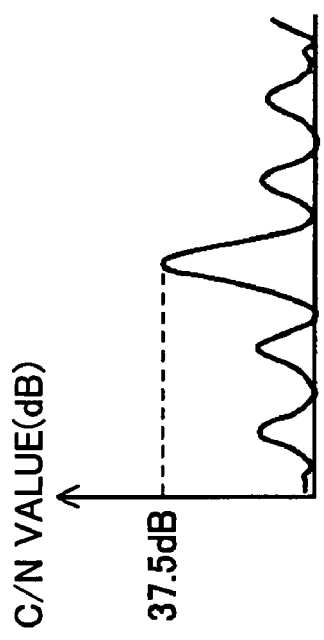
Figure 6C:
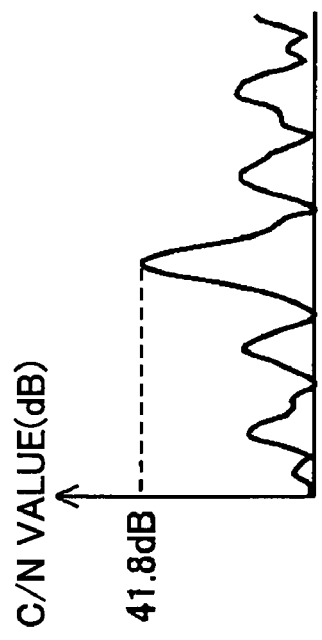

FIGS. 6A, 6B, 6C and 7 show examples of the measurement result of a C/N (carrier/noise) value, which represents the signal quality of a wobble signal. FIG. 6A shows C/N values of the wobble signal obtained from a region in which recording was made by the binary recording method. FIGS. 6B and 6C show C/N values of the wobble signal obtained from regions in which recording was made by the multilevel (8 value) recording method. Here, FIG. 6B shows the case where bandwidth limiting was not performed when modulating recorded data. FIG. 6C shows the case where bandwidth limiting was performed. It should be noted that, in FIGS. 6A through 6C, recording was made on the same optical disk in the same clock cycles.

Figures 7, 8:
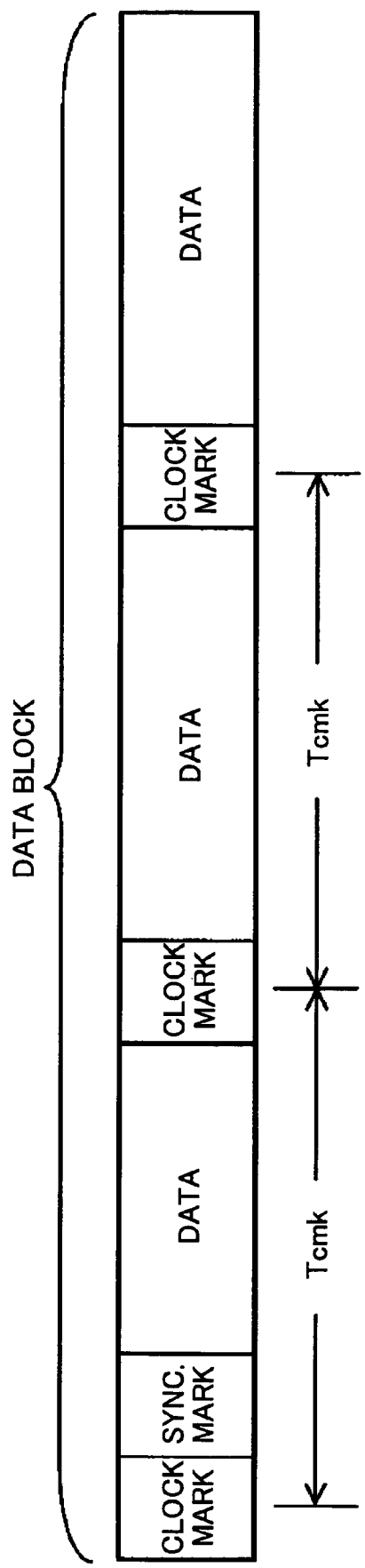
FIG. 7 is a table for explaining the difference in the signal quality of the wobble signal depending on the recording method.
FIG. 8 is a schematic diagram for explaining the structure of a data block.

According to the measurement results, as shown in FIG. 7, quality degradation of the wobble signal is less in the multilevel recording method than that in the binary recording method. In the binary recording method (e.g., DVD+RW), data are recorded by using marks and spaces having lengths of 3T to 14T (T: clock cycle). Hence, when there are consecutive marks and spaces having lengths of about 5T or more, the reproduction signal varies at substantially the maximum amplitude. On the other hand, in the multilevel recording method (here, 8 value), the reproduction signal varies at the maximum amplitude only in the case where the lowest level L7 continues immediately after the highest level L0 continues and in the reverse case. That is, in the multilevel recording method, the reproduction signal varies at the maximum amplitude less frequently than that in the binary recording method. Hence, leakage of the reproduction signal to the wobble signal is less in the multilevel recording method than that in the binary recording method. Thus, degradation of the signal quality of the wobble signal is reduced.

Thus, in an optical disk using the multilevel recording method, it is possible to reduce the wobble amplitude than that in an optical disk using the binary recording method. For example, in a DVD+RW using the binary recording method, the wobble amplitude is ±4% of a track pitch. Thus, in an optical disk using the multilevel recording method, if the wobble amplitude is about ±2.4% of a pit array pitch in the case where bandwidth limiting is performed, and if the wobble amplitude is ±3.4% of a pit array pitch in the case where bandwidth limiting is not performed, it is possible to obtain the wobble signal comparable with that in the binary recording method. Hence, in this embodiment, since the pit array pitch TP is 0.74 μm and bandwidth limiting is performed, the wobble amplitude Wwbl is set to ±17.8 nm.

As mentioned above, because it is possible to reduce the wobble amplitude in the multilevel recording method than that in the binary recording method, wobble components leaking to the reproduction signal are decreased. Thus, it is possible to reduce degradation of the quality of the reproduction signal due to wobble components.

Next, a description is given of the data format of data recorded on the optical disk 15. Assuming that a set of data corresponding to one address (logical address) form one data block, then in this embodiment, as shown in FIG. 8 as an example, three clock marks (hereinafter also referred to as "CMs"), serving as three reference marks, are inserted at regular intervals. Hereinafter, the interval at which a CM is inserted is also called a CM period (Tcmk). In addition, a synchronization mark, which indicates a segment of information, is arranged between the first CM and data.

Figure 9:
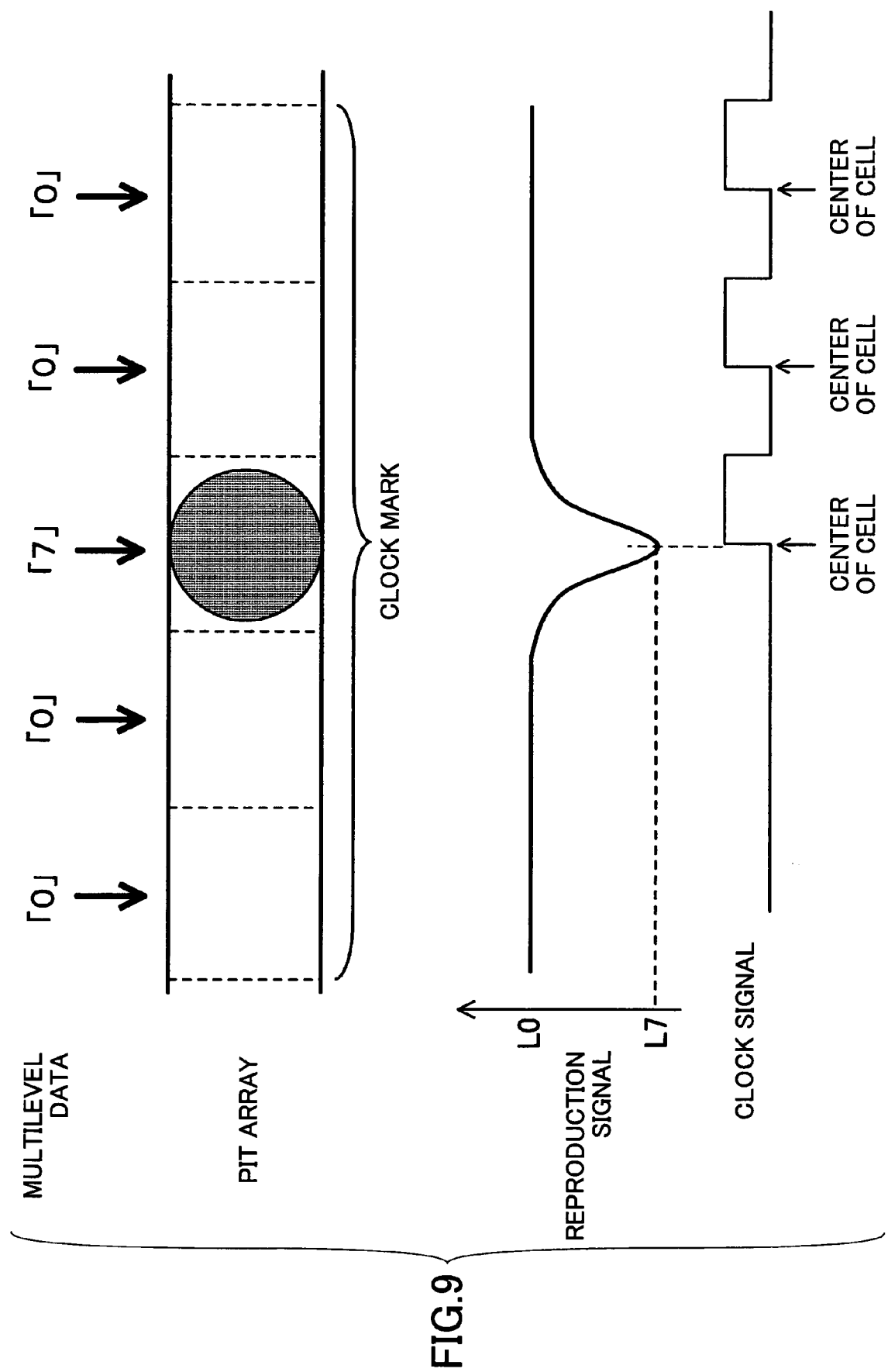
FIG. 9 is a schematic diagram for explaining a clock mark (CM)

The CM is a mark for specifying the center position of a cell. Here, as shown in FIG. 9 for example, a multilevel data string "00700" is used. That is, a CM has a size of five cells, the third cell thereof includes a pit having the maximum area, and the other cells do not include a pit. As shown in FIG. 9, the reproduction signal of the CM (hereinafter also referred to as a "CM signal" for convenience) becomes a "V-shape" signal that includes a bottom value (L7) corresponding to the center of the third cell. Accordingly, because two cells, each storing a fixed value (here, 0), exist before and after the middle cell, even if, for example, the size of a cell is small with respect to the spot diameter of an optical beam, a CM is readily detected, and it is possible to specify the center position of the cell from the timing that indicate the bottom value (L7).

Figure 10:
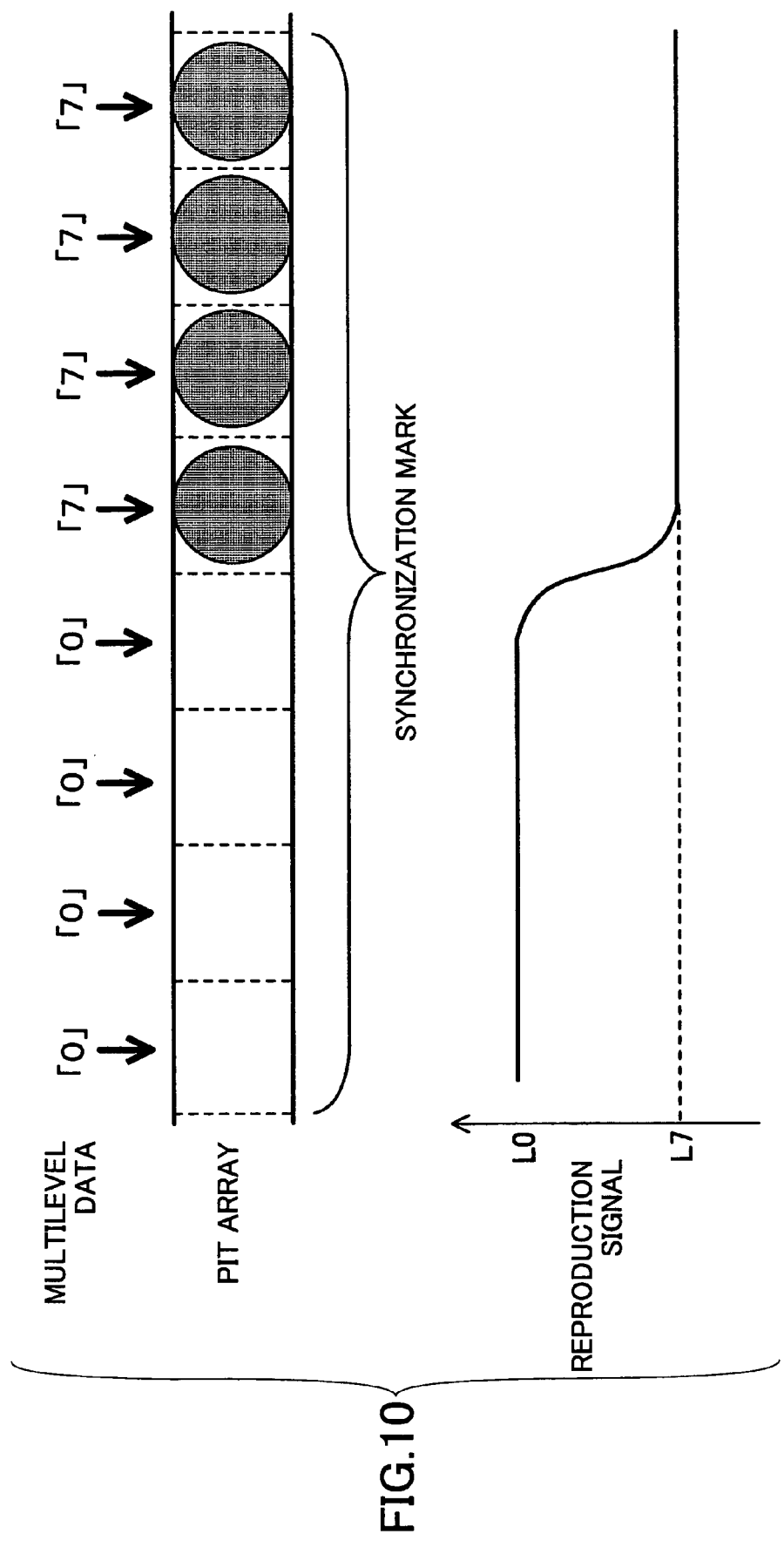
FIG. 10 is a schematic diagram for explaining a synchronization mark.

As shown in FIG. 10 for example, a multilevel data string "00007777" is used as the synchronization mark. The pattern of the multilevel data string is a pattern that does not appear in user data. The reproduction signal of the synchronization mark is, as shown in FIG. 10, a signal being at the highest level (L0) for four cells and at the lowest level (L7) for four cells. Accordingly, the synchronization mark is readily detected and it is possible to obtain, for example, the starting position of information.

The physical address added to a wobble signal and the logical address recorded as data in a pit array must be uniquely associated with respect to the absolute position in an optical disk. In order to secure such association, it is necessary that the length of one data block (hereinafter also referred to as "data block length") and the length of one wobble block (hereinafter also referred to as "wobble block length") are in a predetermined relationship. For example, in the case where the data block length and the wobble block length are equal to each other, the physical address and the logical address are readily associated with each other. Additionally, even if both block lengths are not equal to each other, in the case where, for example, 2 wobble blocks correspond to one data block, the physical address and the logical address are readily associated with each other.

Further, when detecting the CM, the wobble signal becomes noise components, and when detecting the wobble signal, the CM becomes noise components.

Hence, a regular relationship is made between the CM period Tcmk and the wobble period Twbl so that the physical address and the logical address are readily associated with each other and that the CM and the wobble signal are detected with a good accuracy. Here, with reference to FIG. 11, a description is given of the relationship between m and n, where m=Tcmk/Tcell and n=Twbl/Tcell. It should be noted that, in FIG. 11, for convenience, illustration is made as if the wobble period Twbl varies. However, here, CM period Tcmk varies.

(When m=n)

When m=n, a CM may be arranged at a position where the phase of wobbling becomes always the same.

Figure 11:
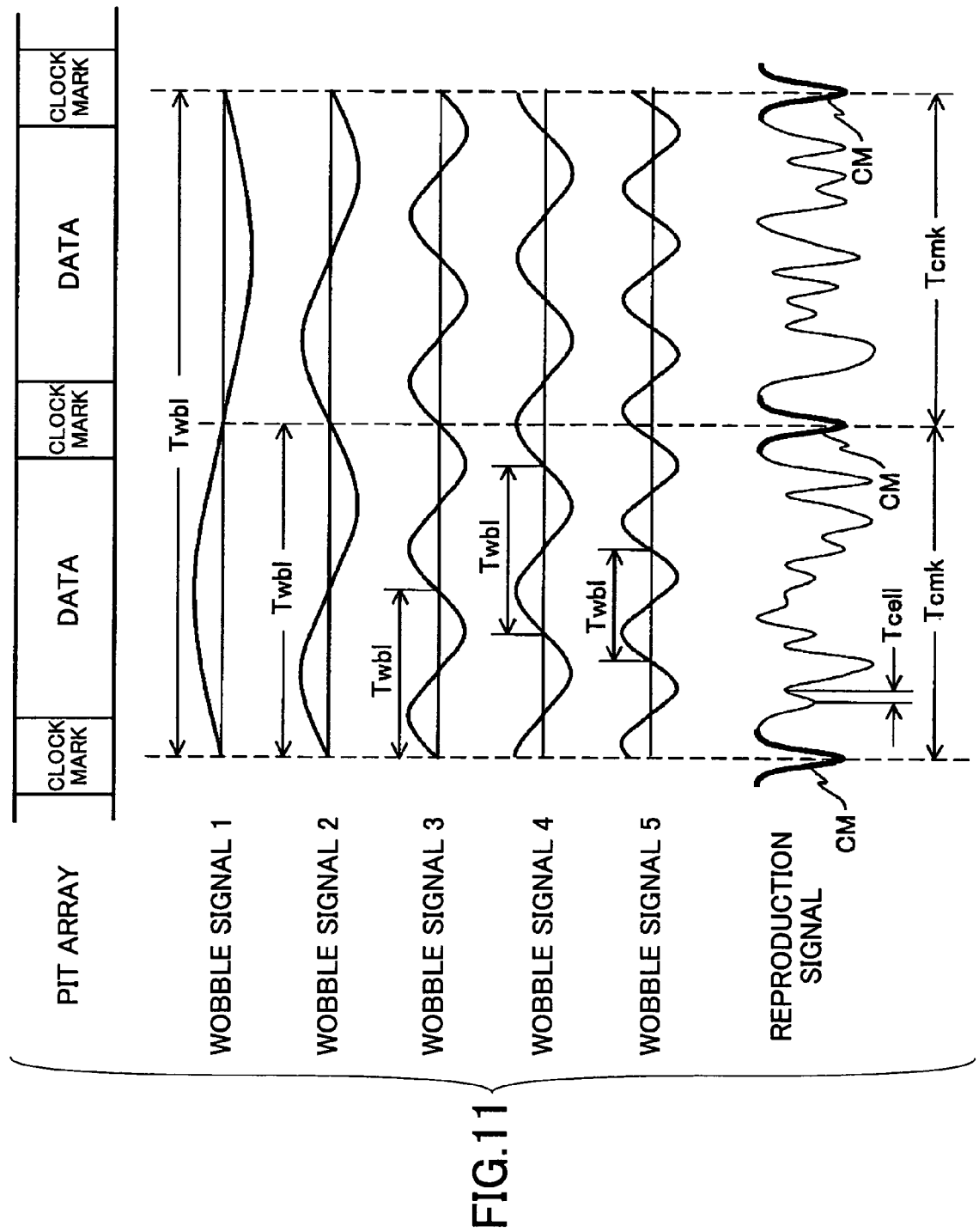
FIG. 11 is a schematic diagram for explaining the relationship between a wobble period and a CM period.

As indicated by a wobble signal 2 in FIG. 11, in the case where CMs are arranged at positions where the wobble phase becomes 0 degree, the spot center at the CM positions is always located in the middle of a pit array. Thus, when detecting the CMs, noise due to the wobble signal is decreased. Hence, it is possible to accurately detect the CMs. In addition, when detecting the wobble signal, noise due to the CMs is decreased. Hence, it is possible to accurately detect the wobble signal. The same applies to the case where the CMs are arranged at positions where the wobble phase becomes 180 degrees.

In the case where CMs are arranged at positions where the wobble phase becomes 90 degrees or 270 degrees, the spot center is shifted from the middle of a pit array. However, the shift amount is substantially constant. In this case, noise due to the wobble signal when detecting CMs is not small. However, since the noise is at substantially the same noise level, it is possible to readily remove the noise components by obtaining the noise level in advance. Similarly, noise due to CMs when detecting the wobble signal is not small. However, since the noise is at substantially the same noise level, it is possible to readily remove the noise components by obtaining the noise level in advance. Accordingly, it is possible to accurately detect both CMs and wobble signal.

Further, in the case where multilevel data having a pattern with which the CM signal and the wobble signal become similar, it is preferable that CMs are arranged at positions where the wobble phase becomes 90 degrees or 270 degrees. Normally, when generating a clock signal from the wobble signal, it is based on the level of the amplitude center of the wobble signal. Hence, when the CM signal and the wobble signal are similar to each other, if CMs are arranged at positions where the wobble phase becomes 0 degree or 180 degrees, the level of the amplitude center varies due to leakage of the CM signal, and the accuracy of the clock signal may be degraded. However, when CMs are arranged at positions where the wobble phase becomes 90 degrees or 270 degrees, even if the CM signal and the wobble signal are similar to each other, it is possible to make a variation in the level of the amplitude center small.

Additionally, CMs may be arranged at positions where the wobble phase becomes 45 degrees or 135 degrees. In this case, similar to the case where CMs are arranged at positions where the wobble phase becomes 90 degrees or 270 degrees, it is possible to readily remove the noise components. Hence, it is possible to accurately detect both CMs and wobble signal.

(When $m=n/2$)

When $m=n/2$, two CMs are inserted in one wobble period. Also in this case, CMs may be arranged at positions where the wobble phase becomes always the same.

As indicated by the wobble signal 1 in FIG. 11, in the case where CMs are arranged at positions where the wobble phase becomes 0 degree and 180 degrees, the spot center at the CM positions is always located in the middle of a pit array. Accordingly, when detecting CMs, noise due to the wobble signal becomes small. Thus, it is possible to accurately detect the CMs. In addition, when detecting the wobble signal, noise due to CMs becomes small. Thus, it is possible to accurately detect the wobble signal.

Further, in this case, insertion frequency of CMs becomes high, and it is necessary to reduce the length of each CM so as to reserve storage capacity for data. Hence, there is no possibility that the CM signal and the wobble signal are used in similar patterns. Thus, there is no advantage in arranging CMs at positions where the wobble phase becomes 90 degrees or 270 degrees.

Additionally, in this case, the period of the clock signal obtained from CMs becomes equal to the period of the clock signal obtained from the wobble signal. Hence, in a clock signal generation circuit, which is described below, it is possible to make each parameter in a PLL circuit the same. Thus, control can be readily performed.

(When $m=a \times n$)

When $m=a \times n$ (a: integer), one CM is inserted in "a" wobble periods. Also in this case, CMs may be arranges at positions where the wobble phase becomes always the same. Wobble signals 3 and 4 in FIG. 11 show examples in the case where a=2. A wobble signal 5 in FIG. 11 shows an example in the case where a=3.

As indicated by the wobble signal 3 in FIG. 11, in the case where CMs are arranged at ones of the positions where the wobble phase becomes 0 degree, the spot center at the CM positions is always located in substantially the middle of a pit array. Accordingly, when detecting CMs, noise due to the wobble signal becomes small. Thus, it is possible to accurately detect the CMs. Additionally, when detecting the wobble signal, noise due to the CMs becomes small. Thus, it is possible to accurately detect the wobble signal. Further, the same applies to the case where CMs are arranged at ones of positions where the wobble phase becomes 180 degrees.

In addition, as indicated by the wobble signal 4 in FIG. 11, in the case where CMs are arranged at ones of positions where the wobble phase becomes 90 degrees, the spot center is shifted from the middle of a pit array. However, the shift amount is substantially constant. In this case, noise due to the wobble signal when detecting CMs is not small, but the noise level is always substantially the same. Hence, it is possible to readily remove the noise components by obtaining the noise level in advance. Similarly, noise due to CMs when detecting the wobble signal is not small, but the noise level is always substantially the same. Hence, it is possible to readily remove the noise components by obtaining the noise level in advance. Accordingly, it is possible to accurately detect both CMs and wobble signal. Further, the same applies to the case where CMs are arranged at ones of positions where the wobble phase becomes 270 degrees.

Additionally, as indicated by the wobble signal 5 in FIG. 11, in the case where CMs are arranged at ones of positions where the wobble phase becomes 45 degrees, the spot center is shifted from the middle of a pit array. However, the shift amount is substantially constant. In this case, similar to the case where CMs are arranged at ones of positions where the wobble phase becomes 90 degrees, it is possible to readily remove the noise components. Hence, it is possible to accurately detect both CMs and wobble signal. Further, the same applies to the case where CMs are arranged at ones of positions where the wobble phase becomes 135 degrees, 225 degrees, and 315 degrees.

Figure 12A:
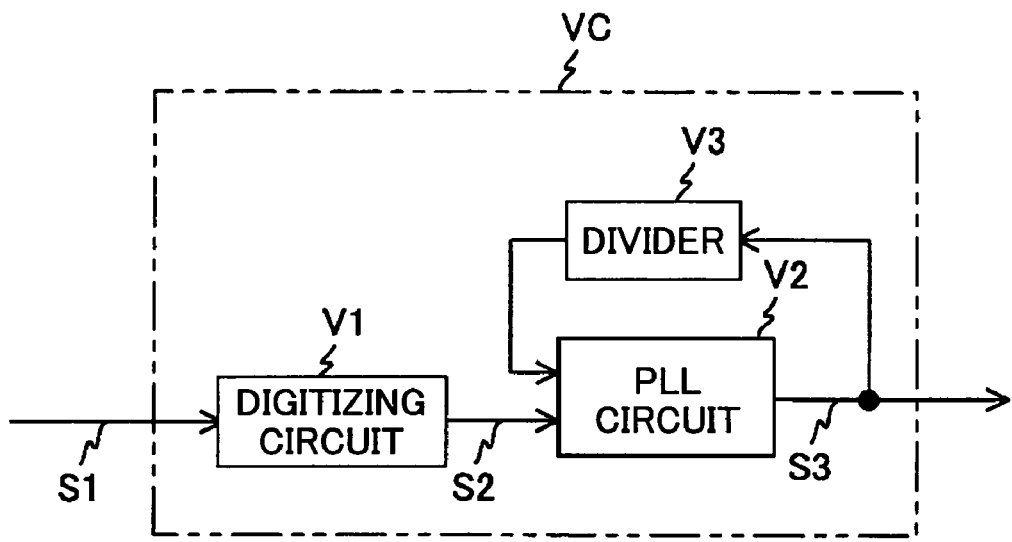
FIG. 12A is a block diagram for explaining a virtual clock signal generation circuit used for simulation of the relationship between an edge period and clock jitter.
Figure 12B:
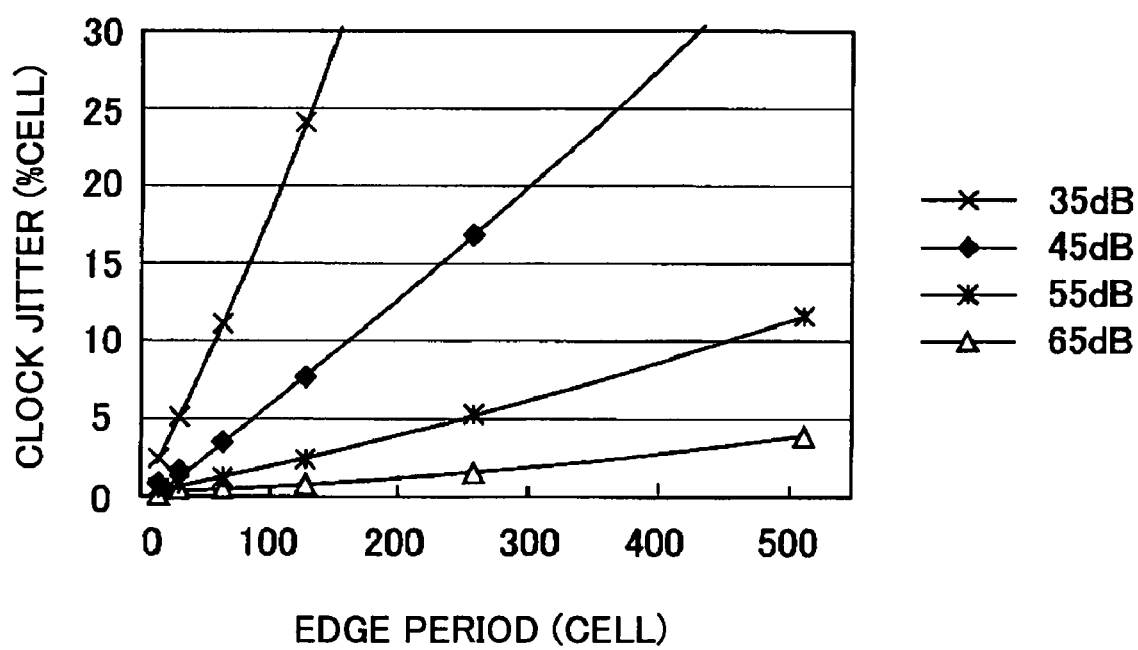
FIG. 12B is a graph for explaining the simulation results.

Each of a reproduction clock signal generated from CMs and a reference clock signal generated from the wobble signal must be stable within a permissible accuracy range. Thus, there is a limitation on the value of "a". Therefore, by using a virtual clock signal generation circuit VC as shown in FIG. 12A, jitter (hereinafter also referred to as "clock jitter") in the generated clock signal was obtained by simulation. The clock signal generation circuit VC includes a digitization circuit V1 digitizing an input signal S1, a PLL circuit V2 generating a clock signal S3 based on the signal S2 that is digitized in the digitization circuit V1, and a divider V3 dividing the clock signal S3 and producing the signal whose phase is compared with that of the signal S2 in the PLL circuit. The PLL circuit V2 possesses general characteristics: cell frequency is 25 MHz and crossover frequency is approximately 2.6 kHz. FIG. 12B shows, as examples of the simulation result, the relationship between the period of the signal S2 (hereinafter also-referred to as "edge period") and the clock jitter in the clock signal S3 for each signal quality of the signal S1.

Referring to cases of recordable CDs and DVDs that are currently commercially available, the quality of the wobble signal is about 45 dB (when unrecorded). Additionally, experience shows that permissible jitter of a reference signal should be 5% or less of the cell period. Therefore, assuming that the signal S1 is the wobble signal, it is observed from FIG. 12B that the period of the signal S2 should be 80 cells or less based on the quality of the wobble signal and the condition of jitter. Since phase comparison can be performed by the rising edge and the falling edge in the case of the wobble signal, the wobble period may be expanded up to 160 cells. Further, in terms of band separation from multilevel data, it is preferable that the wobble period be 1/10 or less of the frequency of the minimum repeating pattern in which data vary for each cell. That is, it is preferable that the wobble period be 20 times or more the cell period. Accordingly, n (=Twbl/Tcell) is an integer from 20 to 160. It should be noted that, in a recorded region, the quality of the wobble signal may vary depending on how recording is made.

The quality of the CM signal is higher than that of the wobble signal and 55 dB or higher is obtained. Additionally, experience shows that permissible jitter of the reproduction clock signal should be 5% or less of the cell period. Therefore, assuming that the signal S1 is the CM signal, it is observed from FIG. 12B that the period of the signal S2 should be 260 cells or less based on the quality of the CM signal and the condition of jitter. However, when the insertion frequency of CM is increased, though detection accuracy of CM may be improved, the amount of information (data) is decreased. Hence, it is desirable that the ratio of CM in the total amount of information be within 10%. Accordingly, m (=Tcmk/Tcell) is an integer from 50 to 260. Thus, the maximum value of "a" is 13 (=260/20)

That is, as for the relationship between m and n, one of "m=n", "m=n/2", and "m=n×a" should be satisfied.

FIG. 13 shows the general structure of an optical disk device 20 according to one embodiment of the present invention. The optical disk device 20 shown in FIG. 13 includes: a spindle motor 22 for rotating the optical disk 15; an optical pickup device 23; a seek motor 21 for driving the optical pickup device 23 in a sledge direction; a laser control circuit 24; an encoder 25; a servo control circuit 26; a reproduction signal processing circuit 28; a buffer RAM 34; a buffer manager 37; an interface (I/F) 38; a flash memory 39; a CPU 40; and a RAM 41. It should be noted that the arrows shown in FIG. 13 indicate typical flow of signals or information, and do not indicate all relationships between each block. Additionally, the optical disk device 20 can also correspond to recordable optical disks (for example, a DVD-R, a DVD-RW, a DVD+R, and a DVD+RW).

Figure 14A:
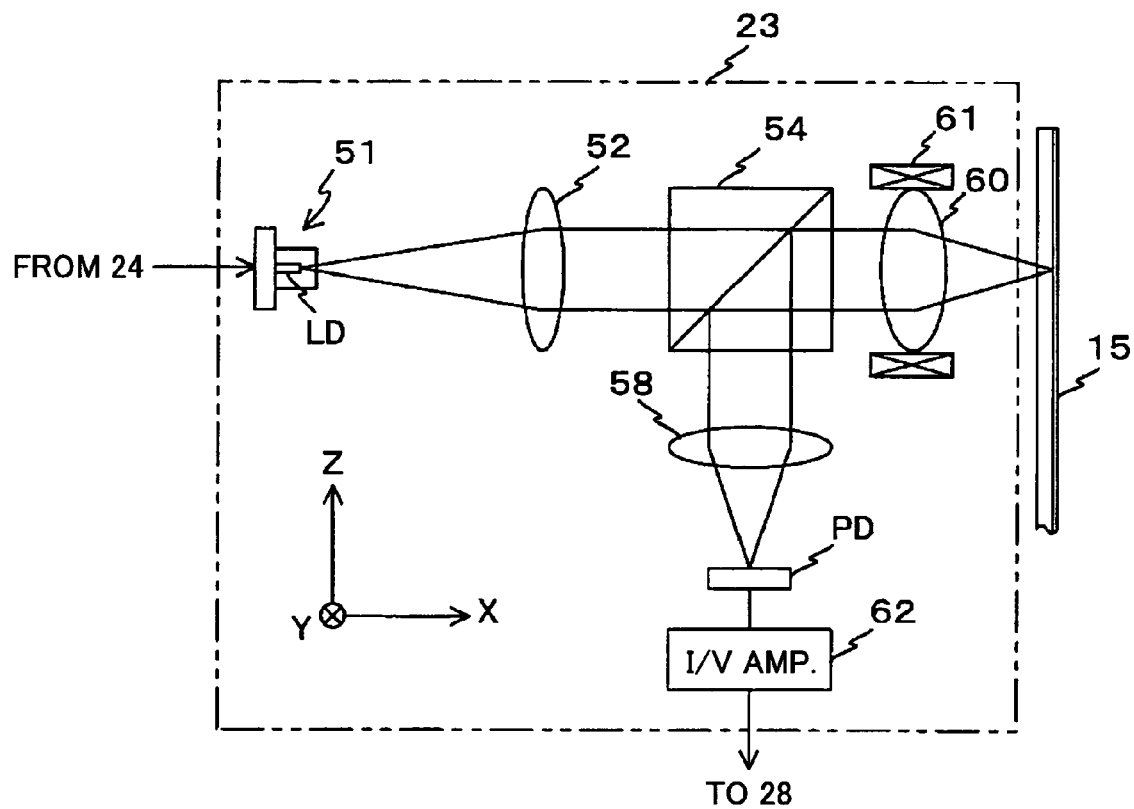
FIG. 14A is a schematic diagram for explaining the structure of the optical pickup device shown in FIG. 13.

The optical pickup device 23 is a device for emitting a laser beam on a recording surface of the optical disk 15 and receiving the reflected beam from the recording surface. As shown in FIG. 14A for example, the optical pickup device 23 includes a light source unit 51, a coupling lens 52, a beam splitter 54, an objective lens 60, a detection lens 58, a photoreceiver PD, an I/V amplifier 62, and a drive system 61 for driving the objective lens 60.

The light source unit 51 includes a semiconductor laser LD as the light source that emits laser light having a wavelength of approximately 660 nm. It should be noted that, in this embodiment, the maximum intensity emitting direction of the laser light emitted from the light source unit 51 is +X direction. The coupling lens 52 is arranged on the +X side of the light source unit 51. The light emitted from the light source unit 51 is made substantially parallel by the coupling lens 52.

The beam splitter 54 is arranged on the +X side of the coupling lens 52. The beam splitter 54 transmits the light from the coupling lens 52 as is, and directs the light (returning light) reflected by the optical disk 15 in the −Z direction. The objective-lens 60 is arranged on the +X side of the beam splitter 54. The objective lens 60 focuses the light that passes through the beam splitter 54 onto the recording surface of the optical disk 15.

Figure 14B:
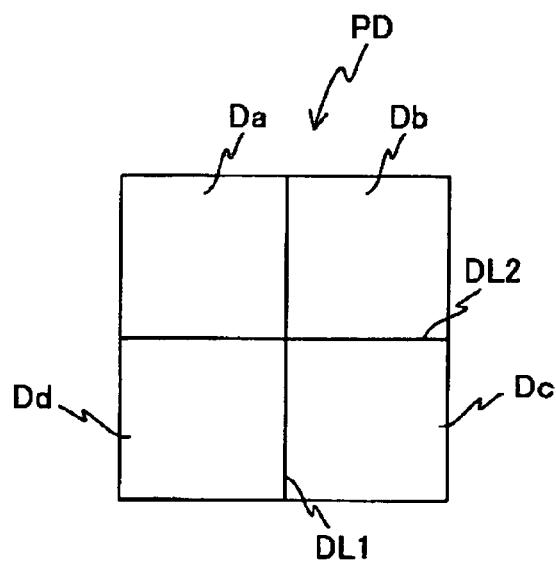
FIG. 14B is a schematic diagram for explaining a photoreceiver shown in FIG. 14A.

The detection lens 58 is arranged on the −Z side of the beam splitter 54. The detection lens 58 focuses, onto an acceptance surface of the photoreceiver PD, the returning light that is directed in the −Z direction by the beam splitter 54. As shown in FIG. 14B for example, the acceptance surface of the photoreceiver PD is divided into four regions (acceptance regions Da, Db, Dc and Dd) by a dividing line (DL1) extending in a direction corresponding to a tangential direction of a pit array of the optical disk 15 and by a dividing line (DL2) that is orthogonal to the dividing line DL1. Each of the acceptance regions generates a signal in accordance with the amount of received light by photoelectric conversion.

The I/V amplifier 62 converts the signal from each of the acceptance regions of the photoreceiver PD into a voltage signal, amplifies it by a predetermined gain, and outputs it to the reproduction signal processing circuit 28.

The drive system 61 includes: a focusing actuator for minutely driving the objective lens 60 in a focusing direction, which is the optical axis direction of the objective lens 60; and a tracking actuator for minutely driving the objective lens 60 in a tracking direction, which is a direction that is orthogonal to a tangential direction of a pit array.

Referring again to FIG. 13, the reproduction signal processing circuit 28 includes, for example, a servo signal detection circuit 28b, a wobble signal detection circuit 28c, a RF signal detection circuit 28d, a decoder 28e, a clock signal generation circuit 28f, and a demodulation circuit 28g.

The servo signal detection circuit 28b detects a servo signal, such as a focus error signal and a track error signal, based on the output signal of the I/V amplifier 62. The detected servo signal is output to the servo control circuit 26.

The RF signal detection circuit 28d detects a RF signal based on the output signal of the I/V amplifier 62. The detected RF signal is output to the clock signal generation circuit 28f and the decoder 28e.

The wobble signal detection circuit 28c detects a wobble signal based on the output signal of the I/V amplifier 62. The detected wobble signal is output to the clock signal generation circuit 28f and the demodulation circuit 28g.

Figure 15:
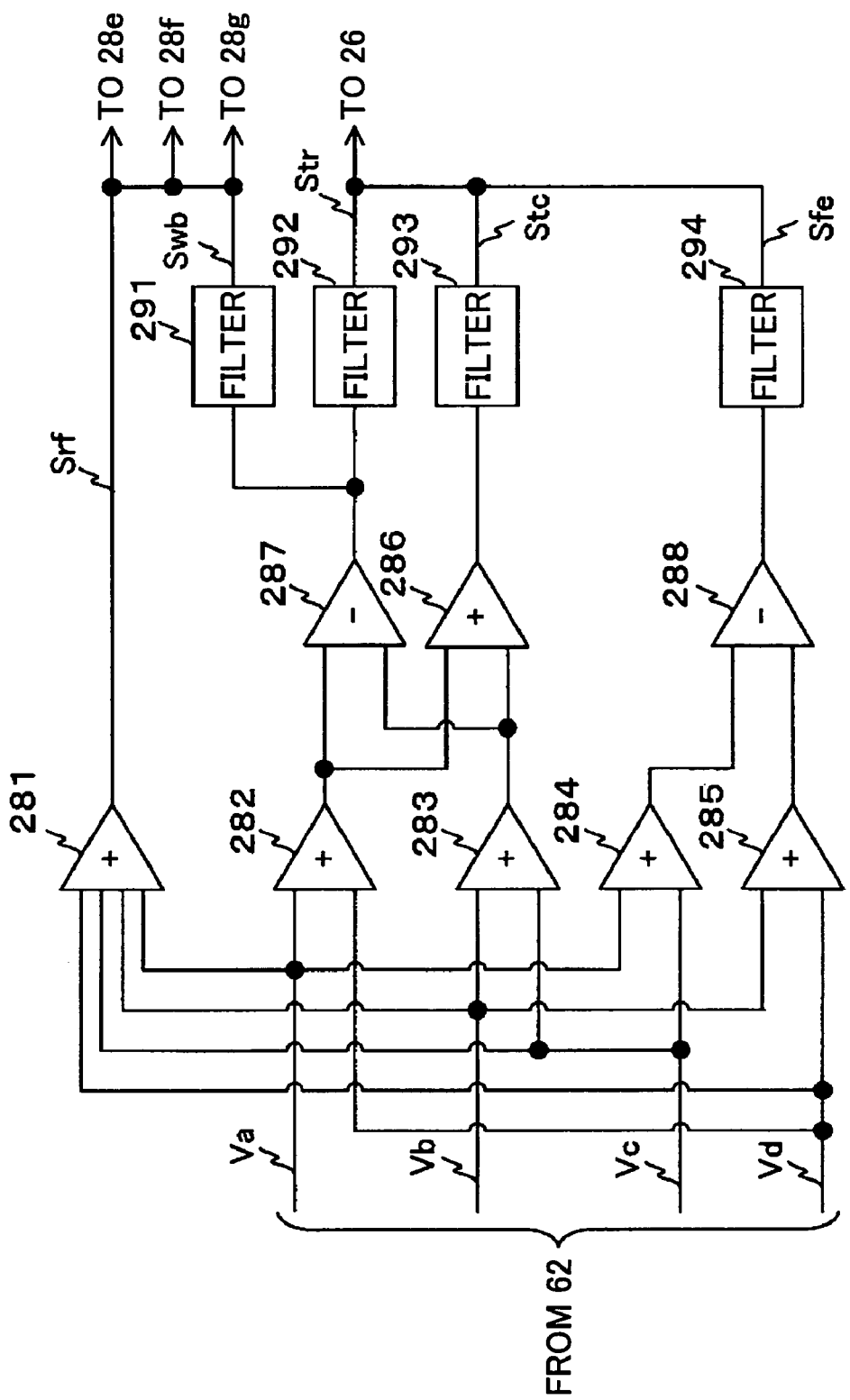
FIG. 15 is a schematic diagram for explaining specific circuit configurations of a servo signal detection circuit, a wobble signal detection circuit, and a RF signal detection circuit shown in FIG. 13.

FIG. 15 shows an example of the circuit obtained by combining the servo signal detection circuit 28b, the RF signal detection circuit 28d, and the wobble signal detection circuit 28c. The circuit shown in FIG. 15 includes six adders (281 through 286), two subtracters (287, 288), and four filters (291 through 294). The adder 281 adds up four signals (Va, Vb, Vc and Vd) from the I/V amplifier 62. It should be noted that the signal Va, the signal Vb, the signal Vc, and the signal Vd are the output signals of the I/V amplifier 62 corresponding to the output signals of the acceptance regions Da, Db, Dc, and Dd of the photoreceiver PD, respectively. The output signal of the adder 281 is a wide band signal and is output, as a RF signal Srf, to the clock signal generation circuit 28f and the decoder 28e.

The adder 282 adds up the signal Va and the signal Vd. The adder 283 adds up the signal Vb and the signal Vc. The adder 284 adds up the signal Va and the signal Vc. The adder 285 adds up the signal Vb and the signal Vd. The adder 286 adds up the output signal of the adder 282 and the output signal of the adder 283. The subtracter 287 subtracts the output signal of the adder 283 from the output signal of the adder 282. The subtracter 288 subtracts the output signal of the adder 285 from the output signal of the adder 284.

The filter 291 removes a low-frequency component included in the output signal of the subtracter 287. The output signal of the filter 291 is a high-frequency signal, and is output, as a wobble signal Swb, to the clock signal generation circuit 28f and the demodulation circuit 28g.

The filter 292 removes a high-frequency component included in the output signal of the subtracter 287. The output signal of the filter 292 is a low-frequency signal, and is output to the servo control circuit 26 as a track error signal Str. That is, the track error signal Str is obtained by a so-called push-pull method.

The filter 293 removes a high-frequency component included in the output signal of the adder 286. The output signal of the filter 293 is a low-frequency signal, and is output to the servo control signal 26 as a track cross signal Stc.

The filter 294 removes a high-frequency component included in the output signal of the adder 288. The output signal of the filter 294 is a low-frequency signal, and is output to the servo control signal 26 as a focus error signal Sfe. That is, the focus error signal Sfe is obtained by a so-called astigmatic method.

Figure 16:
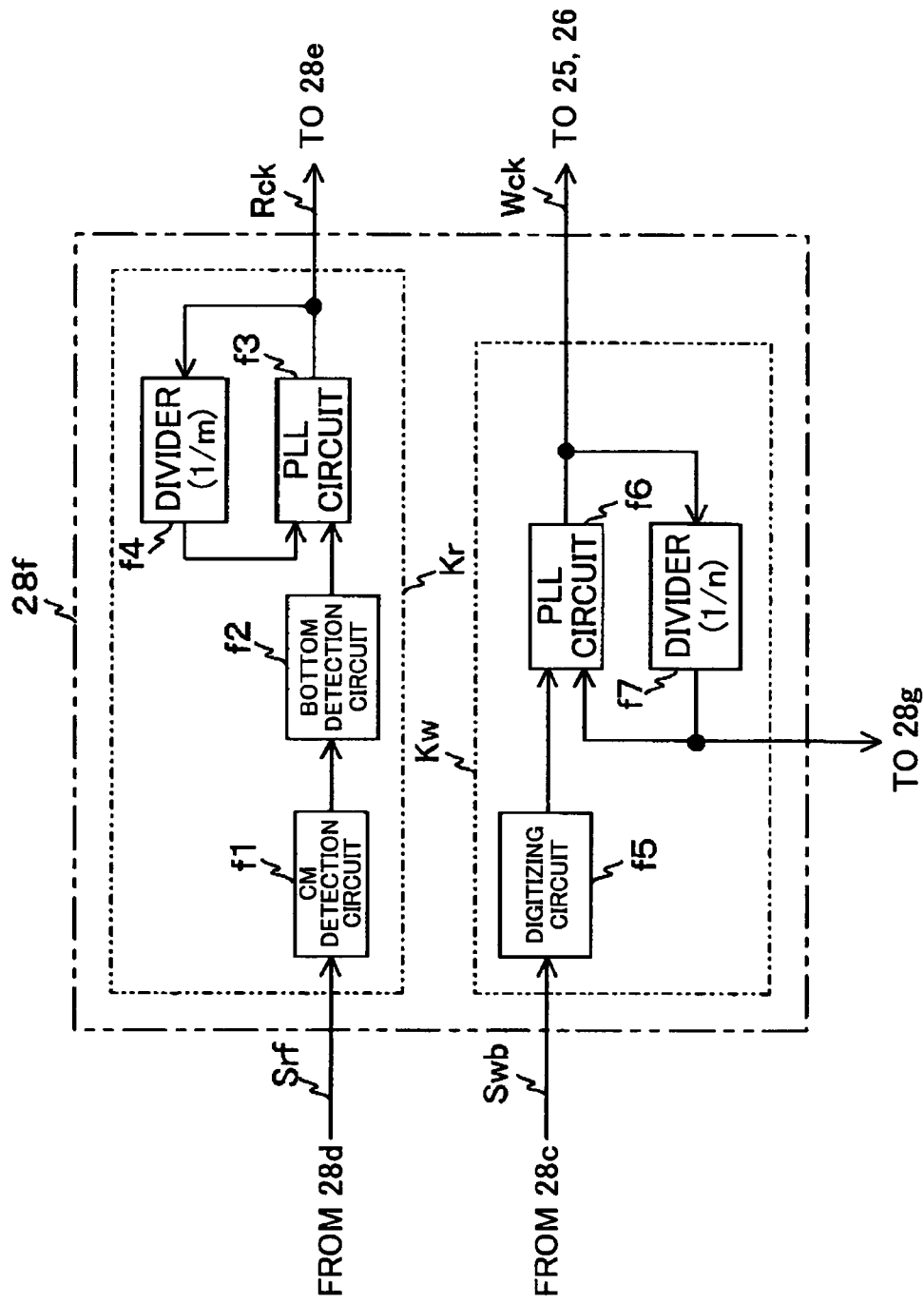
FIG. 16 is a block diagram for explaining a clock signal generation circuit shown in FIG. 13.

The clock signal generation circuit 28f generates a reproduction clock signal (Rck) based on the RF signal, and generates a reference clock signal (Wck) based on the wobble signal. As shown in FIG. 16 for example, the clock signal generation circuit 28f includes: a reproduction clock signal generation circuit Kr generating the reproduction clock Rck; and a reference clock signal generation circuit Kw generating the reference clock signal Wck.

Figure 17:
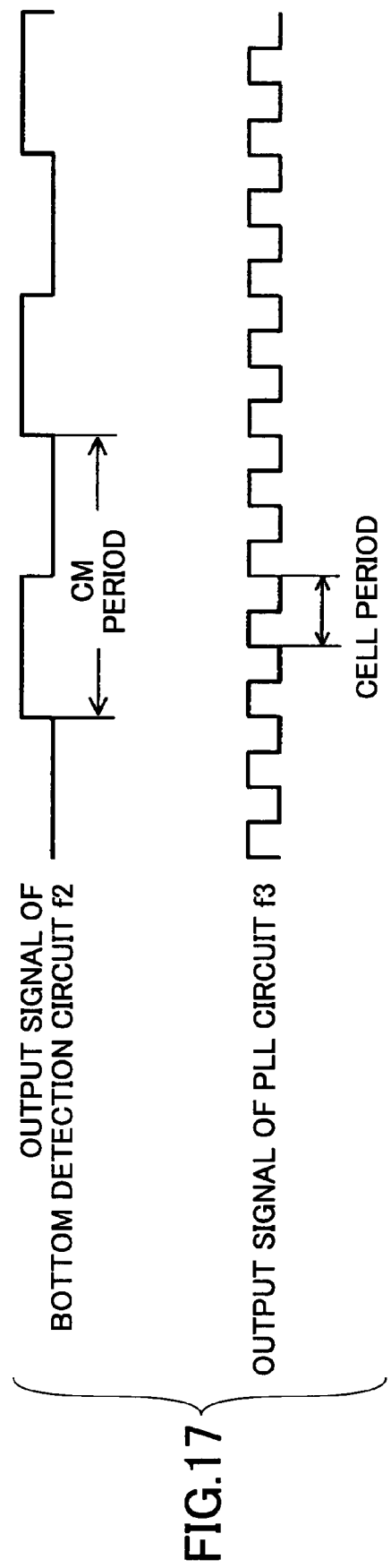
FIG. 17 is a schematic diagram for explaining the operation of a reproduction clock signal generation circuit shown in FIG. 16.

The reproduction clock signal generation circuit Kr includes a CM detection circuit f1, a bottom detection circuit f2, a PLL circuit f3, and a divider f4. The CM detection circuit f1 monitors the RF signal and detects the CM signal. The bottom detection circuit f2 detects the bottom position of the CM signal detected by the CM detection circuit f1. Thus, as shown in FIG. 17 for example, the output signal of the bottom detection circuit f2 is a pulse signal synchronized with the CM period. Here, since the CM period is "m" times the cell period, the PLL circuit f3 generates a signal having a frequency "m" times that of the output signal of the bottom detection circuit f2 (see FIG. 17). The output signal of the PLL circuit f3 is supplied to, for example, the decoder 28e as the reproduction clock signal Rck. Further, in order to perform phase comparison with the output signal of the bottom detection circuit f2, the output signal of the PLL circuit f3 is divided by m in the divider f4 and then input to the PLL circuit f3. Thereby, the stable reproduction clock signal Rck is output.

The reference clock signal generation circuit Kw includes a digitizing circuit f5, a PLL circuit f6, and a divider f7. The digitizing circuit f5 digitizes the wobble signal based on its amplitude center level. Since the wobble period is "n" times the cell period, the PLL circuit f6 generates a signal having a frequency "n" times that of the output signal of the digitizing circuit f5. The output signal of the PLL circuit f6 is supplied to, for example, the encoder 25 and the servo control circuit 26 as the reference clock signal Wck. Further, in order to perform phase comparison with the output signal of the digitizing circuit f5, the output signal of the PLL circuit f6 is divided by the divider f7 and then input to the PLL circuit f6. Thereby, the stable reference clock signal Wck is output. In addition, the output signal of the divider f7 is supplied to the demodulation circuit 28g.

Referring again to FIG. 13, the decoder 28e obtains multilevel data from the RF signal in synchronization with the reproduction clock signal Rck, and performs, for example, a decoding process and an error detection process. When an error is detected, the decoder 28e performs an error correction process, and then stores it in the buffer RAM 34 via the buffer manager 37 as reproduction data. Here, since the center of cell is accurately specified by the reproduction clock signal Rck, it is possible to stably and accurately obtain reproduction data. It should be noted that the RF signal includes address data, and the decoder 28e outputs the address data extracted from the RF signal to the CPU 40. The address data are logical address data.

The demodulation circuit 28g demodulates the wobble information part based on the wobble signal and the output signal of the divider f7, and obtains address data or a media parameter. The thus obtained address data and media parameter are supplied to the CPU 40.

The servo control circuit 26 includes a PU control circuit 26a, a seek motor control circuit 26b, and a SP motor control circuit 26c.

In order to correct a focus shift of the objective lens 60, the PU control circuit 26a generates a drive signal for the focusing actuator based on the focus error signal, and outputs the drive signal to the optical pickup device 23. Additionally, in order to correct a tracking shift of the objective lens 60, the PU control circuit 26a generates a drive signal for the tracking actuator based on the track error signal, and outputs the drive signal to the optical pickup device 23. Thereby, tracking control and focus control are performed.

The seek motor control circuit 26b generates a drive signal for driving the seek motor 21 based on an instruction from the CPU 40, and outputs the drive signal to the seek motor 21.

The SP motor control circuit 26c generates a drive signal for driving the spindle motor 22 based on an instruction from the CPU 40, and outputs the drive signal to the spindle motor 22. In addition, the SP control circuit 26c detects the disk rotation speed based on the reference clock signal, and compares the detected disk rotation speed with a target speed, thereby controlling the rotation speed of the spindle motor 22.

The buffer RAM 34 temporarily stores, for example, data (reproduction data) reproduced from the optical disk 15. Data input to and data output from the buffer RAM 34 are managed by the buffer manager 37. It should be noted that, when a recordable optical disk is set, recording data transmitted from a higher-level device 90 are accumulated in the buffer RAM 34.

When a recordable optical disk is set, the encoder 25 obtains, via the buffer manager 37, the recording data accumulated in the buffer RAM 34 based on an instruction from the CPU 40, performs, for example, data modulation and addition of an error correction code, and generates a write signal. The thus generated write signal is output to the laser control circuit 24.

The laser control circuit 24 controls the power of laser light emitted from the semiconductor laser LD. Here, since the optical disk 15 is a playback-only (read-only) medium, the laser control circuit 24 generates a drive signal for the semiconductor laser LD corresponding to the reproduction power. Further, when recording is performed on a recordable optical disk, the laser control circuit 24 generates the drive signal for the semiconductor laser LD based on, for example, the write signal, recording conditions, and the light emitting characteristics of the semiconductor laser LD.

The interface (I/F) 38 is a bidirectional communication interface with the higher-level device (e.g., personal computer) 90. The interface 38 conforms to standard interfaces such as ATAPI (AT Attachment Packet Interface) and SCSI (Small Computer System Interface).

The flash memory 39 includes a program region and a data region. The program region of the flash memory 39 stores a program written in a code that can be interpreted by the CPU 40. Additionally, the data region of the flash memory 39 stores, for example, the recording conditions and the light emitting characteristics of the semiconductor laser LD.

The CPU 40 controls the operation of each part in accordance with the program stored in the program region of the flash memory 39, and saves, for example, data necessary for the control in the RAM 41 and the buffer RAM 34.

As will be appreciated from the above description, in the optical disk device 20 according to this embodiment, the reproduction clock signal generation circuit Kr forms clock signal generation means, and the decoder 28e forms reproduction means. Additionally, the wobble signal detection circuit 28c forms wobble signal detection means.

The reproduction clock signal generation circuit Kr performs the steps of detecting a reference mark and generating a clock signal of a signal generation method according to the present invention.

As described above, with the optical disk 15 according to this embodiment, because plural CMs (reference marks) are included in multilevel information such that the CMs correspond to the period of wobble (meandering) of a pit array, it is possible to accurately detect the CMs without being affected by the wobble. Thus, by referring to the reference marks, it is possible to accurately obtain positions where multilevel information is recorded.

Additionally, the CMs are formed at positions where the spot center matches the middle position of a pit array or positions where a shift amount between the spot center and the middle position of a pit array becomes a predetermined value. Hence, it is possible to accurately detect both CMs and wobble signal.

Additionally, one of the relationships "m=n", "m=n/2", and "m=n×a" is satisfied, where "m" is the number of cells included in the CM period, and "n" is the number of cells included in the wobble period. Hence, it is possible to accurately detect both CMs and wobble signal.

Additionally, because "m" is an integer from 50 to 260, it is possible to accurately generate the reproduction clock signal while not degrading the amount of recordable information very much.

Additionally, because "n" is an integer from 20 to 160, it is possible to accurately generate the reference clock signal.

Additionally, because the address information (phase-modulated wave part) in the wobble information part is phase modulated by the same period as the carrier wave part, it is possible to readily demodulate the wobble information.

Additionally, since the CMs are added to the synchronization marks, it is possible to accurately detect the synchronization marks and readily clarify the segment of information.

Additionally, in the optical disk device 20 according to this embodiment, when reproducing the optical disk 15 that includes a recording surface having thereon a spiral or concentric pit array that periodically wobbles and includes plural CMs (reference marks) in multilevel information such that the CMs correspond to the period of wobble, the CMs are detected based on the reflected light from the recording surface of the optical disk 15, and the reproduction clock signal (clock signal) is generated based on the detected CMs. Here, because the CMs are formed such that the CMs correspond to the period of wobble of the pit array, the CMs are accurately detected without being affected by the wobble. Thereby, the reproduction clock signal is accurately and stably generated. As a result, reproduction of information recorded on the optical disk 15 is stably performed. That is, it is possible to stably reproduce information recorded on an optical disk according to the present invention.

Figure 18:
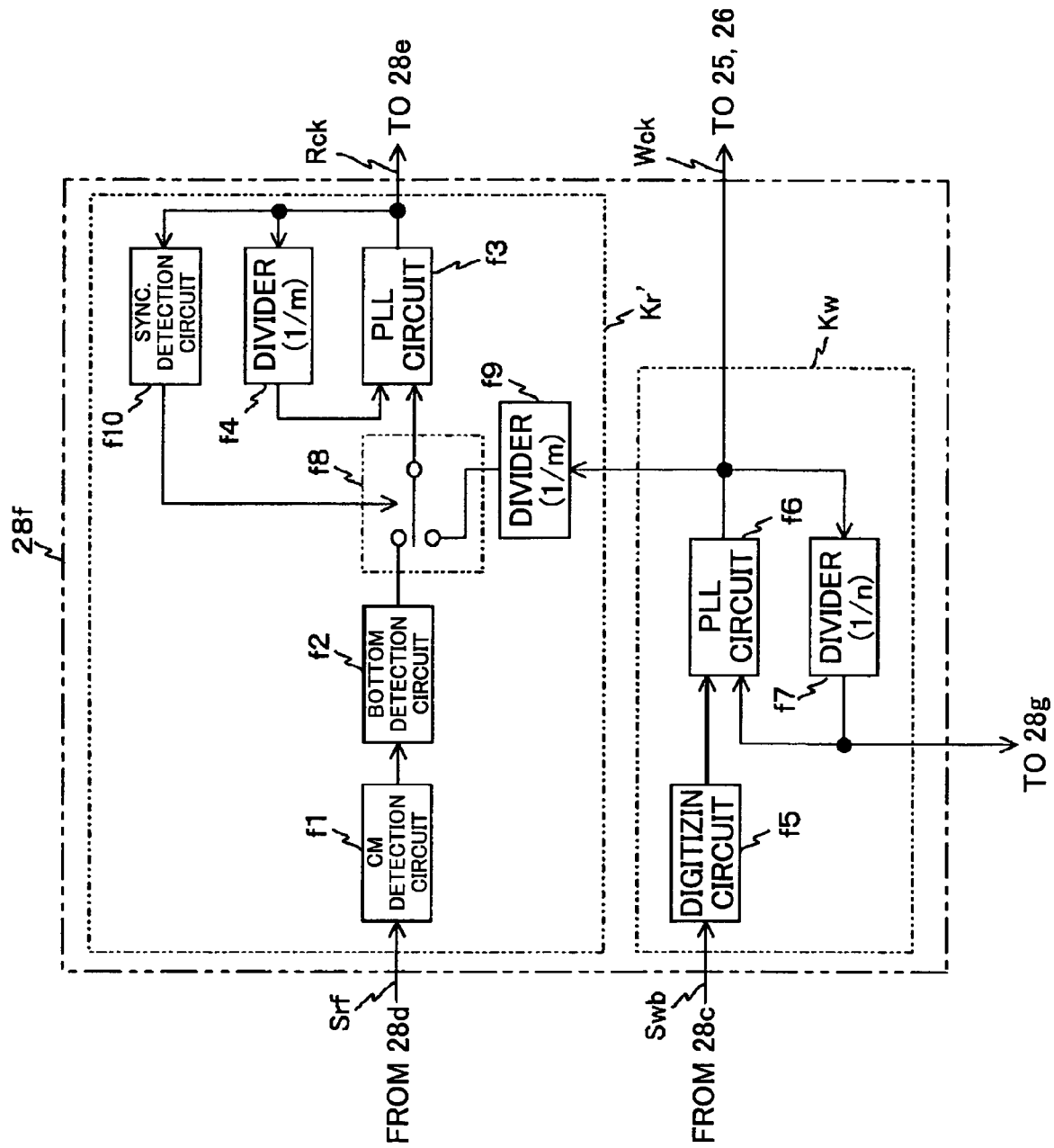
FIG. 18 is a block diagram for explaining a variation of the clock signal generation circuit.

It should be noted that, in the clock signal generation circuit 28f in the above embodiment, a reproduction clock signal generation circuit Kr' shown in FIG. 18 may be used instead of the reproduction clock signal generation circuit Kr. The reproduction clock signal generation circuit Kr' generates a pseudo clock signal (pulse signal) based on the wobble signal, and generates the reproduction clock signal based on the pseudo clock signal and the CMs. That is, roughly synchronized clock signal is generated based on the wobble signal, and finely synchronized clock signal is generated based on the reproduction signal. Thus, the reproduction clock signal generation circuit Kr' has a structure obtained by adding a switch f8, a divider f9, and a synchronization detection circuit f10 to the reproduction clock signal generation circuit Kr.

The divider f9 divides the reference clock signal Wck from the reference clock signal generation circuit Kw by "m". The switch f8 selects and outputs, to the PLL circuit f3, one of the output signal from the divider f9 and the output signal of the bottom detection circuit f2. The synchronization detection circuit f10 detects a synchronization state based on the output signal of the PLL circuit f3 and controls the switch f8.

Here, a brief description is given of the function of the reproduction clock signal generation circuit Kr'. First, the synchronization detection circuit f10 sets the switch f8 to the divider f9. Thereby, the output signal of the divider f9 is supplied to the PLL circuit f3, and rough frequency drawing, that is, rough synchronization, is performed in the PLL circuit f3. When the frequency is roughly adjusted by rough synchronization, the synchronization detection circuit f10 sets the switch f8 to the bottom detection circuit f2. Thereby, the output signal of the bottom detection circuit f2 is supplied to the PLL circuit f3, and accurate frequency drawing, that is, fine synchronization, is performed in the PLL circuit f3. Accordingly, it is possible to generate the reproduction clock signal faster than in the reproduction clock signal generation circuit Kr.

Figure 19:
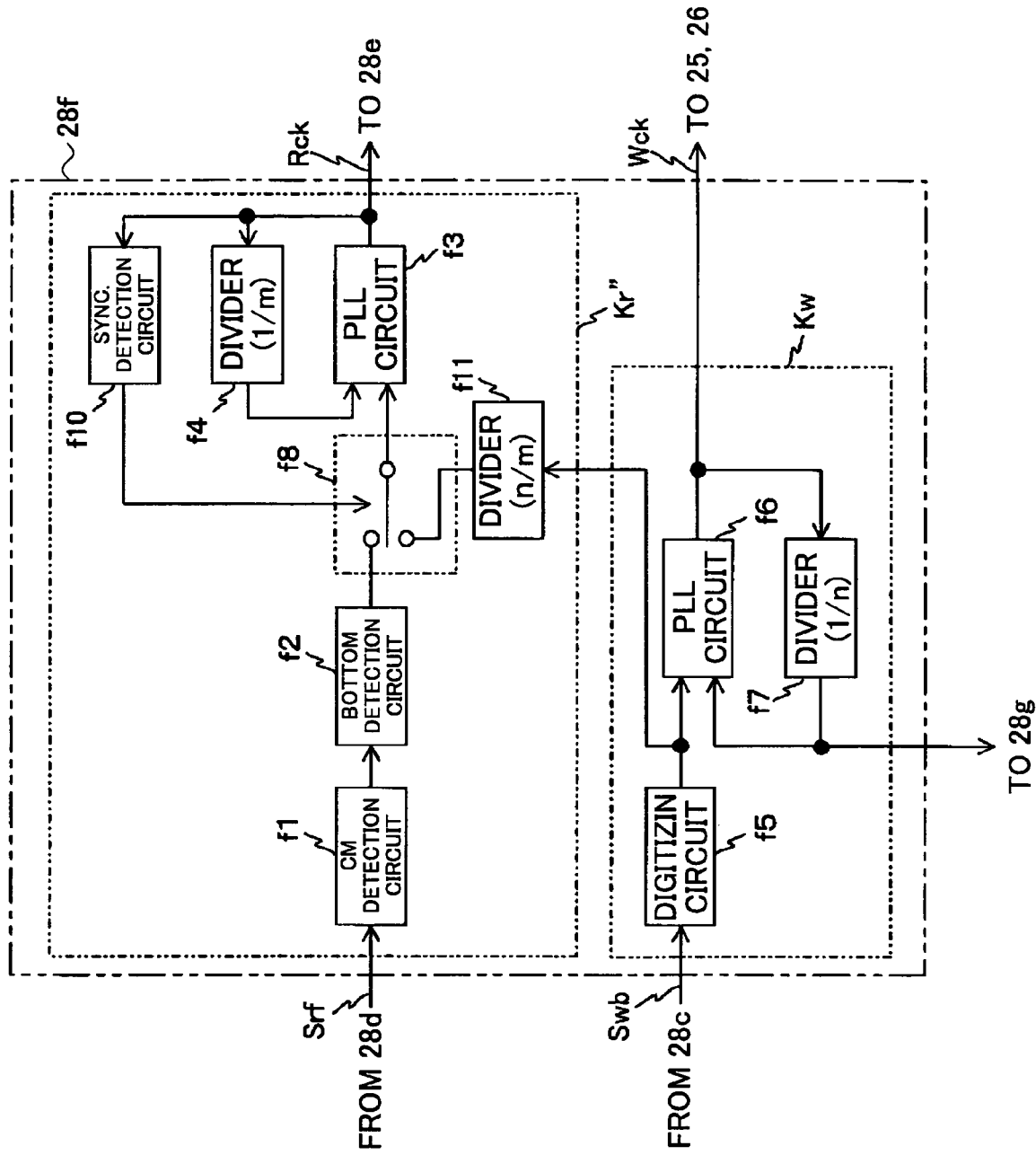
FIG. 19 is a block diagram for explaining another variation of the clock signal generation circuit.

In this case, when "m" is a natural number times of "n", as shown in FIG. 19 for example, a reproduction clock signal generation circuit Kr" may be used that includes a divider f11, which divides the output signal of the digitizing circuit f5 by m/n, instead of the divider f9 of the reproduction clock signal generation circuit Kr'. For rough synchronization, the output signal of the divider f11 is selected by the switch f8, and for fine synchronization, the output signal of the bottom detection circuit f2 is selected by the switch f8. Thereby, even if, for example, the reference clock signal is not required and the PLL circuit f6 forming the reference clock signal generation circuit Kw is not operating, it is possible to quickly generate the reproduction clock signal.

Figure 20:
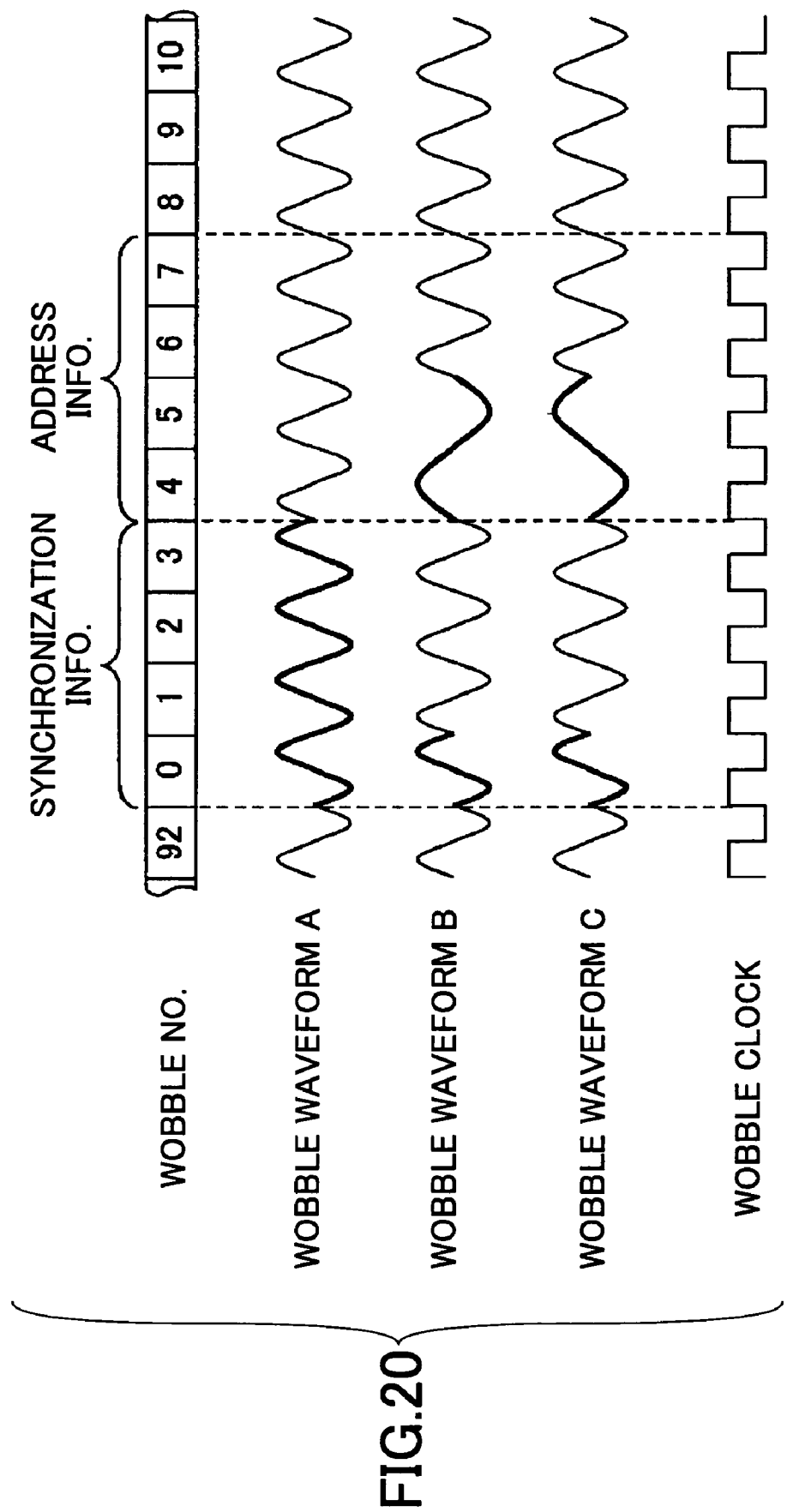
FIG. 20 is a schematic diagram for explaining a variation of phase modulation in the wobble information part.

Additionally, in the above embodiment, the description is given of the case where the address information is phase modulated by the same period as that of the carrier wave. However, this is not a limitation, and as shown in FIG. 20 for example, the address information may be phase modulated by twice the period of the carrier wave. In this case, if the CM period and the wobble period are made equal to each other, it is possible to arrange CMs at positions where the spot center substantially matches the middle position of the pit array.

Additionally, in the above embodiment, the description is given of the case where three CMs are inserted in one data block. However, this is not a limitation, and, for example, one CM may be inserted in one data block.

Figure 21A:
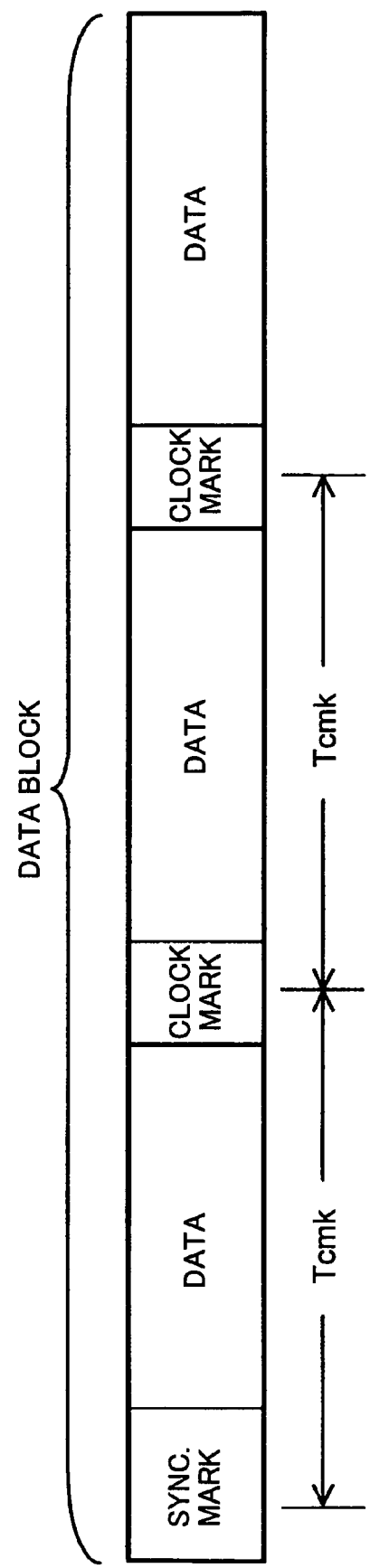
FIG. 21A is a schematic diagram for explaining the data block in the case where the synchronization mark includes a CM function.
Figure 21B:
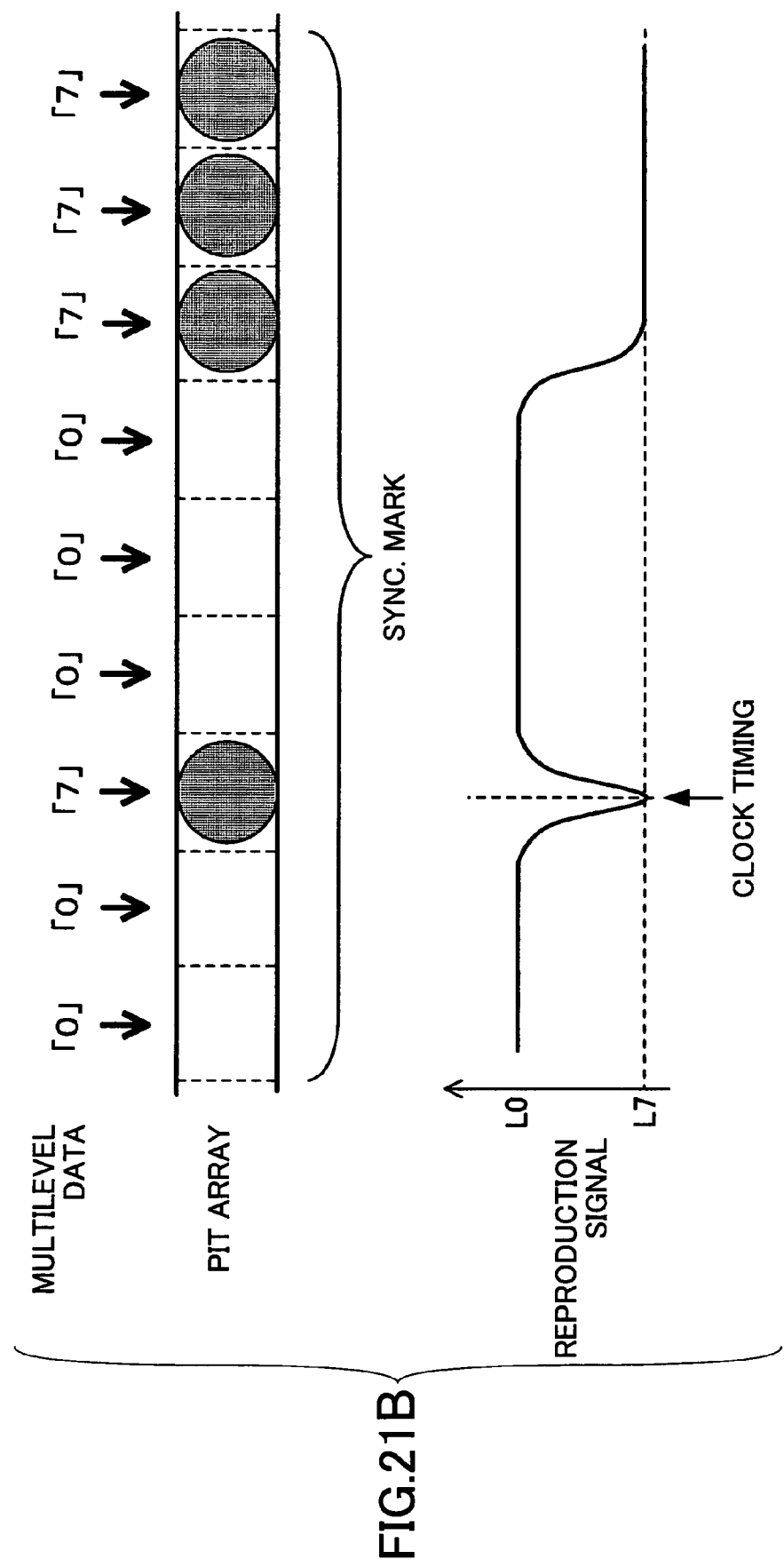
FIG. 21B is a schematic diagram for explaining the synchronization mark in the case of FIG. 21A.

Additionally, in the above embodiment, the description is given of the case where the CM at the top of a data block and a synchronization mark are separately arranged. However, in the case where the center of cell can be specified by the synchronization mark, as shown in FIG. 21A for example, the CM in front of the synchronization mark may be omitted. For example, as shown in FIG. 21B, when a multilevel data string "007000777" is used as a synchronization mark, the center of cell can be specified by the first five cells.

Figure 22:
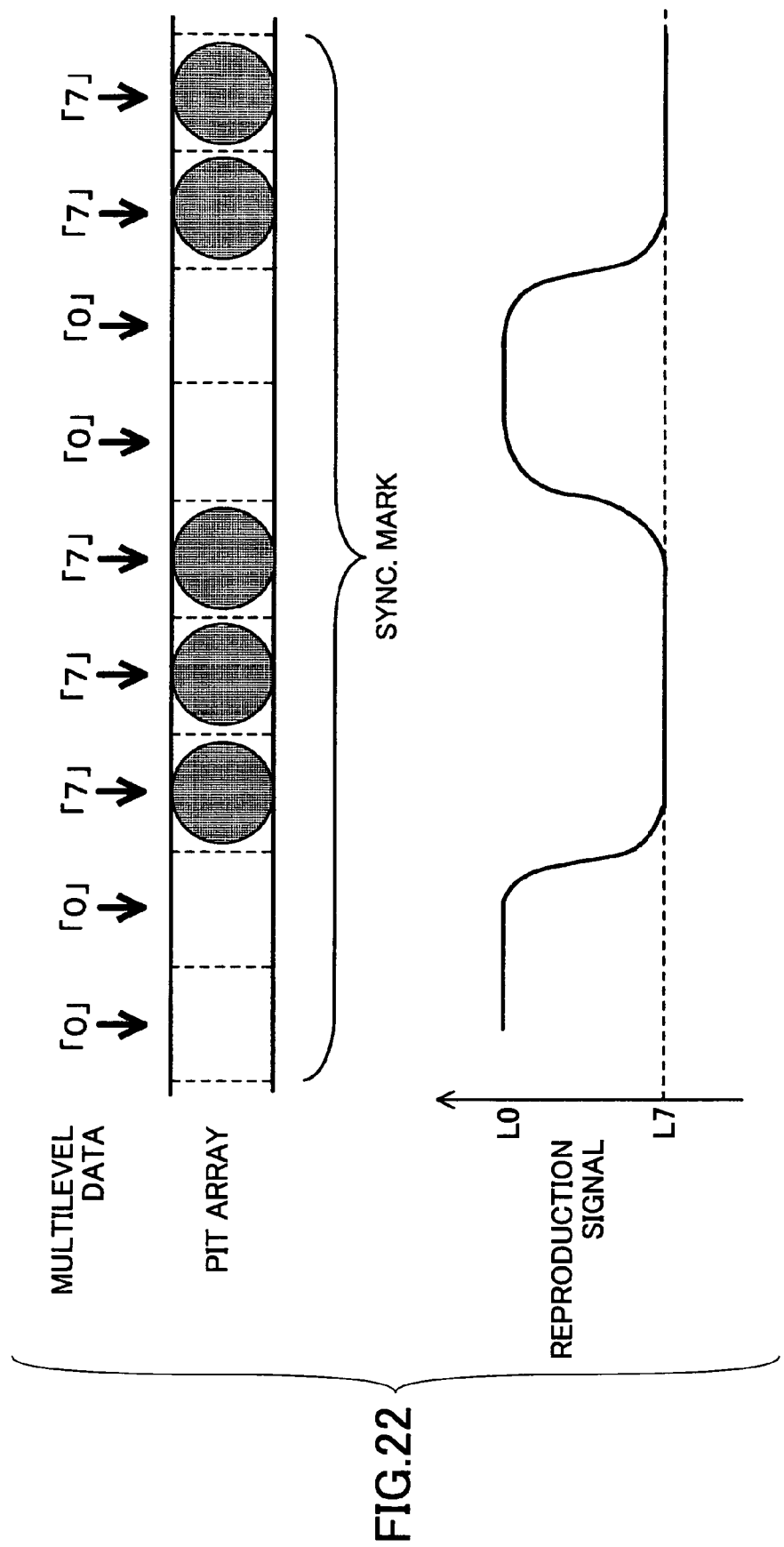
FIG. 22 is a schematic diagram for explaining a variation of the synchronization mark.

Additionally, in the above embodiment, the description is given of the case where the multilevel data string "00007777" is used as a synchronization mark. However, this is not a limitation. For example, as shown in FIG. 22, a multilevel data string "007770077" may be used as a synchronization mark. In short, any pattern may be used as long as the pattern does not appear in user data.

Figure 23:
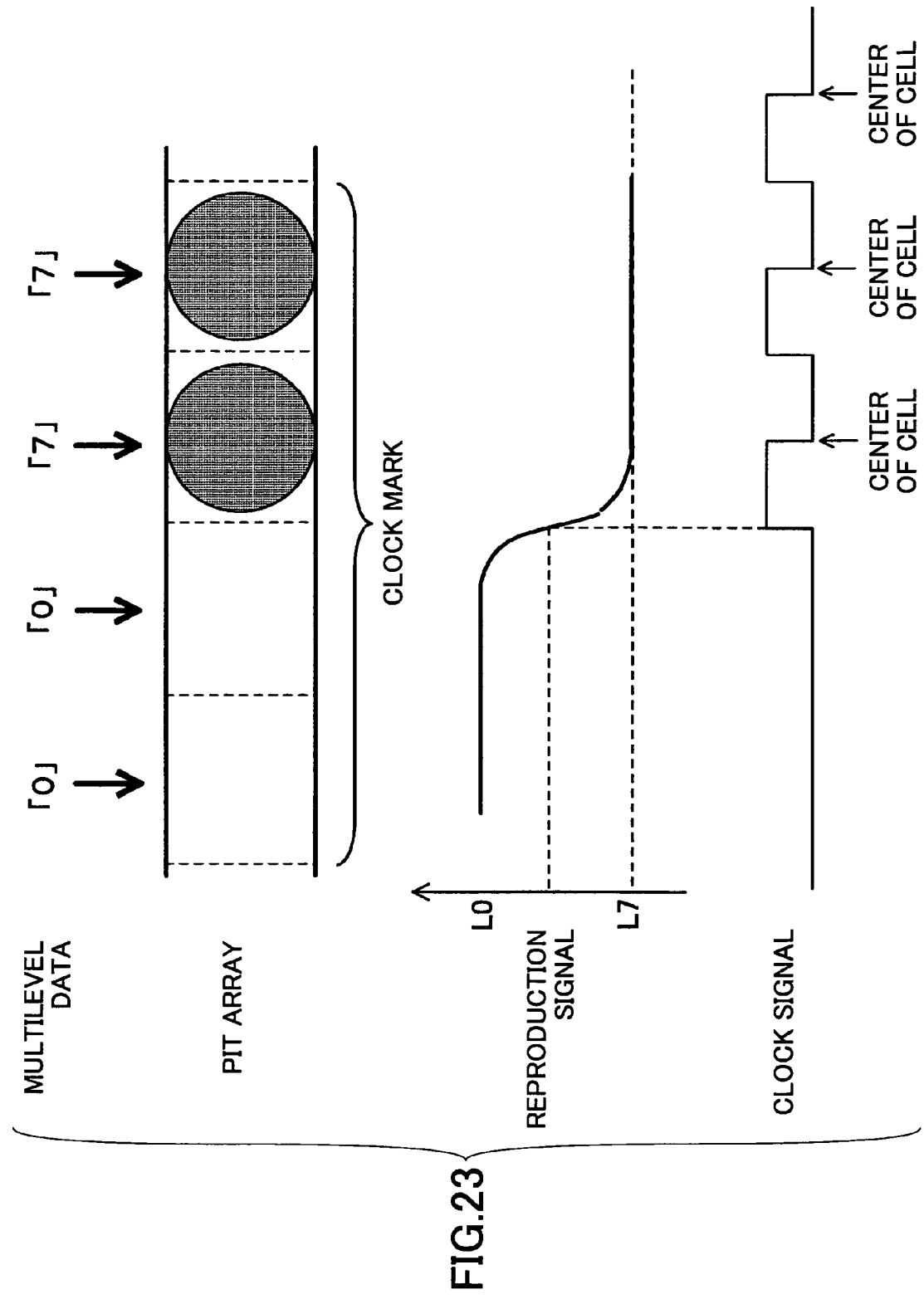
FIG. 23 is a schematic diagram for explaining a variation of the CM.
Figure 24:
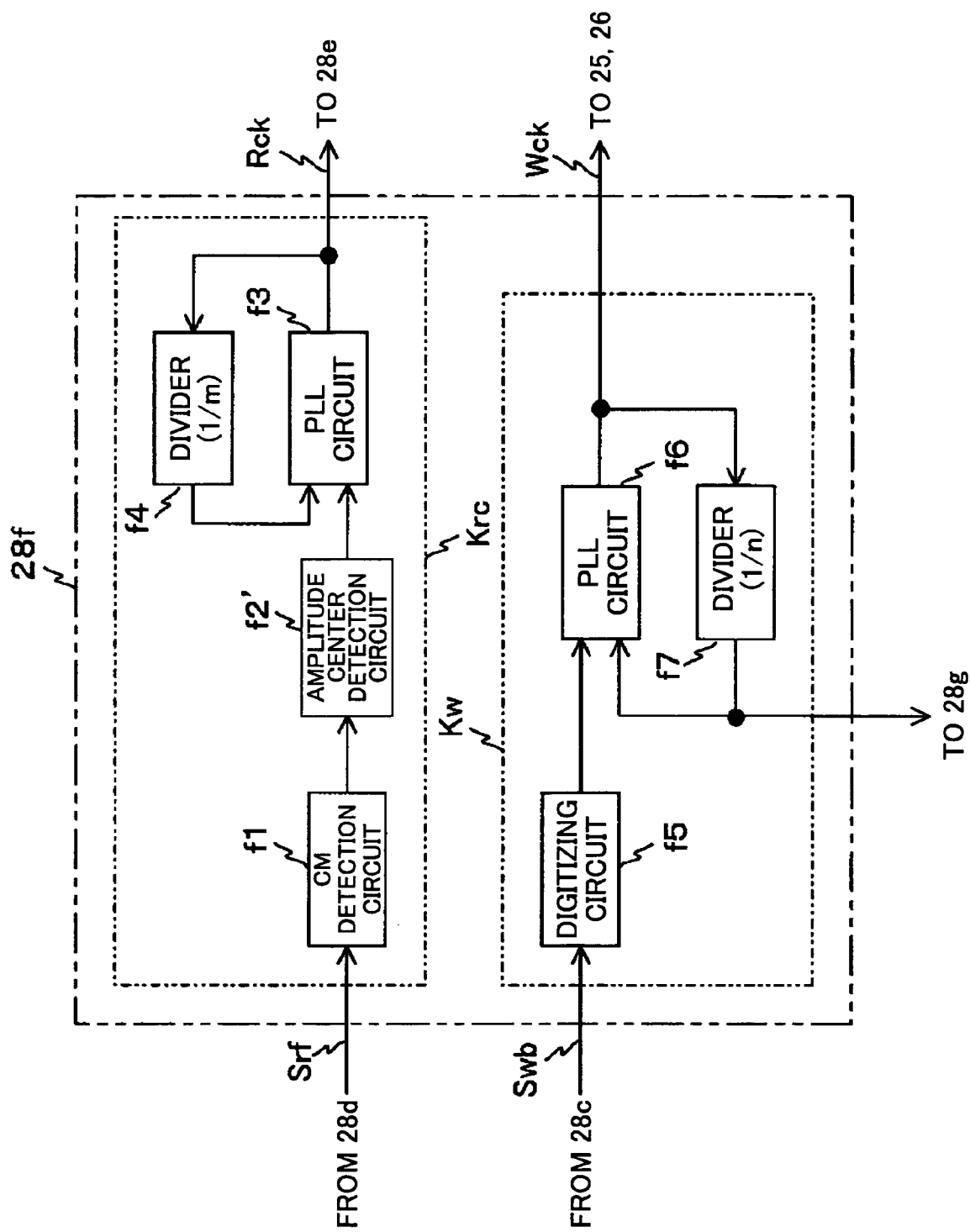
FIG. 24 is a block diagram for explaining the clock signal generation circuit in the case where the CMs shown in FIG. 23 are used.

Additionally, in the above embodiment, the description is given of the case where the multilevel data string "00700" is used as a CM. However, this is not a limitation. For example, as shown in FIG. 23, a multilevel data string "0077" may be used as a CM. In this case, the clock signal is generated based on the amplitude center of the reproduction signal. That is, since the timing of a cell boundary is obtained by detecting the timing to cross the amplitude center, if a clock signal having a rising edge at the cell boundary is generated, because the length of a cell is known, as shown in FIG. 23, it is possible to readily generate the clock signal whose falling edge indicate the center of cell. Accordingly, in this case, a reproduction clock signal generation circuit Krc shown in FIG. 24 is used instead of the reproduction clock signal generation circuit Kr. In the reproduction clock signal generation circuit Krc, an amplitude center detection circuit f2', which detects the amplitude center of the reproduction signal, is used instead of the bottom detection circuit f2.

Additionally, in the above embodiment, the description is given of the case where recording data are multileveled to eight values. However, this is not a limitation of the present invention.

Additionally, in the above embodiment, the description is given of the case where the track error signal is obtained by the push-pull method. However, this is not a limitation and, for example, a phase difference method (DPD method) may be used. Further, a 3 spot method and a differential push-pull (DPP) method may be used by dividing the light emitted from the semiconductor laser LD into three beams. In short, the track error signal should be detected with a good degree of accuracy. It should be noted that the structures of the optical pickup device 23 and the reproduction signal processing circuit 28 correspond to a detection method.

Additionally, in the above embodiment, the description is given of the case where the focus error signal is obtained by the astigmatic method. However, this is not a limitation and, for example, a knife edge method may be used. In short, the focus error signal should be detected with a good degree of accuracy. It should be noted that the structures of the optical pickup device 23 and the reproduction signal processing circuit 28 correspond to a detection method.

Additionally, in the above embodiment, the description is given of the case where the acceptance surface of the photoreceiver PD is divided by four. However, this is not a limitation. In short, the servo signal, the RF signal, and the wobble signal should be detected with a good degree of accuracy.

Additionally, in the above embodiment, the wobble width is ±17.8 nm. However, this may be changed in accordance with the bandwidth limiting method.

Additionally, in the above embodiment, the description is given of the case where bandwidth limiting is performed when modulating recording data. However, this is not a limitation, and bandwidth limiting may not be performed. In this case, it is preferable that the wobble width is ±25.2 nm.

Additionally, in the above embodiment, the description is given of the case where the wobble period is 5 μm and the pit array pitch is 0.74 μm. However, this is not a limitation of the present invention. When, for example, the pit array pitch is 0.45 μm, it is preferable that the wobble width be ±10.8 nm when bandwidth limiting is performed and be ±15.3 nm when bandwidth limiting is not performed. In addition, when, for example, the pit array pitch is 0.32 μm, it is preferable that the wobble width be ±7.7 nm when bandwidth limiting is performed and be ±10.9 nm when bandwidth limiting is not performed.

Additionally, in the above embodiment, the description is given of the case where one wobble unit is formed by 93 wobbles. However, this is not a limitation.

Additionally, in the above embodiment, the description is given of the case where, in one wobble unit, wobble No. 0 through 7 form the wobble information part and wobble No. 8 through 92 form the carrier wave part. However, this is not a limitation.

Additionally, in the above embodiment, the description is given of the case where 51 bits are required as address data. However, this is not a limitation. In this case, the number of wobble units constituting one wobble unit is defined in accordance with the number of bits of address data.

Additionally, in the above embodiment, in the case where the period of the reproduction signal becomes close to the period of the wobble signal, phase comparison in the PLL circuit f6 of the reference clock signal generation circuit Kw may be temporarily stopped.

Additionally, in the above embodiment, the description is given of the case where the photoreceiver PD and the I/V amplifier 62 are separately provided. However, this is not a limitation, and the photoreceiver PD may be integrally provided with the I/V amplifier 62.

Additionally, in the above embodiment, the description is given of the case where the optical disk 15 corresponds to the laser light having a wavelength of approximately 660 nm. However, this is not a limitation, and the optical disk 15 may correspond to, for example, laser light having a wavelength of approximately 780 nm and laser light having a wavelength of approximately 405 nm.

Additionally, in the above embodiment, the description is given of the case where the area of a pit is different in accordance with the value of multilevel data. However, this is not a limitation, and the depth of a pit may be different in accordance with the value of multilevel data. In short, the signal level of the reproduction signal should be different in accordance with the value of multilevel data.

Additionally, in the above embodiment, the description is given of the case where the optical pickup device is provided with one semiconductor laser LD. However, this is not a limitation, and the optical pickup device may be provided with, for example, plural semiconductor lasers, each emitting laser light having a different wavelength. In this case, the optical pickup device may include one of a semiconductor laser that emits light having a wavelength of approximately 405 nm and a semiconductor laser that emits light having a wavelength of approximately 780 nm. That is, the optical disk device may be an optical disk device that corresponds to plural kinds of optical disks each conforming to a different standard. In such a case, the multilevel recording method may be used in at least one of the plural kinds of optical disks.

Additionally, in the above embodiment, the description is given of the case where the optical disk device is an optical disk device capable of performing recording and reproduction. However, the optical disk device may be a playback-only optical disk device.

Figure 25A:
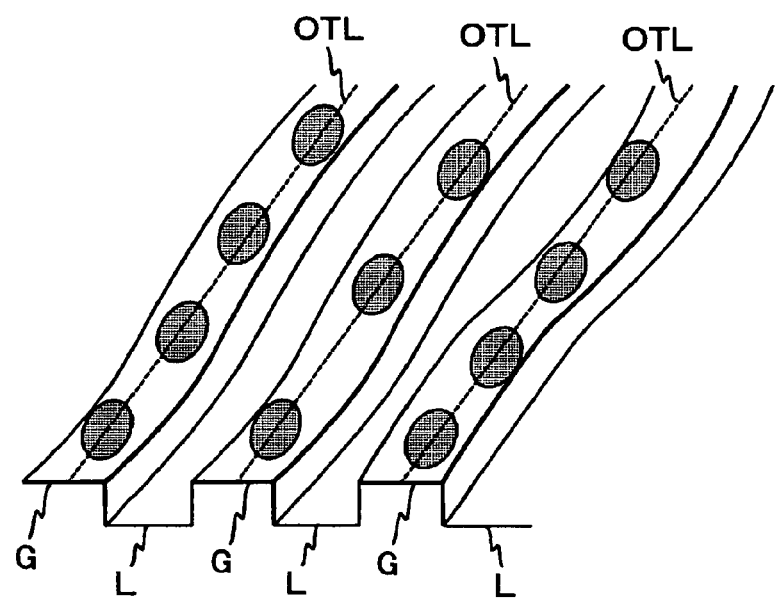
FIGS. 25A and 25B are schematic diagrams for explaining a recording surface of an optical disk according to one embodiment of the present invention.
Figure 25B:
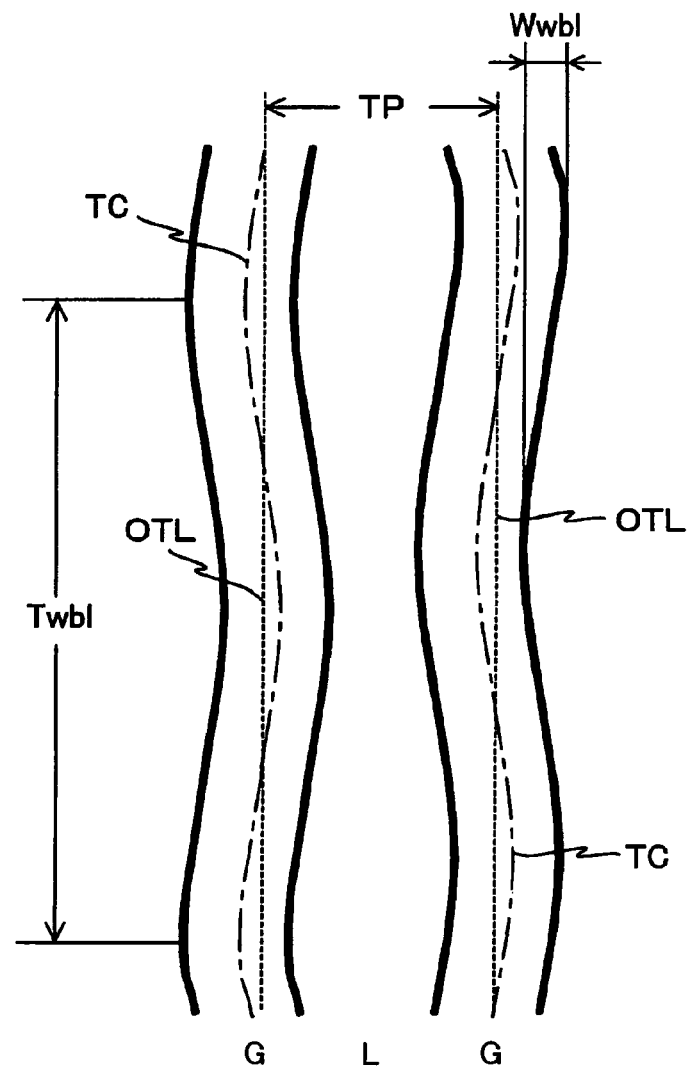

Referring to FIGS. 25A through 42, a description is given of one embodiment of the present invention. FIGS. 25A and 25B show a recording surface of an optical disk 115 according to one embodiment of the present invention.

A spiral groove, serving as a guide groove, is formed on the recording surface of the optical disk 115 such that the groove meanders (wobbles) periodically. Generally, in an optical disk, when seen from an entering direction of laser light, convex portions are called grooves (G) and concave portions are called lands (L). In this embodiment, it is assumed that data are recorded on the grooves G. Thus, hereinafter, the grooves G are called tracks for convenience.

The optical power center (hereinafter referred to as "spot center") formed in an on-track state is positioned at substantially the center of a track that is assumed to be not wobbling. Accordingly, as shown in FIG. 25B, the path (trajectory) of the spot center OTL does not match a line TC that runs through the center of a track. That is, even in an on-track state, the spot center may be shifted from the center position of the track.

Here, the period of wobbling of the track is referred to as the wobble period (Twbl), and the distance between the OTLs of the adjacent tracks is referred to as a track pitch (TP). Further, the amplitude of wobble (Wwbl) of the tracks is referred to as a wobble amplitude. In this embodiment, for example, Twble=5 μm and TP=0.74 μm as in a commercially available DVD. The wobble amplitude Wwbl is described later.

Figure 26:
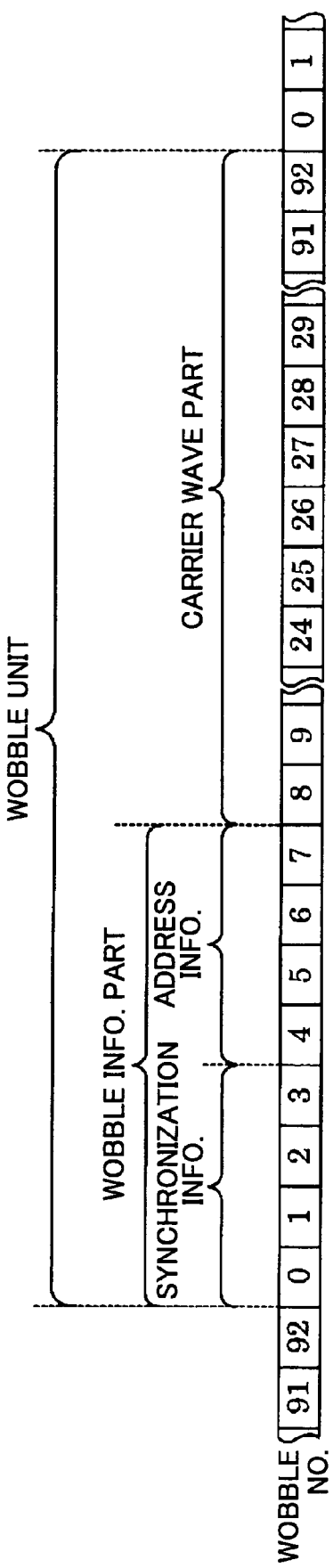
FIG. 26 is a schematic diagram for explaining a wobble unit.

The wobble shape of the track is determined by information to be added (hereinafter also referred to as "wobble information") and a carrier wave. In this embodiment, as shown in FIG. 26 as an example, it is assumed that a basic unit (hereinafter referred to as a "wobble unit") consisting of a part corresponding to wobble information (hereinafter referred to as a "wobble information part") and a part corresponding to the carrier wave (hereinafter referred to as a "carrier wave part") includes 93 wobbles (wobble No. 0 through wobble No. 92), where 1 wobble corresponds to one period (wobble period) of the carrier wave. Additionally, it is assumed that, in one wobble unit, wobble No. 0 through wobble No. 7 constitute the wobble information part, and wobble No. 8 through wobble No. 92 constitute the carrier wave part. It should be noted that the wobble information part is subjected to PSK (Phase Shift Keying) according to its content.

In a region to which addresses are assigned, the wobble information part consists of synchronization information and address information. Here, as shown in FIG. 26 wobble No. 0 through wobble No. 3 correspond to the synchronization information, and wobble No. 4 through wobble No. 7 correspond to the address information.

The address information represents 1 bit data (hereinafter simply referred to as "bit data") by four wobbles. When the bit data are "0", as indicated by a wobble shape B in FIG. 27, the first two wobbles have the same phase as the carrier wave, and the last two wobbles have the opposite phase of the carrier wave. On the other hand, when the bit data are "1", as indicated by a wobble shape C in FIG. 27, the first two wobbles have the opposite phase of the carrier wave, and the last two wobbles have the same phase as the carrier wave.

Figure 27:
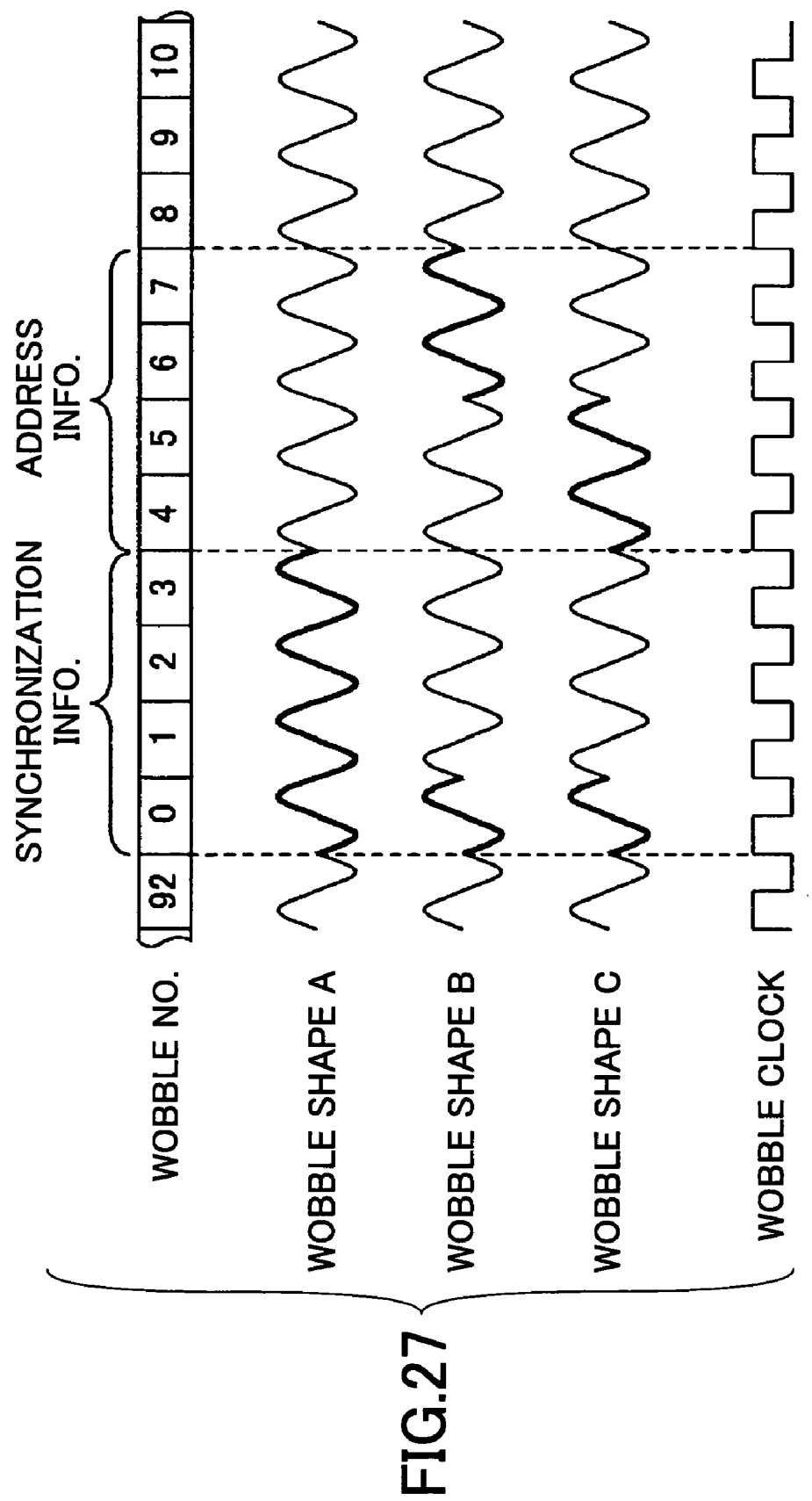
FIG. 27 is a schematic diagram for explaining phase modulation in a wobble information part.

As for the synchronization information, in the case where the first bit data of address data are stored in the address information of the next wobble unit, as indicated by a wobble shape A in FIG. 27, word sync information, that is, all of the four wobbles have the opposite phase of the carrier wave. In addition, in the case where bit data are stored in the address information, as indicated by the wobble shapes B and C in FIG. 27, bit sync information, that is, the first wobble has the opposite phase of the carrier wave, and the rest three wobbles have the same phase as the carrier wave.

In the case where, for example, 151 sets of bit data are required as address data, as shown in FIG. 28, one set of address data are obtained from 152 wobble units. It should be noted that the obtained address data are physical address (absolute address). Further, hereinafter, a set of wobble units corresponding to one set of physical address is referred to as one wobble block. Thus, here, 1 wobble block=152 wobble units.

In a region not requiring address data, instead of the address information, information related to the optical disk 115 such as vendor information, that is, a so-called media parameter is added as the wobble information.

It is assumed that, as an example, the optical disk 115 corresponds to a laser beam having a wavelength of approximately 16160 nm, and data are recorded thereon according to the multilevel recording method. Additionally, it is assumed that the recorded data are multileveled into eight values (0 through 7). Further, it is assumed that, when modulating the recorded data, bandwidth limiting is performed as in the binary recording method. Bandwidth limiting is to limit the patterns of data sequences when modulating the recorded data so as to prevent, in a reproduction signal, generation of a signal having a frequency close to the frequency (5 KHz or less) of a servo signal.

As shown in FIG. 29 as an example, in the multilevel recording method, a pit array is virtually divided into plural regions (hereinafter also referred to as "cells") at every predetermined length with respect to the tangential direction of the pit array. One cell stores one set of multilevel data. When the value of the set of multilevel data is 1 through 7, a pit having an area corresponding to the value is formed in the middle portion of the cell. When the value of the set of multilevel data is 0, a pit is not formed.

The distance between the centers of the adjacent cells is called a cell period (Tcell). In order to simplify the configuration of a clock signal generation circuit, which is described below, it is preferable that the relationship between the wobble period and the cell period is such that the wobble period is an integral multiple of the cell period. It should be noted that the wobble period may be 0.25 times or 0.5 times the cell period as long as 2 to 4 wobble periods match an integral multiple of the cell period.

In a part where the recording mark is formed, the larger the recording mark area is, the lower the reflectivity of the laser beam becomes. Hence, as shown in FIG. 29, a reproduction signal (RF signal) generated from the laser beam that is reflected by the recording surface of the optical disk 115 reaches the highest level (L0) when the value of the multilevel data is 0, and reaches the lowest level (L7) when the value of the multilevel data is 7. It should be noted that the signal levels are represented as L1 through L6 when the values of the multilevel data are 1 through 6, respectively.

Here, a description is given of the wobble amplitude Wwbl.

Figure 30B:
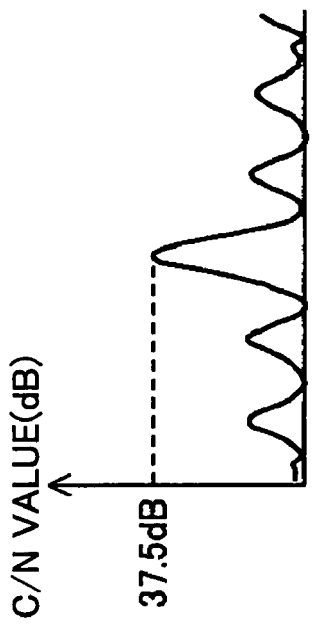
FIGS. 30A, 30B, 30C and 30D are waveform charts showing the signal quality of a wobble signal.
Figure 30D:
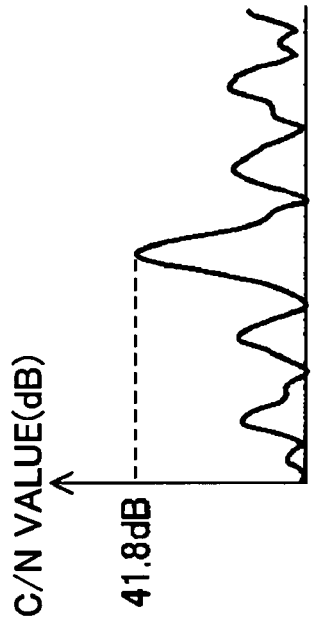
Figure 30A:
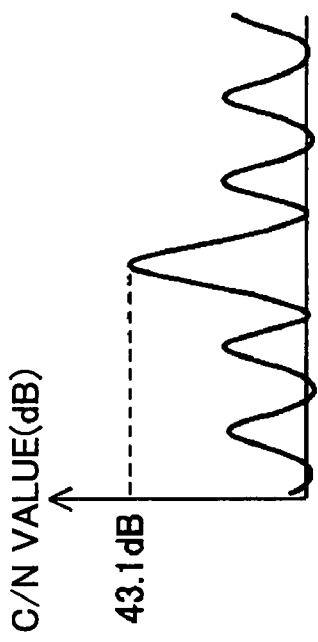
Figure 30C:
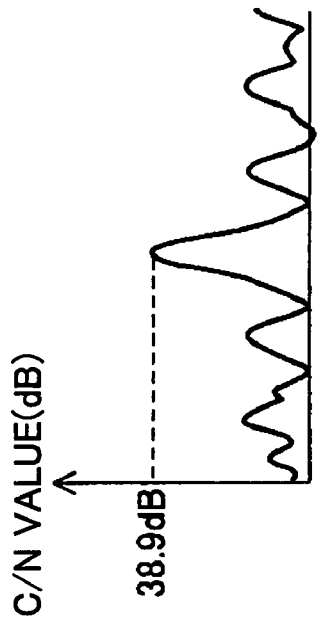

FIGS. 30A, 30B, 30C and 30D show examples of the measurement result of a C/N (carrier/noise) value, which represents the signal quality of a wobble signal. FIG. 30A shows C/N values of the wobble signal obtained from a region in which recording was made by the binary recording method. FIGS. 30B and 30C show C/N values of the wobble signal obtained from regions in which recording was made by the multilevel (8 value) recording method. Here, FIG. 30B shows the case where bandwidth limiting was not performed when modulating recorded data. FIG. 30C shows the case where bandwidth limiting was performed. It should be noted that, in FIGS. 30C through 30D, recording was made on the same optical disk in the same clock cycles.

Figures 31, 32:
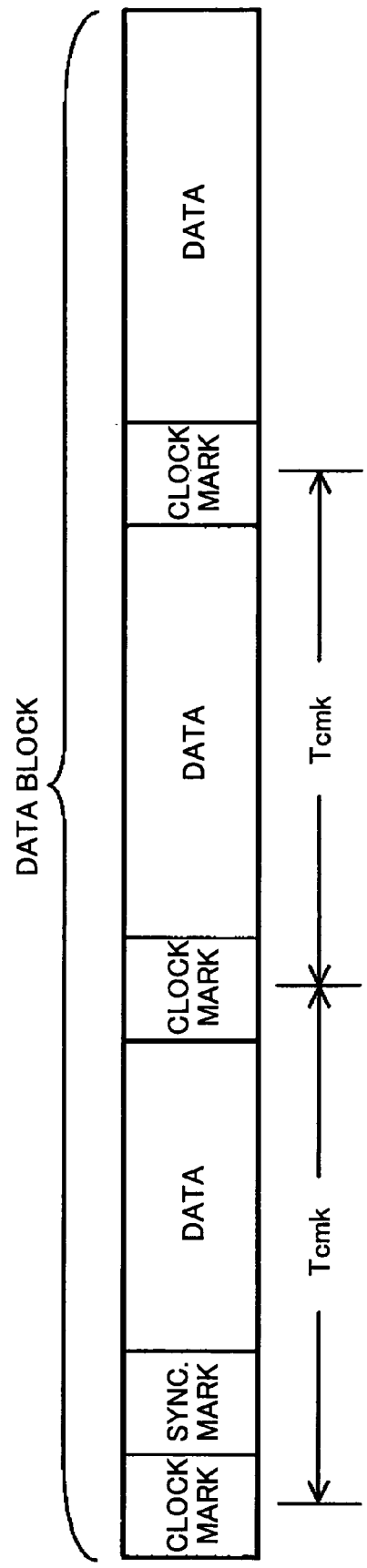
FIG. 31 is a table for explaining the difference in the signal quality of the wobble signal depending on the recording method.
FIG. 32 is a schematic diagram for explaining the structure of a data block.

According to the measurement results, as shown in FIG. 31, quality degradation of the wobble signal is less in the multilevel recording method than that in the binary recording method. In the binary recording method (e.g., DVD+RW), data are recorded by using marks and spaces having lengths of 13T to 14T (T: clock cycle). Hence, when there are consecutive marks and spaces having lengths of about 5T or more, the reproduction signal varies at substantially the maximum amplitude. On the other hand, in the multilevel recording method (here, 8 value), the reproduction signal varies at the maximum amplitude only in the case where the lowest level L7 continues immediately after the highest level L0 continues and in the reverse case. That is, in the multilevel recording method, the reproduction signal varies at the maximum amplitude less frequently than that in the binary recording method. Hence, leakage of the reproduction signal to the wobble signal is less in the multilevel recording method than that in the binary recording method. Thus, degradation of the signal quality of the wobble signal is reduced.

Thus, in an optical disk using the multilevel recording method, it is possible to reduce the wobble amplitude than that in an optical disk using the binary recording method. For example, in a DVD+RW using the binary recording method, the wobble amplitude is ±4% of a track pitch. Thus, in an optical disk using the multilevel recording method, if the wobble amplitude is about ±2.4% of a pit array pitch in the case where bandwidth limiting is performed, and if the wobble amplitude is ±3.4% of a pit array pitch in the case where bandwidth limiting is not performed, it is possible to obtain the wobble signal comparable with that in the binary recording method. Hence, in this embodiment, since the pit array pitch TP is 0.74 μm and bandwidth limiting is performed, the wobble amplitude Wwbl is set to ±17.8 nm.

As mentioned above, because it is possible to reduce the wobble amplitude in the multilevel recording method than that in the binary recording method, wobble components leaking to the reproduction signal are decreased. Thus, it is possible to reduce degradation of the quality of the reproduction signal due to wobble components.

Next, a description is given of the data format when recording data on the optical disk 115. Assuming that a set of data corresponding to one address (logical address) form one data block, then in this embodiment, as shown in FIG. 32 as an example, three clock marks (hereinafter also referred to as "CMs"), serving as three reference marks, are inserted at regular intervals. Hereinafter, the interval at which a CM is inserted is also called a CM period (Tcmk). In addition, a synchronization mark, which indicates a segment of information, is arranged between the first CM and data.

Figure 33:
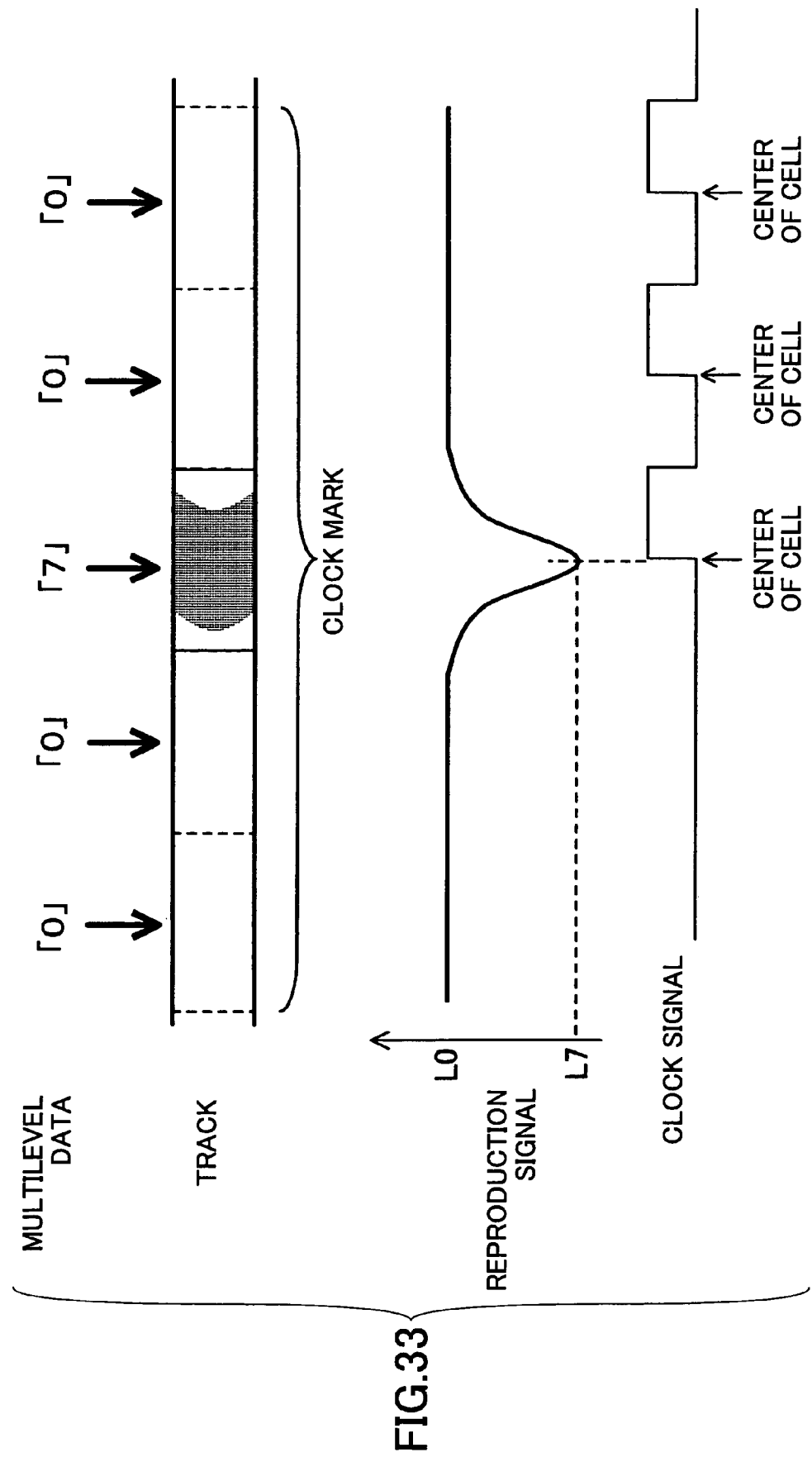
FIG. 33 is a schematic diagram for explaining a clock mark (CM)

The CM is a mark for specifying the center position of a cell. Here, as shown in FIG. 33 for example, a multilevel data string "00700" is used. That is, a CM has a size of five cells, the third cell thereof includes a pit having the maximum area, and the other cells do not include a recording mark. As shown in FIG. 33, the reproduction signal of the CM (hereinafter also referred to as a "CM signal" for convenience) becomes a "V-shape" signal that includes a bottom value (L7) corresponding to the center of the third cell. Accordingly, because two cells, each storing a fixed value (here, 0), exist before and after the middle cell, even if, for example, the size of a cell is small with respect to the spot diameter of an optical beam, a CM is readily detected, and it is possible to specify the center position of the cell from the timing that indicate the bottom value (L7).

Figure 34:
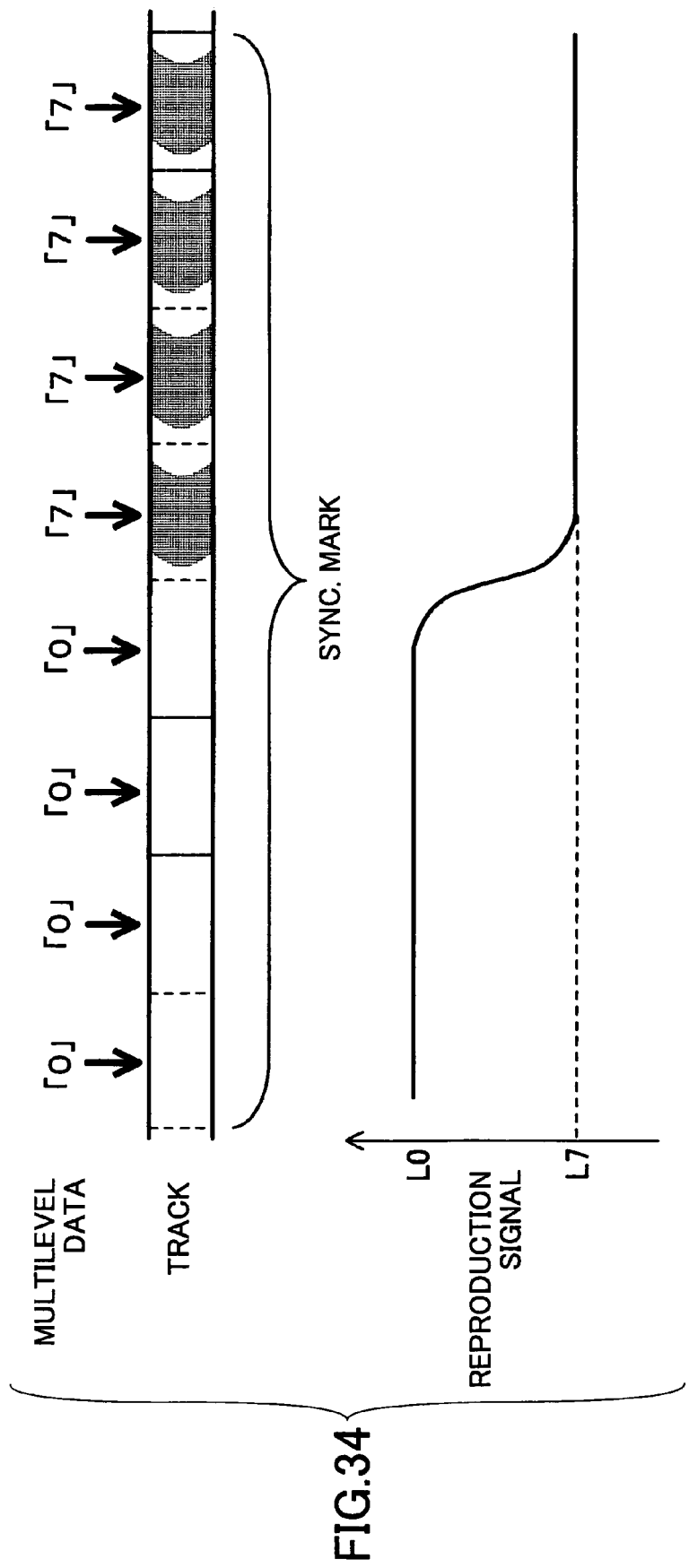
FIG. 34 is a schematic diagram for explaining a synchronization mark.

As shown in FIG. 34 for example, a multilevel data string "00007777" is used as the synchronization mark. The pattern of the multilevel data string is a pattern that does not appear in user data. The reproduction signal of the synchronization mark is, as shown in FIG. 34, a signal being at the highest level (L0) for four cells and at the lowest level (L7) for four cells. Accordingly, the synchronization mark is readily detected and it is possible to obtain, for example, the starting position of information.

The physical address added to a wobble signal and the logical address recorded as data in a pit array must be uniquely associated with respect to the absolute position in an optical disk. In order to secure such association, it is necessary that the length of one data block (hereinafter also referred to as "data block length") and the length of one wobble block (hereinafter also referred to as "wobble block length") are in a predetermined relationship. For example, in the case where the data block length and the wobble block length are equal to each other, the physical address and the logical address are readily associated with each other. Additionally, even if both block lengths are not equal to each other, in the case where, for example, 2 wobble blocks correspond to one data block, the physical address and the logical address are readily associated with each other.

Further, when detecting the CM, the wobble signal becomes noise components, and when detecting the wobble signal, the CM becomes noise components.

Hence, a regular relationship is made between the CM period Tcmk and the wobble period Twbl so that the physical address and the logical address are readily associated with each other and that the CM and the wobble signal are detected with a good accuracy. Here, with reference to FIG. 35 a description is given of the relationship between m and n, where m=Tcmk/Tcell and n=Twbl/Tcell. It should be noted that, in FIG. 35, for convenience, illustration is made as if the wobble period Twbl varies. However, here, CM period Tcmk varies.

(When m=n)

When m=n, a CM may be arranged at a position where the phase of wobbling becomes always the same.

Figure 35:
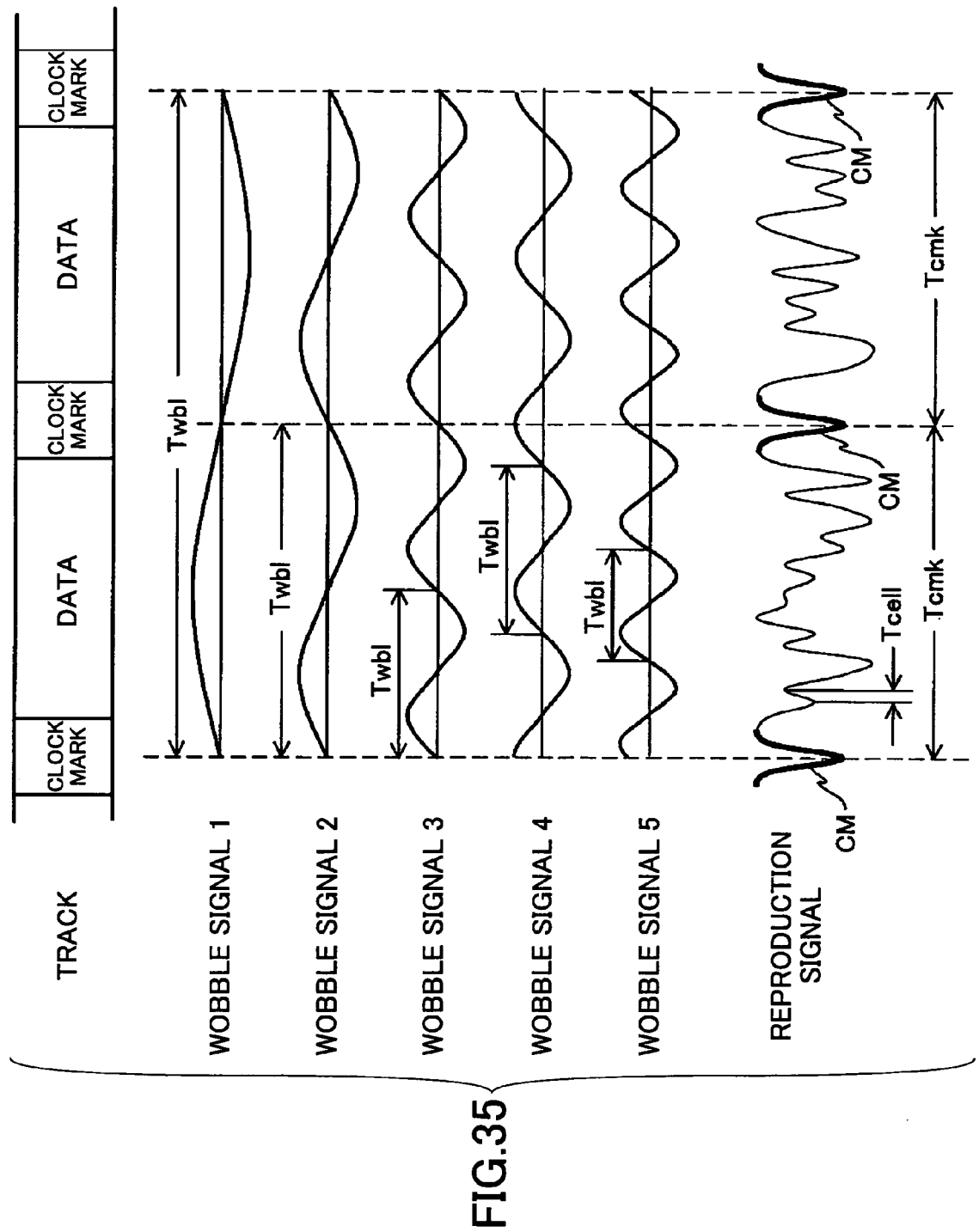
FIG. 35 is a schematic diagram for explaining the relationship between a wobble period and a CM period.

As indicated by a wobble signal 2 in FIG. 35, in the case where CMs are arranged at positions where the wobble phase becomes 0 degree, the spot center at the CM positions is always located in the middle of the track. Thus, when detecting the CMs, noise due to the wobble signal is decreased. Hence, it is possible to accurately detect the CMs. In addition, when detecting the wobble signal, noise due to the CMs is decreased. Hence, it is possible to accurately detect the wobble signal. The same applies to the case where the CMs are arranged at positions where the wobble phase becomes 180 degrees.

In the case where CMs are arranged at positions where the wobble phase becomes 90 degrees or 270 degrees, the spot center is shifted from the middle of the track. However, the shift amount is substantially constant. In this case, noise due to the wobble signal when detecting CMs is not small. However, since the noise is at substantially the same noise level, it is possible to readily remove the noise components by obtaining the noise level in advance. Similarly, noise due to CMs when detecting the wobble signal is not small. However, since the noise is at substantially the same noise level, it is possible to readily remove the noise components by obtaining the noise level in advance. Accordingly, it is possible to accurately detect both CMs and wobble signal.

Further, in the case where multilevel data having a pattern with which the CM signal and the wobble signal become similar, it is preferable that CMs are arranged at positions where the wobble phase becomes 90 degrees or 270 degrees. Normally, when generating a clock signal from the wobble signal, it is based on the level of the amplitude center of the wobble signal. Hence, when the CM signal and the wobble signal are similar to each other, if CMs are arranged at positions where the wobble phase becomes 0 degree or 180 degrees, the level of the amplitude center varies due to leakage of the CM signal, and the accuracy of the clock signal may be degraded. However, when CMs are arranged at positions where the wobble phase becomes 90 degrees or 270 degrees, even if the CM signal and the wobble signal are similar to each other, it is possible to make a variation in the level of the amplitude center small.

Additionally, CMs may be arranged at positions where the wobble phase becomes 45 degrees or 135 degrees. In this case, similar to the case where CMs are arranged at positions where the wobble phase becomes 90 degrees or 270 degrees, it is possible to readily remove the noise components. Hence, it is possible to accurately detect both CMs and wobble signal.

(When $m=n/2$)

When $m=n/2$, two CMs are inserted in one wobble period. Also in this case, CMs may be arranged at positions where the wobble phase becomes always the same.

As indicated by the wobble signal 1 in FIG. 35, in the case where CMs are arranged at positions where the wobble phase becomes 0 degree and 180 degrees, the spot center at the CM positions is always located in the middle of a pit array. Accordingly, when detecting CMs, noise due to the wobble signal becomes small. Thus, it is possible to accurately detect the CMs. In addition, when detecting the wobble signal, noise due to CMs becomes small. Thus, it is possible to accurately detect the wobble signal.

Further, in this case, insertion frequency of CMs becomes high, and it is necessary to reduce the length of each CM so as to reserve storage capacity for data. Hence, there is no possibility that the CM signal and the wobble signal are used in similar patterns. Thus, there is no advantage in arranging CMs at positions where the wobble phase becomes 90 degrees or 270 degrees.

Additionally, in this case, the period of the clock signal obtained from CMs becomes equal to the period of the clock signal obtained from the wobble signal. Hence, in a clock signal generation circuit, which is described below, it is possible to make each parameter in a PLL circuit the same. Thus, control can be readily performed.

(When $m=a \times n$)

When $m=a \times n$ (a: integer), one CM is inserted in "a" wobble periods. Also in this case, CMs may be arranged at positions where the wobble phase becomes always the same. Wobble signals 3 and 4 in FIG. 35 show examples in the case where a=2. A wobble signal 5 in FIG. 35 shows an example in the case where a=3.

As indicated by the wobble signal 3 in FIG. 35, in the case where CMs are arranged at ones of the positions where the wobble phase becomes 0 degree, the spot center at the CM positions is always located in substantially the middle of a track. Accordingly, when detecting CMs, noise due to the wobble signal becomes small. Thus, it is possible to accurately detect the CMs. Additionally, when detecting the wobble signal, noise due to the CMs becomes small. Thus, it is possible to accurately detect the wobble signal. Further, the same applies to the case where CMs are arranged at ones of positions where the wobble phase becomes 180 degrees.

In addition, as indicated by the wobble signal 4 in FIG. 35, in the case where CMs are arranged at ones of positions where the wobble phase becomes 90 degrees, the spot center is shifted from the middle of a track. However, the shift amount is substantially constant. In this case, noise due to the wobble signal when detecting CMs is not small, but the noise level is always substantially the same. Hence, it is possible to readily remove the noise components by obtaining the noise level in advance. Similarly, noise due to CMs when detecting the wobble signal is not small, but the noise level is always substantially the same. Hence, it is possible to readily remove the noise components by obtaining the noise level in advance. Accordingly, it is possible to accurately detect both CMs and wobble signal. Further, the same applies to the case where CMs are arranged at ones of positions where the wobble phase becomes 270 degrees.

Additionally, as indicated by the wobble signal 5 in FIG. 35, in the case where CMs are arranged at ones of positions where the wobble phase becomes 45 degrees, the spot center is shifted from the middle of a track. However, the shift amount is substantially constant. In this case, similar to the case where CMs are arranged at ones of positions where the wobble phase becomes 90 degrees, it is possible to readily remove the noise components. Hence, it is possible to accurately detect both CMs and wobble signal. Further, the same applies to the case where CMs are arranged at ones of positions where the wobble phase becomes 135 degrees, 225 degrees, and 315 degrees.

Figure 36A:
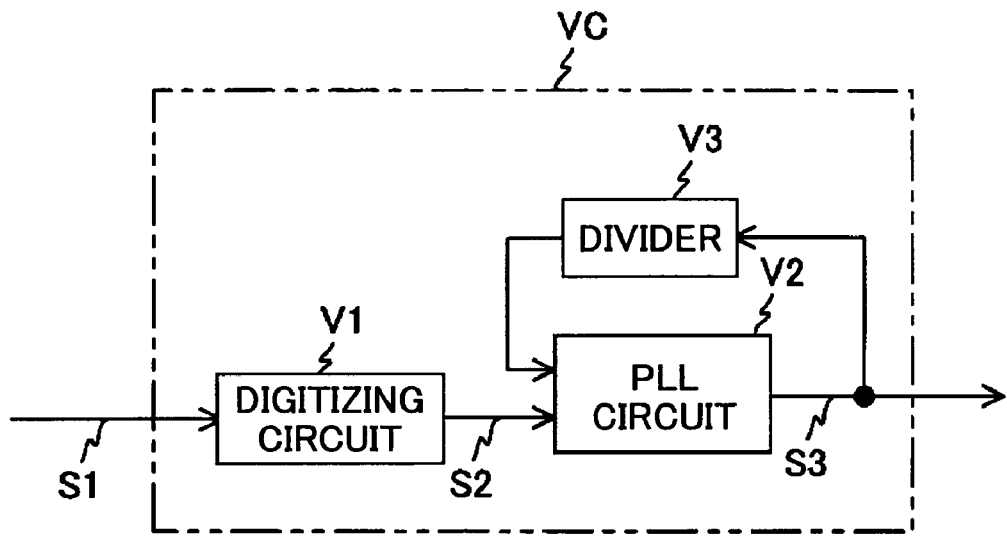
FIG. 36A is a block diagram for explaining a virtual clock signal generation circuit used for simulation of the relationship between an edge period and clock jitter.
Figure 36B:
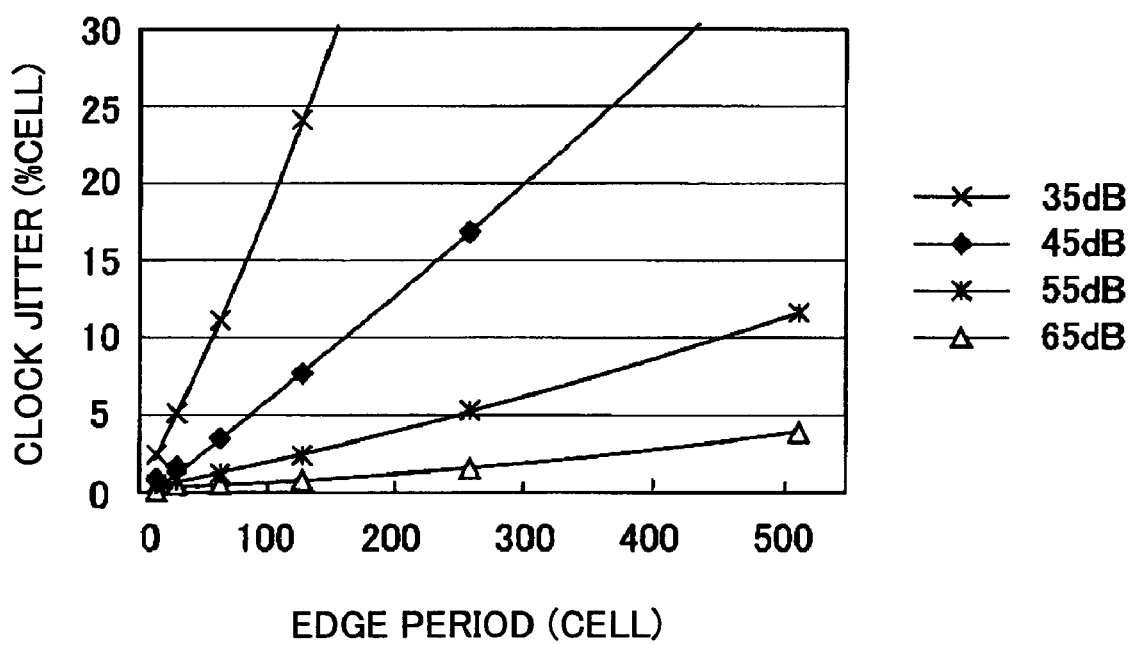
FIG. 36B is a graph for explaining the simulation results.

Each of a reproduction clock signal generated from CMs and a reference clock signal generated from the wobble signal must be stable within a permissible accuracy range. Thus, there is a limitation on the value of "a". Therefore, by using a virtual clock signal generation circuit VC as shown in FIG. 36A, jitter (hereinafter also referred to as "clock jitter") in the generated clock signal was obtained by simulation. The clock signal generation circuit VC includes a digitization circuit V1 digitizing an input signal S1, a PLL circuit V2 generating a clock signal S3 based on the signal S2 that is digitized in the digitization circuit V1, and a divider V3 dividing the clock signal S3 and producing the signal whose phase is compared with that of the signal S2 in the PLL circuit. The PLL circuit V2 possesses general characteristics: cell frequency is 25 MHz and crossover frequency is approximately 2.6 kHz. FIG. 36B shows, as examples of the simulation result, the relationship between the period of the signal S2 (hereinafter also referred to as "edge period") and the clock jitter in the clock signal S3 for each signal quality of the signal S1.

Referring to cases of recordable CDs and DVDs that are currently commercially available, the quality of the wobble signal is about 45 dB (when unrecorded). Additionally, experience shows that permissible jitter of a reference signal should be 5% or less of the cell period. Therefore, assuming that the signal S1 is the wobble signal, it is observed from FIG. 36B that the period of the signal S2 should be 80 cells or less based on the quality of the wobble signal and the condition of jitter. Since phase comparison can be performed by the rising edge and the falling edge in the case of the wobble signal, the wobble period may be expanded up to 1160 cells. Further, in terms of band separation from multilevel data, it is preferable that the wobble period be 1/10 or less of the frequency of the minimum repeating pattern in which data vary for each cell. That is, it is preferable that the wobble period be 20 times or more the cell period. Accordingly, n (=Twbl/Tcell) is an integer from 20 to 1160. It should be noted that, in a recorded region, the quality of the wobble signal may vary depending on how recording is made.

The quality of the CM signal is higher than that of the wobble signal and 55 dB or higher is obtained. Additionally, experience shows that permissible jitter of the reproduction clock signal should be 5% or less of the cell period. Therefore, assuming that the signal S1 is the CM signal, it is observed from FIG. 36B that the period of the signal S2 should be 2160 cells or less based on the quality of the CM signal and the condition of jitter. However, when the insertion frequency of CM is increased, though detection accuracy of CM may be improved, the amount of information (data) is decreased. Hence, it is desirable that the ratio of CM in the total amount of information be within 10%. Accordingly, m (=Tcmk/Tcell) is an integer from 50 to 2160. Thus, the maximum value of "a" is 13 (=2160/20)

That is, as for the relationship between m and n, one of "m=n", "m=n/2", and "m=n×a" should be satisfied.

FIG. 37 shows the general structure of an optical disk device 120 according to one embodiment of the present invention. The optical disk device 120 shown in FIG. 37 includes: a spindle motor 122 for rotating the optical disk 115; an optical pickup device 123; a seek motor 121 for driving the optical pickup device 123 in a sledge direction; a laser control circuit 124; an encoder 125; a servo control circuit 126; a reproduction signal processing circuit 128; a buffer RAM 134; a buffer manager 137; an interface (I/F) 138; a flash memory 139; a CPU 140; and a RAM 141. It should be noted that the arrows shown in FIG. 37 indicate typical flow of signals or information, and do not indicate all relationships between each block.

Figure 38A:
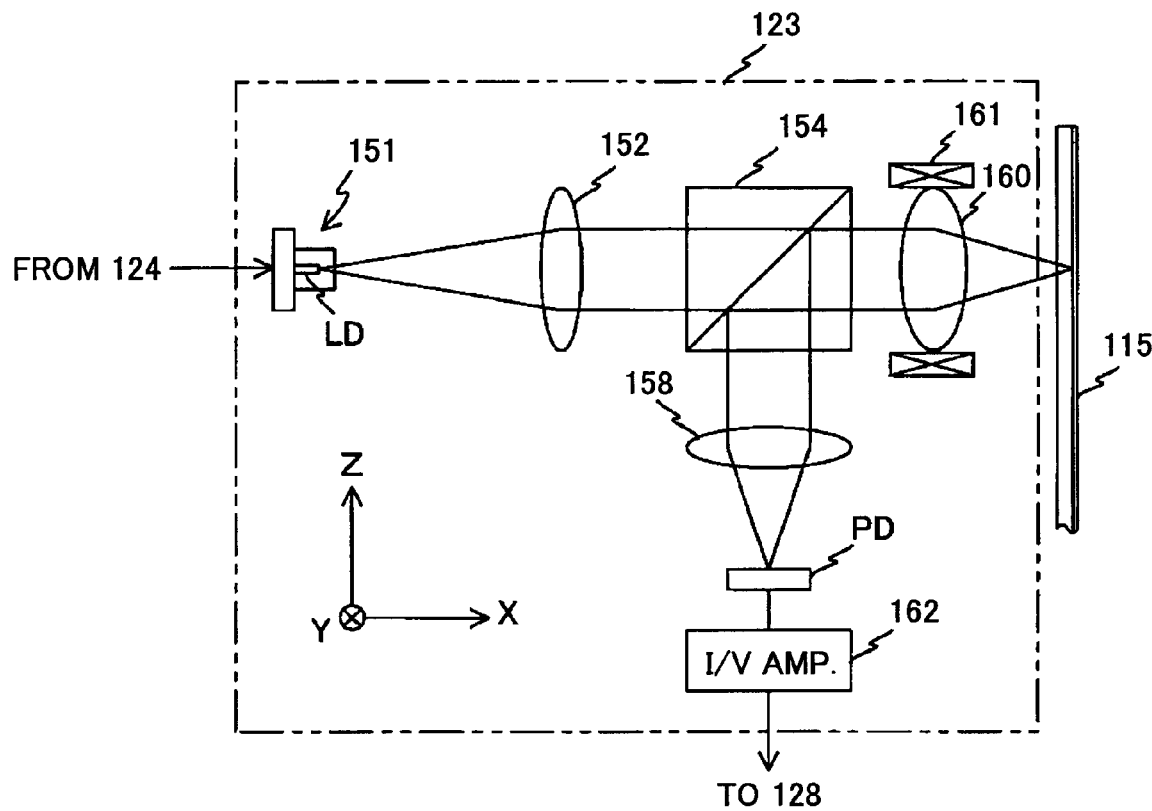
FIG. 38A is a schematic diagram for explaining the structure of the optical pickup device shown in FIG. 37.

The optical pickup device 123 is a device for emitting a laser beam on a recording surface of the optical disk 115 and receiving the reflected beam from the recording surface. As shown in FIG. 38A for example, the optical pickup device 123 includes a light source unit 151, a coupling lens 152, a beam splitter 154, an objective lens 160, a detection lens 158, a photoreceiver PD, an I/V amplifier 162, and a drive system 161 for driving the objective lens 160.

The light source unit 151 includes a semiconductor laser LD as the light source that emits laser light having a wavelength of approximately 16160 nm. It should be noted that, in this embodiment, the maximum intensity emitting direction of the laser light emitted from the light source unit 151 is +X direction. The coupling lens 152 is arranged on the +X side of the light source unit 151. The light emitted from the light source unit 151 is made substantially parallel by the coupling lens 152.

The beam splitter 154 is arranged on the +X side of the coupling lens 152. The beam splitter 154 transmits the light from the coupling lens 152 as is, and directs the light (returning light) reflected by the optical disk 115 in the −Z direction. The objective lens 160 is arranged on the +X side of the beam splitter 154. The objective lens 160 focuses the light that passes through the beam splitter 154 onto the recording surface of the optical disk 115.

Figure 38B:
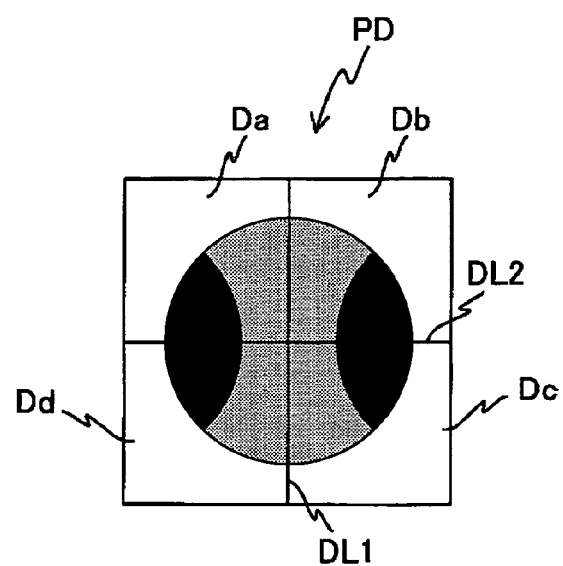
FIG. 38B is a schematic diagram for explaining a photoreceiver shown in FIG. 38A.

The detection lens 158 is arranged on the −Z side of the beam splitter 154. The detection lens 158 focuses, onto an acceptance surface of the photoreceiver PD, the returning light that is directed in the −Z direction by the beam splitter 154. As shown in FIG. 38B for example, the acceptance surface of the photoreceiver PD is divided into four regions (acceptance regions Da, Db, Dc and Dd) by a dividing line (DL1) extending in a direction corresponding to a tangential direction of a track of the optical disk 115 and by a dividing line (DL2) that is orthogonal to the dividing line DL1. Here, one track pattern is received by the acceptance regions Da and Dd, and the other track pattern is received by the acceptance regions Db and Dc. Each of the acceptance regions generates a signal in accordance with the amount of received light by photoelectric conversion.

The I/V amplifier 162 converts the signal from each of the acceptance regions of the photoreceiver PD into a voltage signal, amplifies it by a predetermined gain, and outputs it to the reproduction signal processing circuit 28.

The drive system 161 includes: a focusing actuator for minutely driving the objective lens 160 in a focusing direction, which is the optical axis direction of the objective lens 160; and a tracking actuator for minutely driving the objective lens 160 in a tracking direction, which is a direction that is orthogonal to a tangential direction of a track.

Referring again to FIG. 37, the reproduction signal processing circuit 28 includes, for example, a servo signal detection circuit 128b, a wobble signal detection circuit 128c, a RF signal detection circuit 128d, a decoder 128e, a clock signal generation circuit 128f, a demodulation circuit 128g, and a record start timing signal generation circuit 128h.

The servo signal detection circuit 128b detects a servo signal, such as a focus error signal and a track error signal, based on the output signal of the I/V amplifier 162. The detected servo signal is output to the servo control circuit 26.

The RF signal detection circuit 128d detects a RF signal based on the output signal of the I/V amplifier 162. The detected RF signal is output to the clock signal generation circuit 128f and the decoder 128e.

The wobble signal detection circuit 128c detects a wobble signal based on the output signal of the I/V amplifier 162. The detected wobble signal is output to the clock signal generation circuit 128f and the demodulation circuit 128g.

Figure 39:
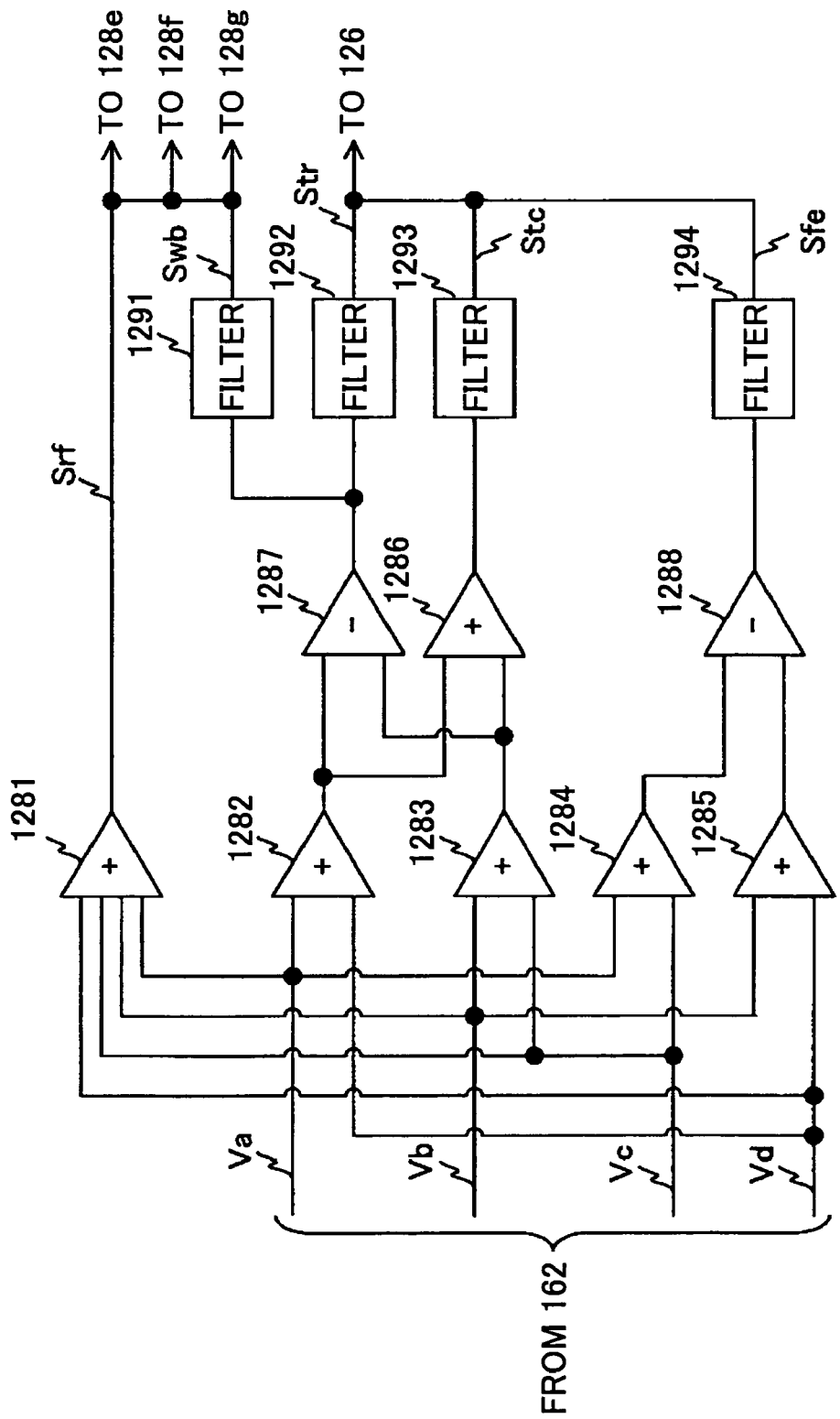
FIG. 39 is a schematic diagram for explaining specific circuit-configurations of a servo signal detection circuit, a wobble signal detection circuit, and a RF signal detection circuit shown in FIG. 13.

FIG. 39 shows an example of the circuit obtained by combining the servo signal detection circuit 128b, the RF signal detection circuit 128d, and the wobble signal detection circuit 128c. The circuit shown in FIG. 39 includes six adders (1281 through 1286), two subtracters (1287, 1288), and four filters (1291 through 1294). The adder 1281 adds up four signals (Va, Vb, Vc and Vd) from the I/V amplifier 162. It should be noted that the signal Va, the signal Vb, the signal Vc, and the signal Vd are the output signals of the I/V amplifier 162 corresponding to the output signals of the acceptance regions Da, Db, Dc, and Dd of the photoreceiver PD, respectively. The output signal of the adder 1281 is a wide band signal and is output, as a RF signal Srf, to the clock signal generation circuit 128f and the decoder 128e.

The adder 1282 adds up the signal Va and the signal Vd. The adder 1283 adds up the signal Vb and the signal Vc. The adder 1284 adds up the signal Va and the signal Vc. The adder 1285 adds up the signal Vb and the signal Vd. The adder 1286 adds up the output signal of the adder 1282 and the output signal of the adder 1283. The subtracter 1287 subtracts the output signal of the adder 1283 from the output signal of the adder 1282. The subtracter 1288 subtracts the output signal of the adder 1285 from the output signal of the adder 1284.

The filter 1291 removes a low-frequency component included in the output signal of the subtracter 1287. The output signal of the filter 1291 is a high-frequency signal, and is output, as a wobble signal Swb, to the clock signal generation circuit 128f and the demodulation circuit 128g.

The filter 1292 removes a high-frequency component included in the output signal of the subtracter 1287. The output signal of the filter 1292 is a low-frequency signal, and is output to the servo control circuit 26 as a track error signal Str. That is, the track error signal Str is obtained by a so-called push-pull method.

The filter 1293 removes a high-frequency component included in the output signal of the adder 1286. The output signal of the filter 1293 is a low-frequency signal, and is output to the servo control signal 26 as a track cross signal Stc.

The filter 1294 removes a high-frequency component included in the output signal of the subtracter 1288. The output signal of the filter 1294 is a low-frequency signal, and is output to the servo control signal 26 as a focus error signal Sfe. That is, the focus error signal Sfe is obtained by a so-called astigmatic method.

Figure 40:
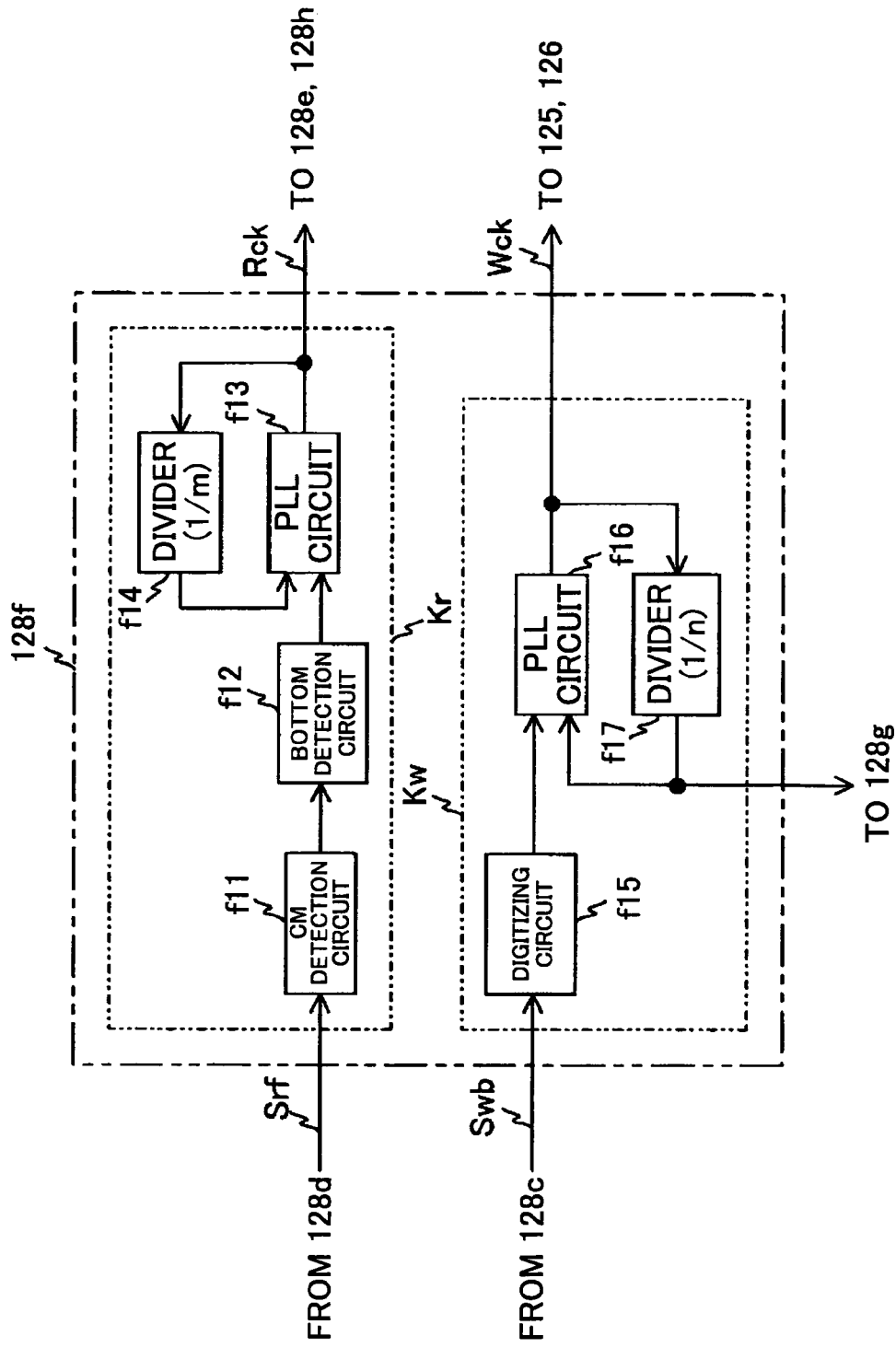
FIG. 40 is a block diagram for explaining a clock signal generation circuit shown in FIG. 37.

The clock signal generation circuit 128f generates a reproduction clock signal (Rck) based on the RF signal, and generates a reference clock signal (Wck) based on the wobble signal. As shown in FIG. 40 for example, the clock signal generation circuit 128f includes: a reproduction clock signal generation circuit Kr generating the reproduction clock Rck; and a reference clock signal generation circuit Kw generating the reference clock signal Wck.

Figure 41:
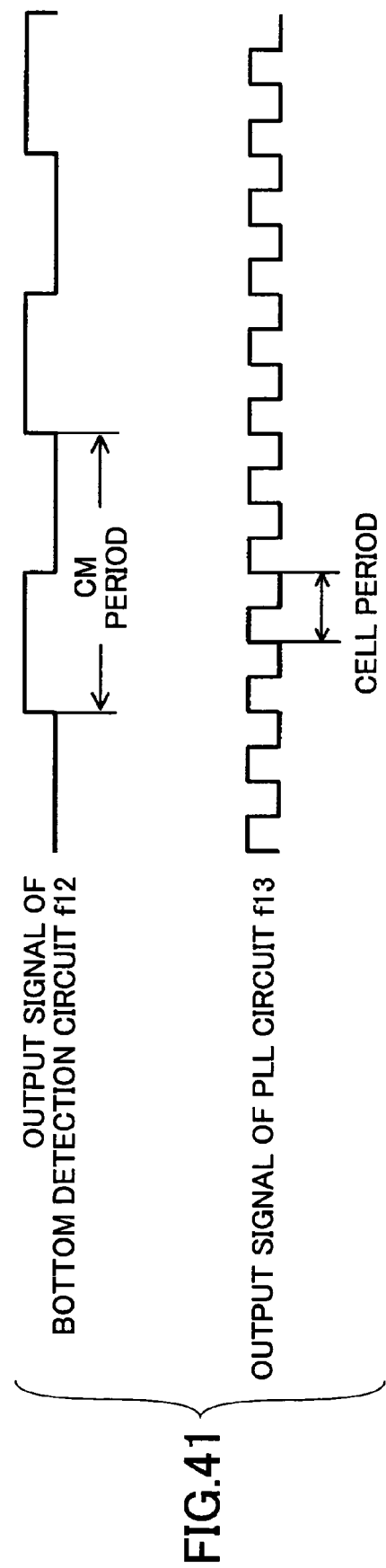
FIG. 41 is a schematic diagram for explaining the operation of a reproduction clock signal generation circuit shown in FIG. 40.

The reproduction clock signal generation circuit Kr includes a CM detection circuit f21, a bottom detection circuit f12, a PLL circuit f13, and a divider f14. The CM detection circuit f21 monitors the RF signal and detects the CM signal. The bottom detection circuit f12 detects the bottom position of the CM signal detected by the CM detection circuit f21. Thus, as shown in FIG. 41 for example, the output signal of the bottom detection circuit f12 is a pulse signal synchronized with the CM period. Here, since the CM period is "m" times the cell period, the PLL circuit f13 generates a signal having a frequency "m" times that of the output signal of the bottom detection circuit f12 (see FIG. 41). The output signal of the PLL circuit f13 is supplied to, for example, the decoder 128e and the record start timing signal generation circuit 128h as the reproduction clock signal Rck. Further, in order to perform phase comparison with the output signal of the bottom detection circuit f12, the output signal of the PLL circuit f13 is divided by m in the divider f14 and then input to the PLL circuit f13. Thereby, the stable reproduction clock signal Rck is output.

The reference clock signal generation circuit Kw includes a digitizing circuit f15, a PLL circuit f16, and a divider f17. The digitizing circuit f15 digitizes the wobble signal based on its amplitude center level. Since the wobble period is "n" times the cell period, the PLL circuit f16 generates a signal having a frequency "n" times that of the output signal of the digitizing circuit f15. The output signal of the PLL circuit f16 is supplied to, for example, the encoder 125 and the servo control circuit 26 as the reference clock signal Wck. Further, in order to perform phase comparison with the output signal of the digitizing circuit f15, the output signal of the PLL circuit f16 is divided by the divider f17 and then input to the PLL circuit f16. Thereby, the stable reference clock signal Wck is output. In addition, the output signal of the divider f17 is supplied to the demodulation circuit 128g.

Referring again to FIG. 37, the decoder 128e obtains multilevel data from the RF signal in synchronization with the reproduction clock signal Rck, and performs, for example, a decoding process and an error detection process. When an error is detected, the decoder 128e performs an error correction process, and then stores it in the buffer RAM 134 via the buffer manager 137 as reproduction data. Here, since the center of cell is accurately specified by the reproduction clock signal Rck, it is possible to stably and accurately obtain reproduction data. It should be noted that the RF signal includes address data, and the decoder 128e outputs the address data extracted from the RF signal to the CPU 140. The address data are logical address data.

The demodulation circuit 128g demodulates the wobble information part based on the wobble signal and the output signal of the divider f17, and obtains address data or a media parameter. The thus obtained address data are supplied to, for example, the CPU 140 and the record start timing signal generation circuit 128h, and the media parameter is supplied to the CPU 140.

Figure 42:
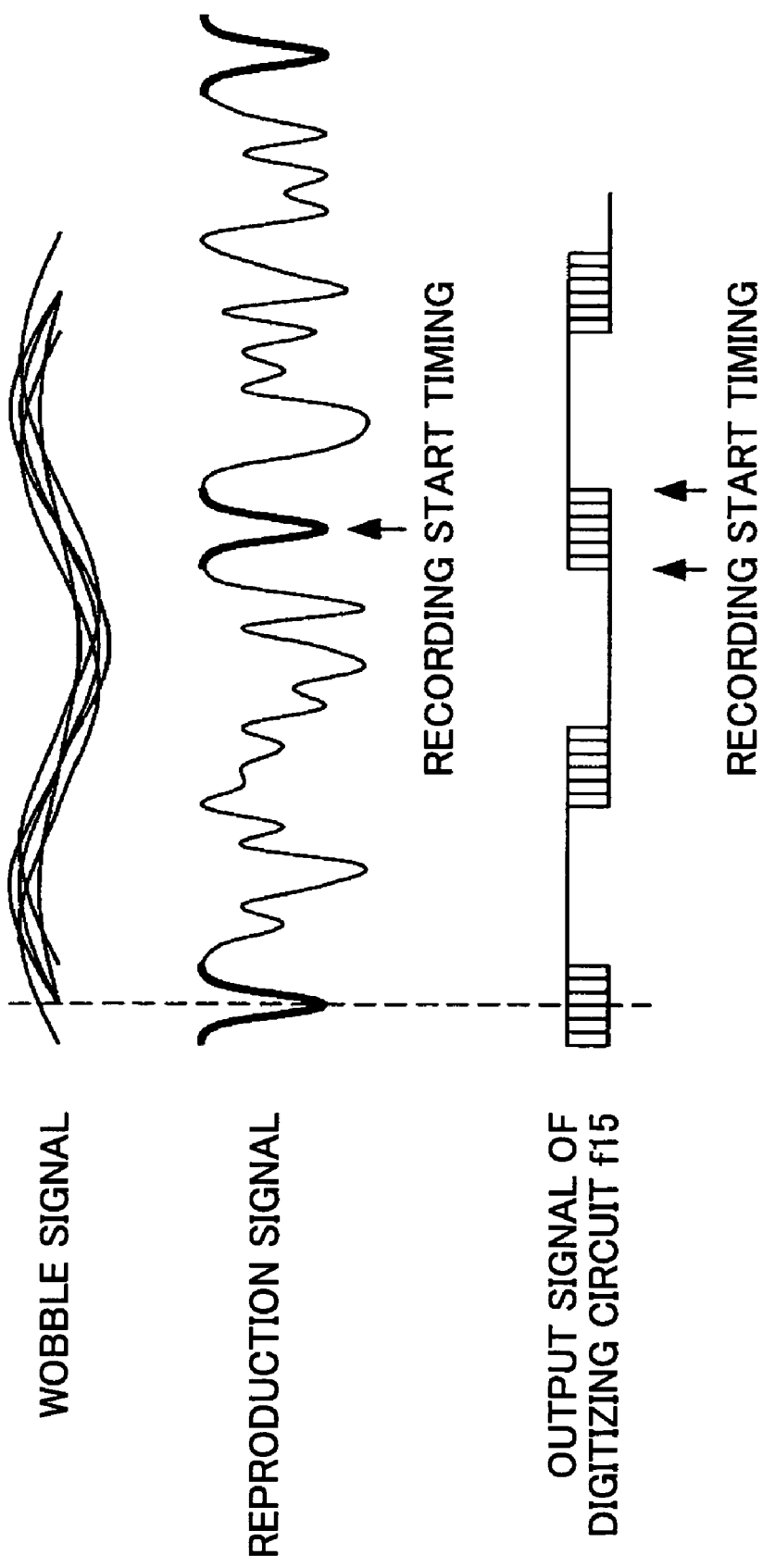
FIG. 42 is a schematic diagram for explaining a record start timing extracted from a CM and the record start timing extracted from a wobble signal.

The record start timing signal generation circuit 128h generates a record start timing signal based on the address data and the reproduction clock signal. The thus generated record start timing signal is output to the encoder 125. As shown in FIG. 42 for example, the wobble signal interferes with the wobble signal in the adjacent track due to cross talk, and the amplitude and phase may be slightly changed. However, the CM signal is hardly changed. Hence, compared to conventional cases where the record start timing signal is generated by using the reference clock signal, it is possible to more accurately generate the record start timing signal.

Referring again to the servo control circuit 26 includes a PU control circuit 126a, a seek motor control circuit 126b, and a SP motor control circuit 126c.

In order to correct a focus shift of the objective lens 160, the PU control circuit 126a generates a drive signal for the focusing actuator based on the focus error signal, and outputs the drive signal to the optical pickup device 123. Additionally, in order to correct a tracking shift of the objective lens 160, the PU control circuit 126a generates a drive signal for the tracking actuator based on the track error signal, and outputs the drive signal to the optical pickup device 123. Thereby, tracking control and focus control are performed.

The seek motor control circuit 126b generates a drive signal for driving the seek motor 121 based on an instruction from the CPU 140, and outputs the drive signal to the seek motor 121.

The SP motor control circuit 126c generates a drive signal for driving the spindle motor 122 based on an instruction from the CPU 140, and outputs the drive signal to the spindle motor 122. In addition, the SP control circuit 126c detects the disk rotation speed based on the reference clock signal, and compares the detected disk rotation speed with a target speed, thereby controlling the rotation speed of the spindle motor 122.

The buffer RAM 134 temporarily stores, for example, data (recording data) to be recorded on the optical disk 115 and data (reproduction data) reproduced from the optical disk 115. Data input to and data output from the buffer RAM 134 are managed by the buffer manager 137.

The encoder 125 obtains, via the buffer manager 137, the recording data accumulated in the buffer RAM 134 based on an instruction from the CPU 140, performs, for example, data modulation and addition of an error correction code, and generates a write signal with respect to the optical disk 115. The thus generated write signal is output to the laser control circuit 124 in synchronization with the record start timing signal. Here, since the record start timing signal is generated based on the CM signal, it is possible to perform recording that matches an absolute position of the optical disk 115.

The laser control circuit 124 controls the power of laser light emitted from the semiconductor laser LD. For example, at the time of recording, the laser control circuit 124 generates the drive signal for the semiconductor laser LD based on, for example, the write signal, recording conditions, and the light emitting characteristics of the semiconductor laser LD.

The interface (I/F) 138 is a bidirectional communication interface with the higher-level device (e.g., personal computer) 90. The interface 138 conforms to standard interfaces such as ATAPI (AT Attachment Packet Interface) and SCSI (Small Computer System Interface).

The flash memory 139 includes a program region and a data region. The program region of the flash memory 139 stores a program written in a code that can be interpreted by the CPU 140. Additionally, the data region of the flash memory 139 stores, for example, the recording conditions and the light emitting characteristics of the semiconductor laser LD.

The CPU 140 controls the operation of each part in accordance with the program stored in the program region of the flash memory 139, and saves, for example, data necessary for the control in the RAM 141 and the buffer RAM 134.

As will be appreciated from the above description, in the optical disk device 120 according to this embodiment, the reproduction clock signal generation circuit Kr forms clock signal generation means, and the decoder 128e forms reproduction means. Additionally, the wobble signal detection circuit 128c forms wobble signal detection means. The optical pickup device 123, the laser control circuit 124, the record start timing signal generation circuit 128h, and the encoder 125 form recording means.

The reproduction clock signal generation circuit Kr performs the steps of detecting a reference mark and generating a clock signal of a signal generation method according to the present invention. In addition, the step of generating the record start timing signal is performed in the record start timing signal generation circuit 128h.

As described above, with the optical disk 115 according to this embodiment, because plural CMs (reference marks) are included in multilevel (8 level) information such that the CMs correspond to the period of wobble (meandering) of a track, it is possible to accurately detect the CMs without being affected by the wobble. Thus, by referring to the reference marks, it is possible to accurately obtain positions where multilevel information is recorded.

Additionally, the CMs are formed at positions where the spot center matches the middle position of a pit array or positions where a shift amount between the spot center and the middle position of a pit array becomes a predetermined value. Hence, it is possible to accurately detect both CMs and wobble signal.

Additionally, one of the relationships "m=n", "m=n/2", and "m=n×a" is satisfied, where "m" is the number of cells included in the CM period, and "n" is the number of cells included in the wobble period. Hence, it is possible to accurately detect both CMs and wobble signal.

Additionally, because "m" is an integer from 50 to 2160, it is possible to accurately generate the reproduction clock signal while not degrading the amount of recordable information very much.

Additionally, because "n" is an integer from 20 to 1160, it is possible to accurately generate the reference clock signal.

Additionally, because the address information (phase-modulated wave part) in the wobble information part is phase modulated by the same period as the carrier wave part, it is possible to readily demodulate the wobble information.

Additionally, since the CMs are added to the synchronization marks, it is possible to accurately detect the synchronization marks and readily clarify the segment of information.

Additionally, in the optical disk device 120 according to this embodiment, when accessing the optical disk 115 that includes a recording surface having thereon a spiral or concentric track that periodically wobbles and includes plural CMs (reference marks) in multilevel (8 level) information such that the CMs correspond to the period of wobble, the CMs are detected based on the reflected light from the recording surface of the optical disk 115, and the reproduction clock signal (clock signal) is generated based on the detected CMs. Here, because the CMs are formed such that the CMs correspond to the period of wobble of the track, the CMs are accurately detected without being affected by the wobble. Thereby, the reproduction clock signal is accurately and stably generated. As a result, reproduction of information recorded on the optical disk 115 is stably performed. That is, it is possible to stably access information recorded on an optical disk according to the present invention.

Further, because the record start timing signal is generated based on the reproduction clock signal, it is possible to accurately record multilevel data on the center of a target cell.

Figure 43:
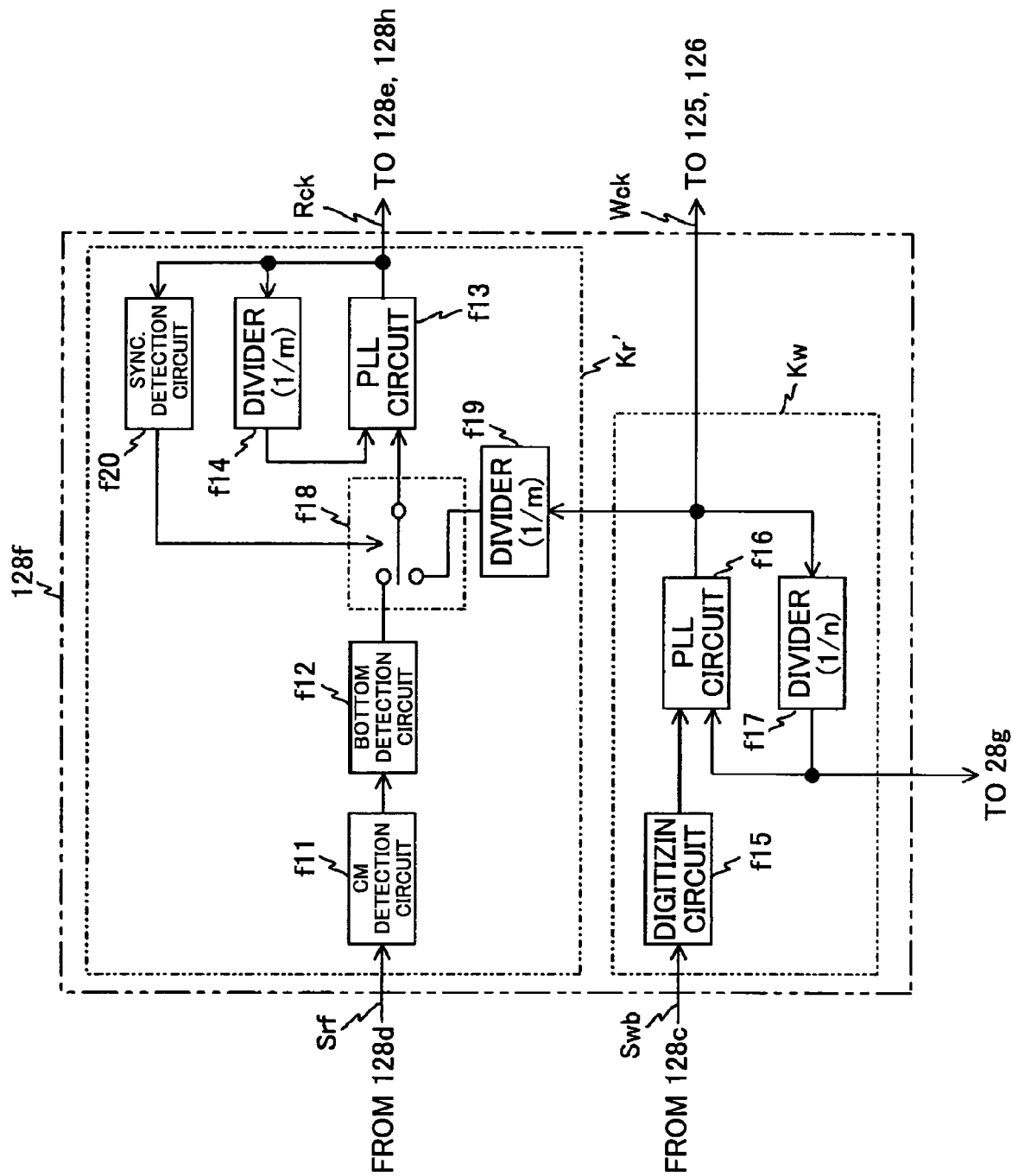
FIG. 43 is a block diagram for explaining a variation of the clock signal generation circuit.

It should be noted that, in the clock signal generation circuit 128f in the above embodiment, a reproduction clock signal generation circuit Kr' shown in FIG. 43 may be used instead of the reproduction clock signal generation circuit Kr. The reproduction clock signal generation circuit Kr' generates a pseudo clock signal (pulse signal) based on the wobble signal, and generates the reproduction clock signal based on the pseudo clock signal and the CMs. That is, clock synchronization is roughly performed based on the wobble signal, and clock synchronization is finely performed based on the reproduction signal. Thus, the reproduction clock signal generation circuit Kr' has a structure obtained by adding a switch f18, a divider f19, and a synchronization detection circuit f210 to the reproduction clock signal generation circuit Kr.

The divider f19 divides the reference clock signal Wck from the reference clock signal generation circuit Kw by "m". The switch f18 selects and outputs, to the PLL circuit f13, one of the output signal from the divider f19 and the output signal of the bottom detection circuit f12. The synchronization detection circuit f210 detects a synchronization state based on the output signal of the PLL circuit f13 and controls the switch f18.

Here, a brief description is given of the function of the reproduction clock signal generation circuit Kr'. First, the synchronization detection circuit f210 sets the switch f18 to the divider f19. Thereby, the output signal of the divider f19 is supplied to the PLL circuit f13, and rough frequency drawing, that is, rough synchronization, is performed in the PLL circuit f13. When the frequency is roughly adjusted by rough synchronization, the synchronization detection circuit f210 sets the switch f18 to the bottom detection circuit f12. Thereby, the output signal of the bottom detection circuit f12 is supplied to the PLL circuit f13, and accurate frequency drawing, that is, fine synchronization, is performed in the PLL circuit f13. Accordingly, it is possible to generate the reproduction clock signal faster than in the reproduction clock signal generation circuit Kr.

Figure 44:
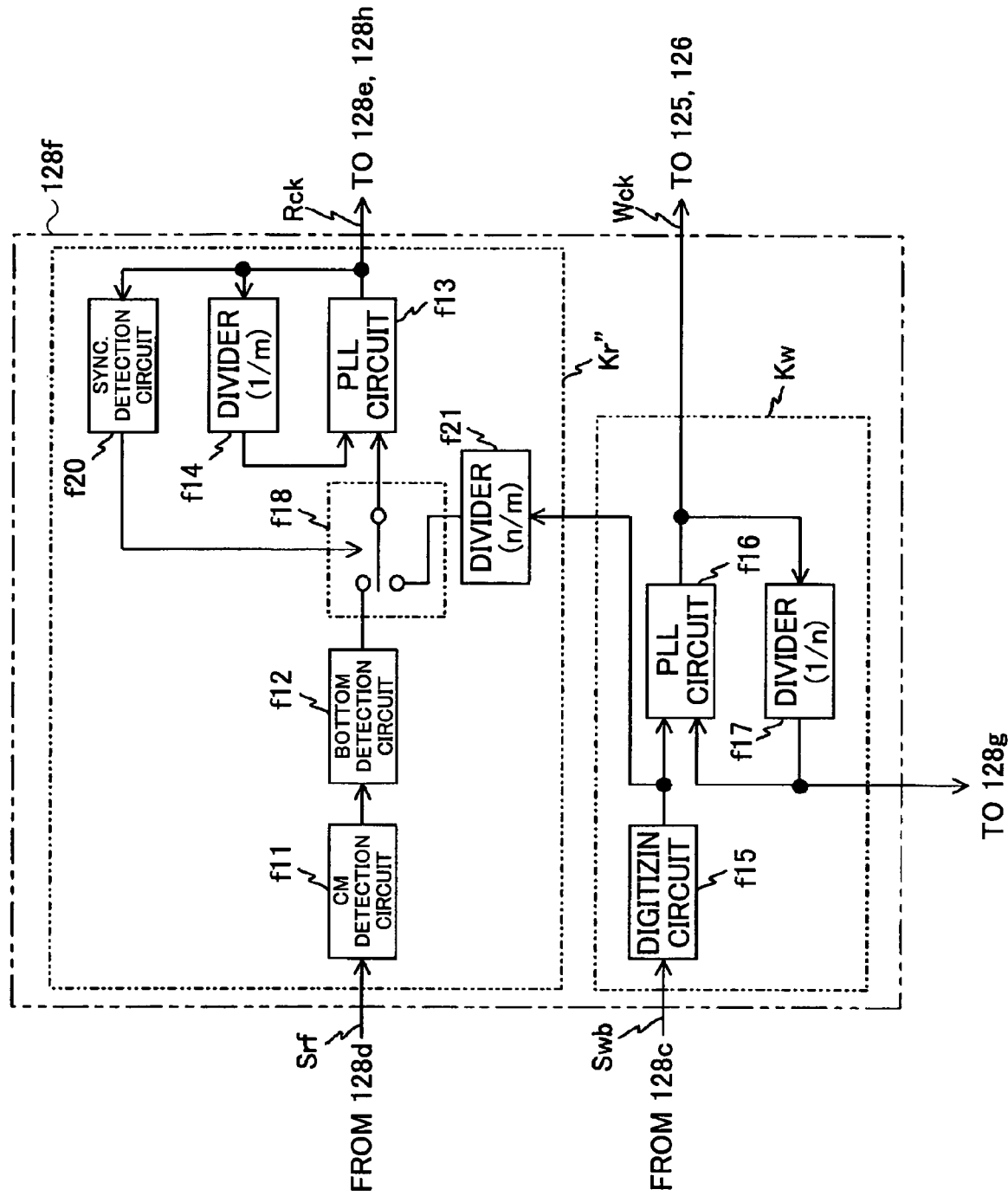
FIG. 44 is a block diagram for explaining another variation of the clock signal generation circuit.

In this case, when "m" is a natural number times of "n", as shown in FIG. 44 for example, a reproduction clock signal generation circuit Kr" may be used that includes a divider f211, which divides the output signal of the digitizing circuit f15 by m/n, instead of the divider f19 of the reproduction clock signal generation circuit Kr'. For rough synchronization, the output signal of the divider f211 is selected by the switch f18, and for fine synchronization, the output signal of the bottom detection circuit f12 is selected by the switch f18. Thereby, even if, for example, the reference clock signal is not required and the PLL circuit f16 forming the reference clock signal generation circuit Kw is not operating, it is possible to quickly generate the reproduction clock signal.

Figure 45:
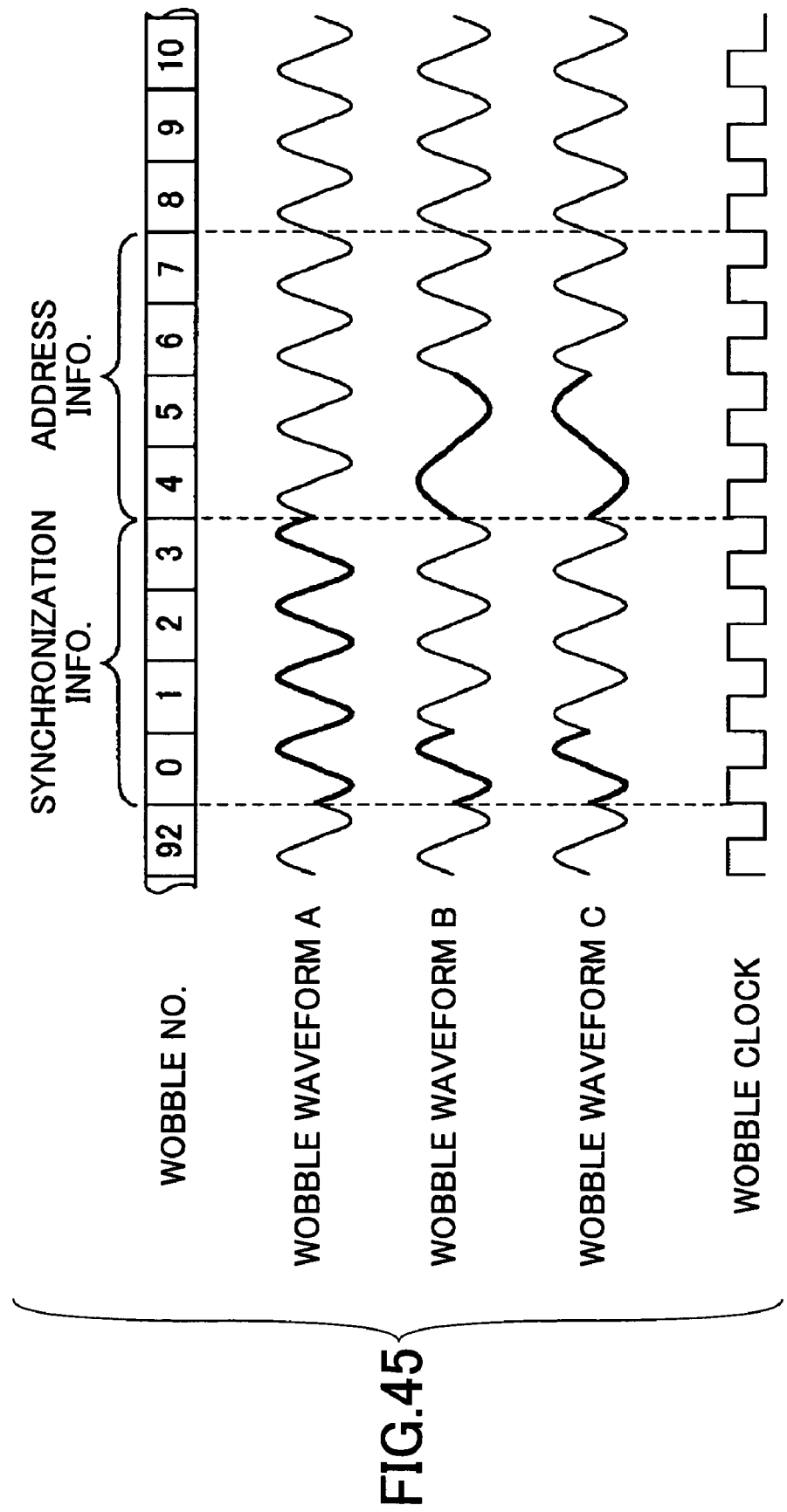
FIG. 45 is a schematic diagram for explaining a variation of phase modulation in the wobble information part.

Additionally, in the above embodiment, the description is given of the case where the address information is phase modulated by the same period as that of the carrier wave. However, this is not a limitation, and as shown in FIG. 45 for example, the address information may be phase modulated by twice the period of the carrier wave. In this case, if the CM period and the wobble period are made equal to each other, it is possible to arrange CMs at positions where the spot center substantially matches the middle position of the pit array.

Additionally, in the above embodiment, the description is given of the case where three CMs are inserted in one data block. However, this is not a limitation, and, for example, one CM may be inserted in one data block.

Figure 46A:
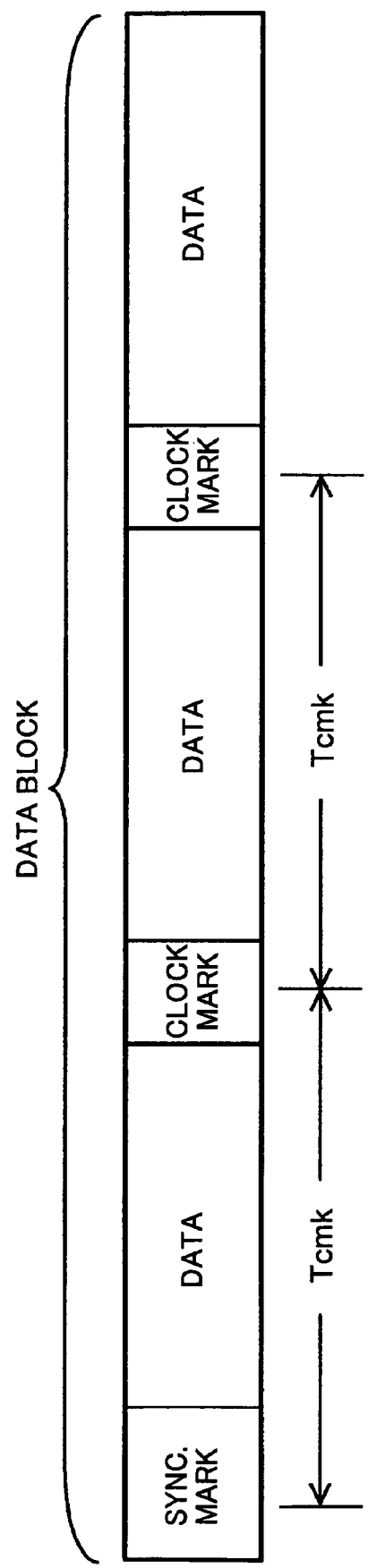
FIG. 46A is a schematic diagram for explaining the data block in the case where the synchronization mark includes a CM function.
Figure 46B:
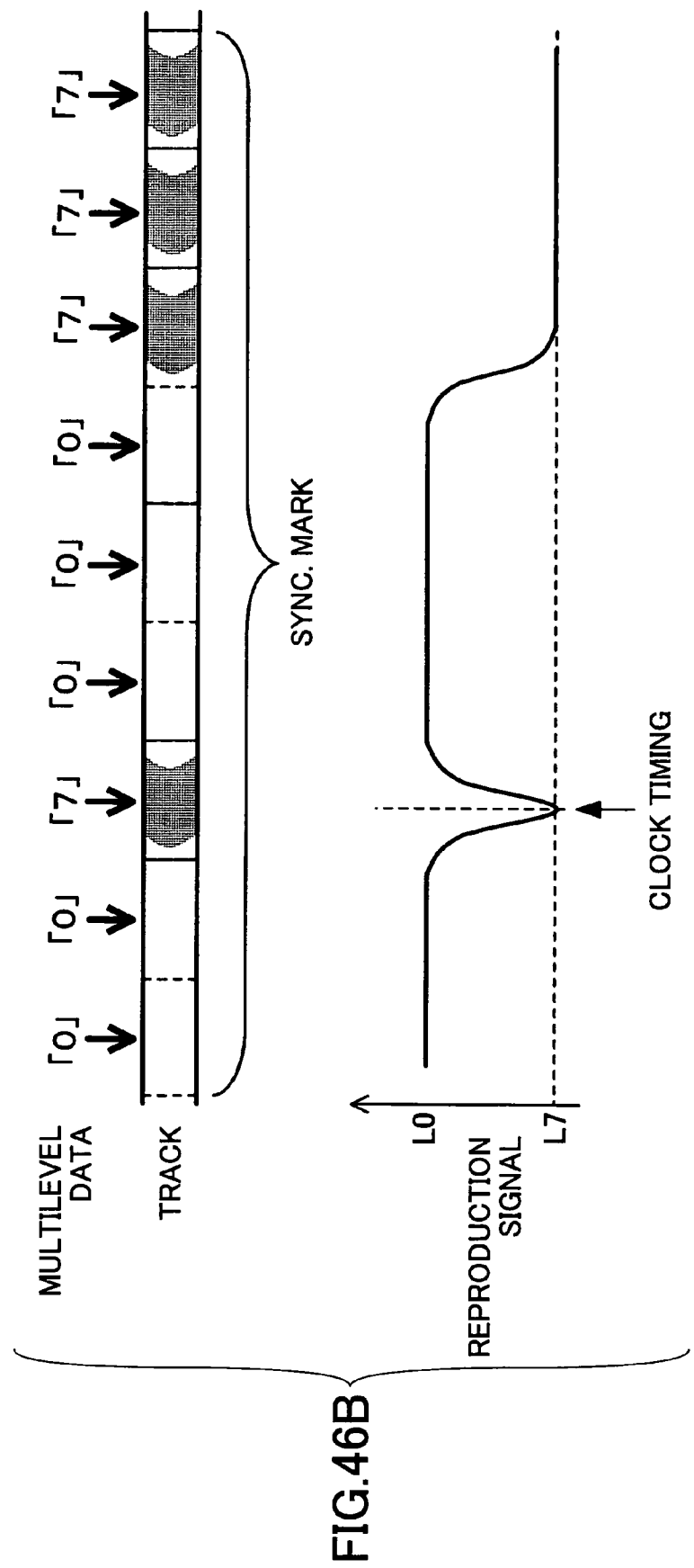
FIG. 46B is a schematic diagram for explaining the synchronization mark in the case of FIG. 46A.

Additionally, in the above embodiment, the description is given of the case where the CM at the top of a data block and a synchronization mark are separately arranged. However, in the case where the center of cell can be specified by the synchronization mark, as shown in FIG. 46A for example, the CM in front of the synchronization mark may be omitted. For example, as shown in FIG. 46B, when a multilevel data string "007000777" is used as a synchronization mark, the center of cell can be specified by the first five cells.

Figure 47:
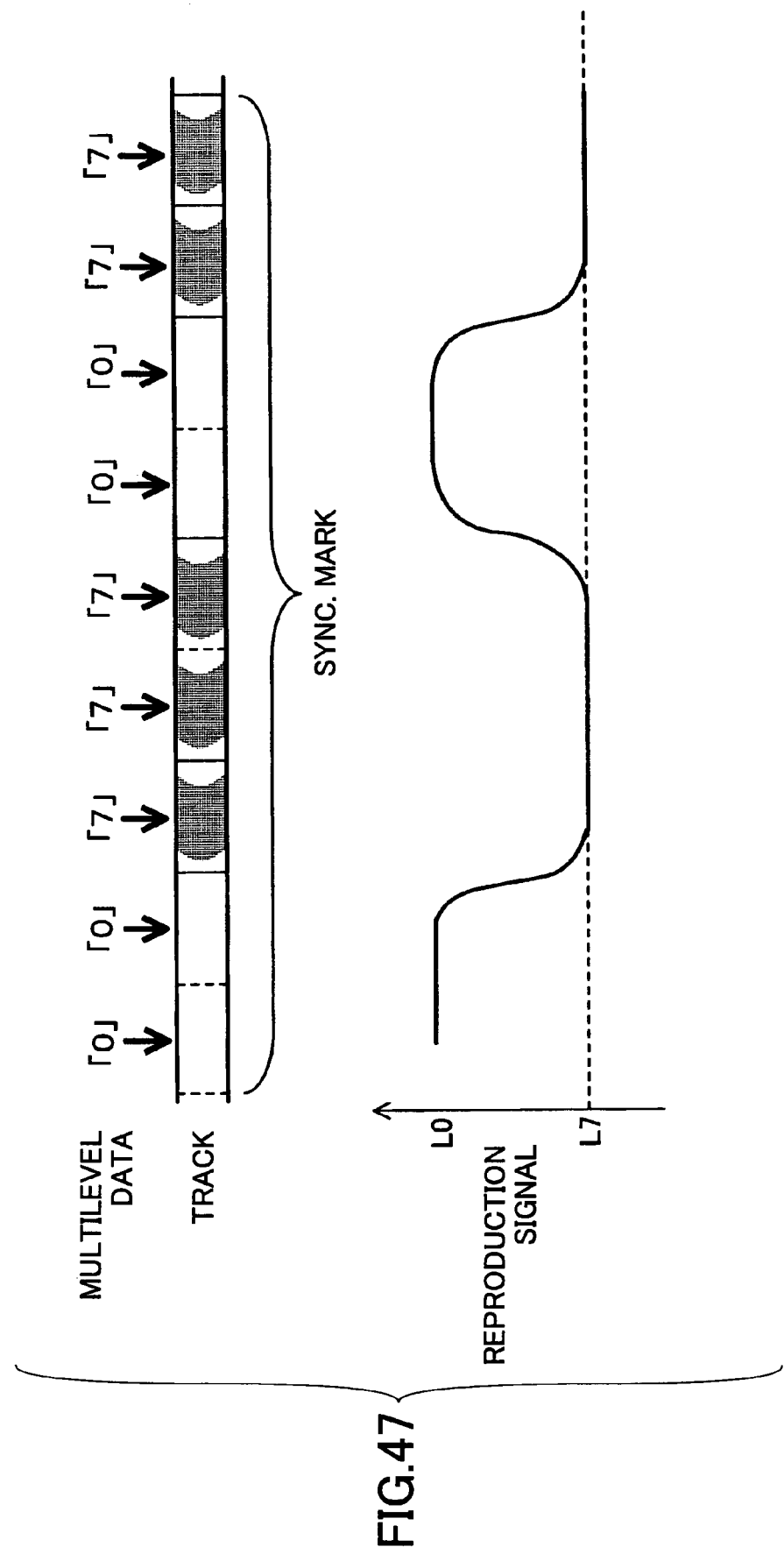
FIG. 47 is a schematic diagram for explaining a variation of the synchronization mark.

Additionally, in the above embodiment, the description is given of the case where the multilevel data string "00007777" is used as a synchronization mark. However, this is not a limitation. For example, as shown in FIG. 47, a multilevel data string "007770077" may be used as a synchronization mark. In short, any pattern may be used as long as the pattern does not appear in user data.

Figure 48:
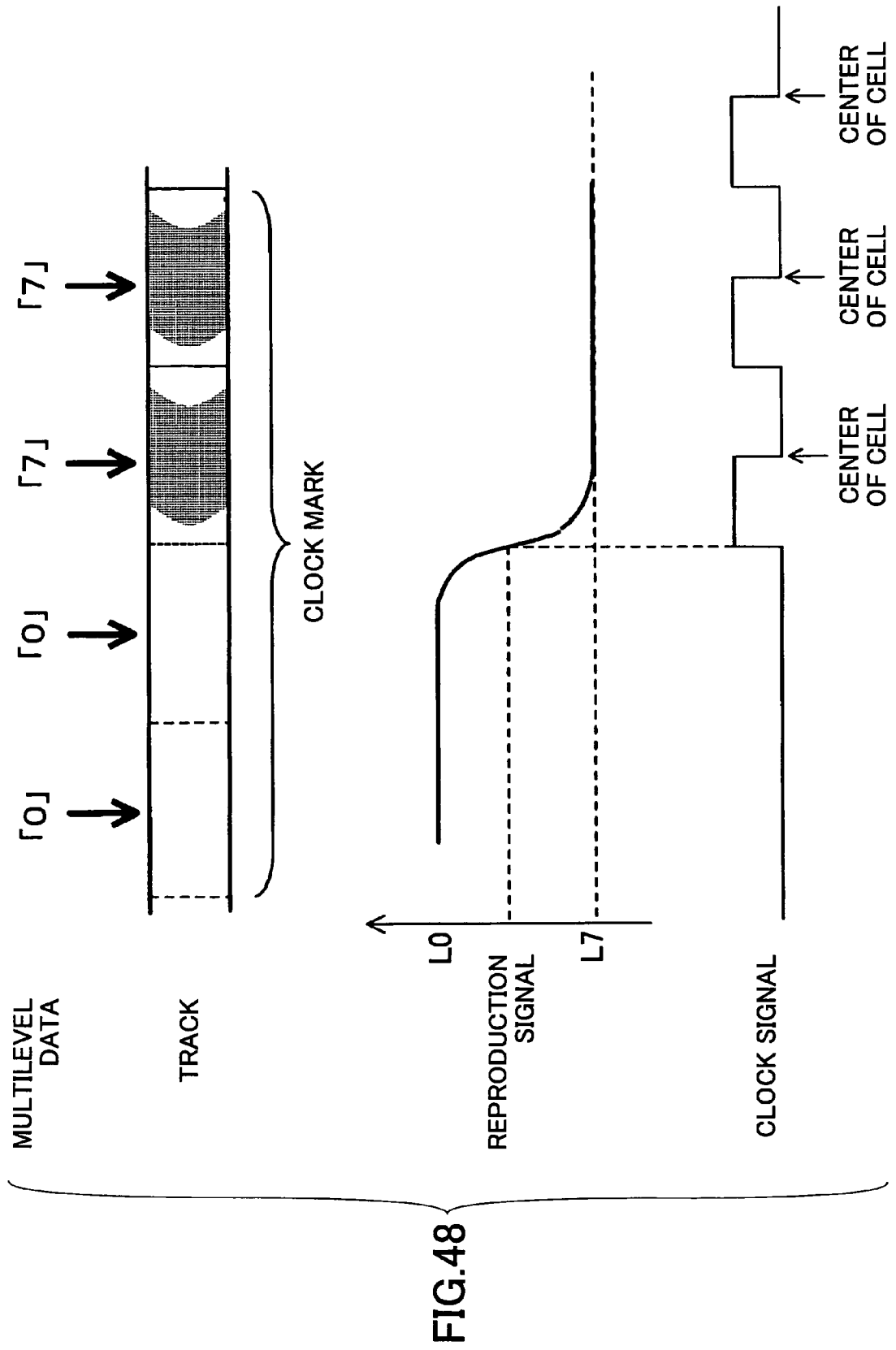
FIG. 48 is a schematic diagram for explaining a variation of the CM.
Figure 49:
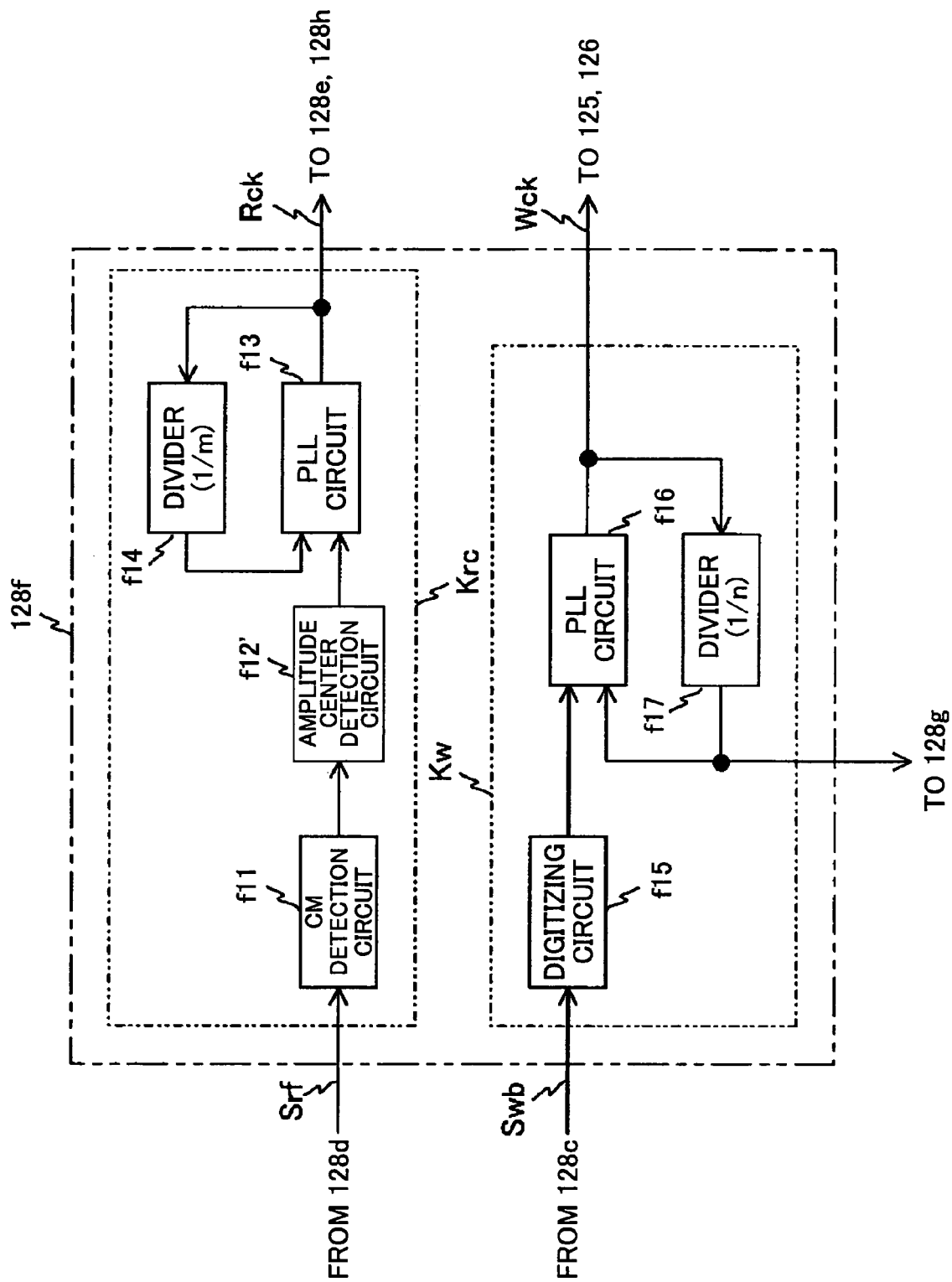
FIG. 49 is a block diagram for explaining the clock signal generation circuit in the case where the CMs shown in FIG. 48 are used.

Additionally, in the above embodiment, the description is given of the case where the multilevel data string "00700" is used as a CM. However, this is not a limitation. For example, as shown in FIG. 48, a multilevel data string "0077" may be used as a CM. In this case, the clock signal is generated based on the amplitude center of the reproduction signal. That is, since the timing of a cell boundary is obtained by detecting the timing to cross the amplitude center, if a clock signal having a rising edge at the cell boundary is generated, because the length of a cell is known, as shown in FIG. 23, it is possible to readily generate the clock signal whose falling edge indicate the center of cell. Accordingly, in this case, a reproduction clock signal generation circuit Krc shown in FIG. 49 is used instead of the reproduction clock signal generation circuit Kr. In the reproduction clock signal generation circuit Krc, an amplitude center detection circuit f12', which detects the amplitude center of the reproduction signal, is used instead of the bottom detection circuit f12.

Additionally, in the above embodiment, the description is given of the case where recording data are multileveled to eight values. However, this is not a limitation of the present invention.

Additionally, in the above embodiment, the description is given of the case where the track error signal is obtained by the push-pull method. However, this is not a limitation and, for example, a phase difference method (DPD method) may be used. Further, a 3 spot method and a differential push-pull (DPP) method may be used by dividing the light emitted from the semiconductor laser LD into three beams. In short, the track error signal should be detected with a good degree of accuracy. It should be noted that the structures of the optical pickup device 123 and the reproduction signal processing circuit 28 correspond to a detection method.

Additionally, in the above embodiment, the description is given of the case where the focus error signal is obtained by the astigmatic method. However, this is not a limitation and, for example, a knife edge method may be used. In short, the focus error signal should be detected with a good degree of accuracy. It should be noted that the structures of the optical pickup device 123 and the reproduction signal processing circuit 28 correspond to a detection method.

Additionally, in the above embodiment, the description is given of the case where the acceptance surface of the photoreceiver PD is divided by four. However, this is not a limitation. In short, the servo signal, the RF signal, and the wobble signal should be detected with a good degree of accuracy.

Additionally, in the above embodiment, the wobble width is ±17.8 nm. However, this may be changed in accordance with the bandwidth limiting method.

Additionally, in the above embodiment, the description is given of the case where bandwidth limiting is performed when modulating recording data. However, this is not a limitation, and bandwidth limiting may not be performed. In this case, it is preferable that the wobble width is ±2152 nm.

Additionally, in the above embodiment, the description is given of the case where the wobble period is 5 μm and the track pitch is 0.74 μm. However, this is not a limitation of the present invention. When, for example, the track pitch is 0.45 μm, it is preferable that the wobble width be ±10.8 nm when bandwidth limiting is performed and be ±15.3 nm when bandwidth limiting is not performed. In addition, when, for example, the track pitch is 0.32 μm, it is preferable that the wobble width be ±7.7 nm when bandwidth limiting is performed and be ±10.9 nm when bandwidth limiting is not performed.

Additionally, in the above embodiment, the description is given of the case where one wobble unit is formed by 93 wobbles. However, this is not a limitation.

Additionally, in the above embodiment, the description is given of the case where, in one wobble unit, wobble No. 0 through 7 form the wobble information part and wobble No. 8 through 92 form the carrier wave part. However, this is not a limitation.

Additionally, in the above embodiment, the description is given of the case where 151 bits are required as address data. However, this is not a limitation. In this case, the number of wobble units constituting one wobble unit is defined in accordance with the number of bits of address data.

Additionally, in the above embodiment, in the case where the period of the reproduction signal becomes close to the period of the wobble signal, phase comparison in the PLL circuit f16 of the reference clock signal generation circuit Kw may be temporarily stopped.

Additionally, in the above embodiment, the description is given of the case where the photoreceiver PD and the I/V amplifier 162 are separately provided. However, this is not a limitation, and the photoreceiver PD may be integrally provided with the I/V amplifier 162.

Additionally, in the above embodiment, the description is given of the case where the optical disk 115 corresponds to the laser light having a wavelength of approximately 16160 nm. However, this is not a limitation, and the optical disk 115 may correspond to, for example, laser light having a wavelength of approximately 780 nm and laser light having a wavelength of approximately 405 nm.

Additionally, in the above embodiment, the description is given of the case where the area of a pit is different in accordance with the value of multilevel data. However, this is not a limitation, and the depth of a pit may be different in accordance with the value of multilevel data. In short, the signal level of the reproduction signal should be different in accordance with the value of multilevel data.

Additionally, in the above embodiment, the description is given of the case where the optical pickup device is provided with one semiconductor laser LD. However, this is not a limitation, and the optical pickup device may be provided with, for example, plural semiconductor lasers, each emitting laser light having a different wavelength. In this case, the optical pickup device may include one of a semiconductor laser that emits light having a wavelength of approximately 405 nm and a semiconductor laser that emits light having a wavelength of approximately 780 nm. That is, the optical disk device may be an optical disk device that corresponds to plural kinds of optical disks each conforming to a different standard. In such a case, the multilevel recording method may be used in at least one of the plural kinds of optical disks.

The present invention is not limited to the specifically disclosed embodiments, and variations and modifications may be made without departing from the scope of the present invention.

The present application is based on Japanese Priority Applications No. 2004-048930 filed on Feb. 25, 2004 and No. 2004-048934 filed on Feb. 25, 2004, the entire contents of which are hereby incorporated by reference.

What is claimed is:

1. An optical disk, comprising:
a recording surface on which a plurality of pits corresponding to multilevel (three level or higher) information are formed as a spiral or concentric pit array,
wherein the pit array wobbles periodically,
wherein a plurality of predetermined reference marks, corresponding to a period of the wobble, are included in the pit array,
wherein the pit array includes a phase modulation wave part including predetermined information and a carrier wave part for clock signal generation, and
the phase modulation wave part is phase modulated by the same period as that of the carrier wave part.

2. An optical disk, comprising:
a recording surface on which a plurality of pits corresponding to multilevel (three level or higher) information are formed as a spiral or concentric pit array,
wherein the pit array wobbles periodically,
wherein a plurality of predetermined reference marks, corresponding to a period of the wobble, are included in the pit array,
wherein the pit array includes a phase modulation wave part including predetermined information and a carrier wave part for clock signal generation, and
the phase modulation wave part is phase modulated by a period twice that of the carrier wave part.

3. An optical disk, comprising:
a recording surface on which a spiral or concentric wobbling track is formed,
wherein a plurality of predetermined reference marks are formed on the recording surface together with multilevel information (three level or higher) such that the reference marks correspond to a period of the wobble, and
wherein the reference marks are formed at positions where a shift amount between an on-track position and a middle position of the track becomes a predetermined value with respect to a tracking direction that is orthogonal to a tangential direction of the track, each of said reference marks is defined as a multilevel data string and includes one or more pits,
wherein the track includes a phase modulation wave part including predetermined information and a carrier wave part for clock signal generation, and the phase modulation wave part is phase modulated by the same period as that of the carrier wave part.

4. An optical disk, comprising:
a recording surface on which a spiral or concentric wobbling track is formed,
wherein a plurality of predetermined reference marks are formed on the recording surface together with multilevel information (three level or higher) such that the reference marks correspond to a period of the wobble, and
wherein the reference marks are formed at positions where a shift amount between an on-track position and a middle position of the track becomes a predetermined value with respect to a tracking direction that is orthogonal to a tangential direction of the track, each of said reference marks is defined as a multilevel data string and includes one or more pits,
wherein the track includes a phase modulation wave part including predetermined information and a carrier wave part for clock signal generation, and the phase modulation wave part is phase modulated by a period twice that of the carrier wave part.

* * * * *